(12) United States Patent
Takiguchi et al.

(10) Patent No.: US 10,392,522 B2
(45) Date of Patent: Aug. 27, 2019

(54) ULTRAVIOLET CURABLE COMPOSITION AND RECORDED OBJECT

(71) Applicant: SEIKO EPSON CORPORATION, Tokyo (JP)

(72) Inventors: Hiroshi Takiguchi, Nagano (JP); Atsushi Denda, Nagano (JP); Naoyuki Toyoda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 447 days.

(21) Appl. No.: 15/028,844

(22) PCT Filed: Nov. 4, 2014

(86) PCT No.: PCT/JP2014/005537
§ 371 (c)(1),
(2) Date: Apr. 12, 2016

(87) PCT Pub. No.: WO2015/068376
PCT Pub. Date: May 14, 2015

(65) Prior Publication Data
US 2016/0257827 A1 Sep. 8, 2016

(30) Foreign Application Priority Data

Nov. 6, 2013 (JP) ................................ 2013-230639
Nov. 6, 2013 (JP) ................................ 2013-230640
Sep. 17, 2014 (JP) ................................ 2014-189311

(51) Int. Cl.
*B32B 3/10* (2006.01)
*C09D 11/037* (2014.01)
(Continued)

(52) U.S. Cl.
CPC ............ *C09D 11/037* (2013.01); *B32B 27/06* (2013.01); *B32B 27/18* (2013.01); *C09D 11/101* (2013.01);
(Continued)

(58) Field of Classification Search
None
See application file for complete search history.

(56) References Cited

U.S. PATENT DOCUMENTS

| 8,192,804 B2 | 6/2012 | Fukumoto et al. |
| 2012/0229583 A1 | 9/2012 | Fukumoto et al. |
| 2016/0257827 A1 | 9/2016 | Takiguchi et al. |

FOREIGN PATENT DOCUMENTS

| JP | 2009-057548 A | 3/2009 |
| JP | 2013-001809 A | 1/2013 |

(Continued)

OTHER PUBLICATIONS

Machine Translation of JP 2013023628 Retrieved on Apr. 2, 2018.*
(Continued)

*Primary Examiner* — Christopher M Polley

(57) ABSTRACT

The ultraviolet curable composition includes a polymerizable compound, metal powder, and fluorine-containing powder, in which a content of the fluorine-containing powder is in a range of 0.010 mass % to 5.0 mass %. A constituting particle of the fluorine-containing powder preferably contains at least one of a particle formed of a fluorine polymer and an inorganic fine particle which is treated by using a fluorine-based surface treating agent. The metal powder preferably contains a material which is subjected to a surface treatment by using a fluorine-based surface treating agent as the constituting particle.

22 Claims, 2 Drawing Sheets

(51) Int. Cl.
  *B32B 27/18* (2006.01)
  *B32B 27/06* (2006.01)
  *C09D 11/101* (2014.01)
  *C09D 11/322* (2014.01)

(52) U.S. Cl.
  CPC .... *C09D 11/322* (2013.01); *B32B 2264/0257* (2013.01); *B32B 2264/102* (2013.01); *B32B 2307/306* (2013.01); *B32B 2307/554* (2013.01)

(56) References Cited

FOREIGN PATENT DOCUMENTS

| | | | |
|---|---|---|---|
| JP | 2013-001810 | A | 1/2013 |
| JP | 2013-018920 | A | 1/2013 |
| JP | 2013-023628 | A | 2/2013 |
| JP | 2013023628 | A * | 2/2013 |
| JP | 2015-089927 | A | 5/2015 |
| JP | 2015-089928 | A | 5/2015 |

OTHER PUBLICATIONS

The Extended European Search Report for the corresponding European Patent Application No. 14859430.2 dated Jun. 9, 2017.
The replacement European Search Report for the corresponding European Patent Application No. 14859430.2 dated Jan. 4, 2018.
Hubei Nice & Chemical Material Co., Ltd.; Application of Micronized Powder Wax in Ink published on Feb. 20, 2012; cited in the corresponding Chinese application dated Feb. 4, 2017.

* cited by examiner

ULTRAVIOLET CURABLE COMPOSITION AND RECORDED OBJECT

TECHNICAL FIELD

The present invention relates to an ultraviolet curable composition and a recorded object.

BACKGROUND ART

In the related art, as a manufacturing method of a decoration which exhibits a shiny appearance, a metal plating method, a foil printing method by using a metal foil, and a thermal transfer method by using a metal foil have been used.

However, there is a problem in that it is difficult for these methods to form a fine pattern and to be applied to a curved surface portion.

On the other hand, a recording method of imparting a composition containing a pigment or dye on a recording medium through a method such as an ink jet method has been used. These methods are excellent in that it is preferably applicable to form a fine pattern, and to perform recording on a curved surface portion. In addition, in recent years, in order to make abrasion resistance, water resistance, and solvent resistance particularly excellent, a composition (an ultraviolet curable composition) which is cured by being irradiated with an ultraviolet ray has been used (for example, refer to PTL 1).

However, in a case of simply applying the metal powder instead of a pigment or dye, there are problems in that original characteristics of the metal such as glossiness cannot be sufficiently exhibited and an appearance is greatly changed due to the friction.

CITATION LIST

Patent Literature

PTL 1: JP-A-2009-57548

SUMMARY OF INVENTION

Technical Problem

An advantage of some aspects of the invention is to provide an ultraviolet curable composition which is capable of being preferably used to form a pattern (a printing unit) which is excellent in glossiness and abrasion resistance, and a recorded object having the pattern (the printing unit) which is excellent in glossiness and abrasion resistance.

Solution to Problem

The invention is adopted as follows.

According to an aspect of the invention, there is provided an ultraviolet curable composition including a polymerizable compound, metal powder, and fluorine-containing powder, in which a content of the fluorine-containing powder is in a range of 0.010 mass % to 5.0 mass %.

With this, it is possible to provide an ultraviolet curable composition capable of being preferably used to form a pattern (a printing unit) which is excellent in glossiness and abrasion resistance.

In the ultraviolet curable composition of the invention, it is preferable that a constituting particle of the fluorine-containing powder contains at least one of a particle formed of a fluorine polymer and an inorganic fine particle which is treated by using a fluorine-based surface treating agent.

With this, it is possible to realize particularly excellent abrasion resistance and durability of the recorded object manufactured by using the ultraviolet curable composition, and, for example, even in a case where stronger frictional force is applied thereto, or a case where the friction is applied a number of times, it is possible to maintain an excellent aesthetic appearance.

In the ultraviolet curable composition of the invention, it is preferable that the inorganic fine particle is formed of a material of which at least a surface has an oxide.

With this, it is possible to realize particularly excellent abrasion resistance of the recorded object manufactured by using the ultraviolet curable composition.

In the ultraviolet curable composition of the invention, it is preferable that a constituting material of the inorganic fine particle is one or two or more types selected from the group consisting of silica, alumina, and titania.

With this, it is possible to make the constituting particle of the fluorine-containing powder more rigid, and even in a case where the content of the fluorine-containing powder in the ultraviolet curable composition and the content of the fluorine-containing powder in the printing unit which is formed by using the ultraviolet curable composition are set to be lower such that the treatment is easily performed by using the fluorine-based surface treating agent, and a surface treatment can be performed with higher minute density, it is possible to realize sufficiently excellent abrasion resistance and durability of the recorded object manufactured by using the ultraviolet curable composition. Further, it is possible to realize particularly high transparency of the fluorine-containing powder, and thus it is possible to more reliably realize excellent aesthetic appearance of the recorded object manufactured by using the ultraviolet curable composition.

In the ultraviolet curable composition of the invention, it is preferable that the metal powder contains a material which is subjected to the surface treatment by using the fluorine-based surface treating agent as the constituting particle.

With this, it is possible to realize particularly excellent dispersion stability and chemical stability of the metal powder in the ultraviolet curable composition, and it is possible to realize particularly excellent storage stability and discharge stability of the ultraviolet curable composition for a long period of time. In addition, it is possible to realize particularly excellent abrasion resistance of the recorded object. In the manufacturing of the recorded object, it is possible to preferably arrange (leafing) metal powders in the vicinity of an outer surface of the printing unit, and thus it is possible to realize particularly excellent glossiness of the recorded object (the printing unit).

In the ultraviolet curable composition of the invention, it is preferable that the metal powder contains, as the constituting particle, a material in which a base particle of which at least a surface is mainly formed of Al is subjected to a surface treatment by using the fluorine-based surface treating agent.

With this, it is possible to realize particularly excellent glossiness and sophisticated feelings of the recorded object while suppressing an increase in production costs of the recorded object. In addition, among various metallic materials, Al originally exhibits particularly excellent glossiness; however, the inventors have found that in a case where a particle formed of Al is applied to the ultraviolet curable composition, the storage stability of the ultraviolet curable composition is particularly low, and thus a problem such as deterioration of the discharge stability due to the increase in the viscosity by gelation is particularly easy to occur. In contrast, even in a case where a particle of which the surface is formed of Al is used, by performing a surface treatment by using the fluorine-based surface treating agent, it is possible to reliably prevent the occurrence of the above described problem.

In the ultraviolet curable composition of the invention, it is preferable that the constituting particle of the fluorine-containing powder contains an inorganic fine particle which is treated by using the fluorine-based surface treating agent, and the fluorine-based surface treating agent which is used for a surface treatment of the inorganic fine particle, and the fluorine-based surface treating agent which is used for a surface treatment of the constituting particle of the metal powder are the same surface treating agent.

With this, since surface properties (surface energy, charging state, and the like) of both of the metal powder and the fluorine-containing powder are similar to each other, dispersion stability of the metal powder and the fluorine-containing powder in the ultraviolet curable composition becomes particularly excellent, and thereby it is possible to more effectively prevent an increase in the viscosity and the particle size for a long period of time. In addition, in the recorded object manufactured by using the ultraviolet curable composition, it is possible for the metal powder and the fluorine-containing powder to more reliably exist in a uniform manner in a planar view of the printing unit (it is possible to more reliably prevent the printing unit from being divided into a region in which the metal powders are unevenly distributed and a region in which the fluorine-containing powders are unevenly distributed in a planar view of the printing unit), and it is possible to realize an excellent aesthetic appearance and abrasion resistance of the recorded object in a stable manner.

In the ultraviolet curable composition of the invention, it is preferable that the fluorine-based surface treating agent is one or two or more types selected from the group consisting of a fluorine-based silane compound, a fluorine-based phosphoric acid ester, a fluorine-based fatty acid, and a fluorine-based isocyanate.

With this, the surface free energy of the particle which is treated by using the fluorine-based surface treating agent can be more effectively reduced, the difference of the surface energy between the polymerizable compounds is increased, hydrophobic interaction is more strongly performed, and thereby it is possible to more effectively arrange metal powders and the fluorine-containing powders on the surface of the recorded object. As a result, it is possible to realize particularly excellent glossiness and abrasion resistance of the recorded object.

In the ultraviolet curable composition of the invention, it is preferable that an average particle size of the fluorine-containing powder is in a range of 10 nm to 300 nm.

With this, it is possible to realize particularly excellent abrasion resistance while realizing a sufficiently excellent aesthetic appearance and glossiness of the recorded object manufactured by using the ultraviolet curable composition. In addition, it is possible to realize particularly excellent dispersion stability of the fluorine-containing powder, and the storage stability of the ultraviolet curable composition in the ultraviolet curable composition.

In the ultraviolet curable composition of the invention, it is preferable that the constituting particle of the metal powder is formed into a scaly shape.

With this, it is possible to realize particularly excellent glossiness and sophisticated feelings of the recorded object manufactured by using the ultraviolet curable composition. In addition, it is possible to realize particularly excellent abrasion resistance and durability of the recorded object.

In the ultraviolet curable composition of the invention, it is preferable that an average thickness of the constituting particle of the metal powder is in a range of 10 nm to 100 nm.

With this, it is possible to realize more excellent glossiness and sophisticated feelings of the recorded object manufactured by using the ultraviolet curable composition. In addition, it is possible to realize more excellent abrasion resistance and durability of recorded object.

In the ultraviolet curable composition of the invention, it is preferable that when the average thickness of the constituting particle of the metal powder is set to be $T_M$ [μm], and the average particle size of the fluorine-containing powder is set to be $D_F$ [μm], a relationship expressed by $1.5 \leq D_F/T_M \leq 40$ is satisfied.

With this, it is possible to realize particularly excellent abrasion resistance of the recorded object while realizing a sufficiently excellent aesthetic appearance of the recorded object manufactured by using the ultraviolet curable composition.

In the ultraviolet curable composition of the invention, it is preferable that the average particle size of the metal powder is in a range of 500 nm to 3.0 μm, and the maximum size of the particle is equal to or less than 5 μm.

With this, it is possible to realize more excellent glossiness and sophisticated feelings of the recorded object manufactured by using the ultraviolet curable composition. In addition, it is possible to realize more excellent storage stability and discharge stability of the ultraviolet curable composition.

In the ultraviolet curable composition of the invention, it is preferable to contain a monomer having an alicyclic structure as the polymerizable compound.

With this, it is possible to realize particularly excellent storage stability of the ultraviolet curable composition, and to realize particularly excellent glossiness and abrasion resistance of the printing unit of the recorded object which is manufactured by using the ultraviolet curable composition.

In the ultraviolet curable composition of the invention, it is preferable that the monomer having an alicyclic structure contains one or two or more types selected from the group consisting of tris(2-acryloyloxyethyl) isocyanurate, dicyclopentenyloxyethyl acrylate, adamantyl acrylate, γ-butyrolactone acrylate, N-vinyl caprolactam, N-vinyl pyrrolidone, pentamethyl piperidyl acrylate, tetramethyl piperidyl acrylate, 2-methyl-2-adamantyl acrylate, 2-ethyl-2-adamantyl acrylate, mevalonic acid lactone acrylate, dimethylol tricyclodecane diacrylate, dimethylol dicyclopentane diacrylate, dicyclopentenyl acrylate, dicyclopentanyl acrylate, isobornyl acrylate, cyclohexyl acrylate, acryloyl morpholine, tetrahydrofurfuryl acrylate, cyclohexane spiro-2-(1,3-dioxolan-4-yl) methyl acrylate, and (2-methyl-2-ethyl-1,3-dioxolan-4-yl) methyl acrylate.

With this, it is possible to realize more excellent glossiness and sophisticated feelings of the recorded object manufactured by using the ultraviolet curable composition. In addition, it is possible to realize more excellent storage stability and discharge stability of the ultraviolet curable composition.

In the ultraviolet curable composition of the invention, it is preferable that a polymerizable compound other than the monomer having an alicyclic structure contains one or two or more types selected from the group consisting of phenoxyethyl acrylate, benzyl acrylate, 2-(2-vinyloxyethoxy) ethyl acrylate, dipropylene glycol diacrylate, tripropylene glycol diacrylate, 2-hydroxy3-phenoxypropyl acrylate, and 4-hydroxybutyl acrylate.

With this, it is possible to make the storage stability and the discharge stability of the ultraviolet curable composition excellent, to make reactivity of the ultraviolet curable composition after being discharged by the ink jet method particularly excellent, to make productivity of the recorded object particularly excellent, and to make the abrasion resistance of the formed pattern particularly excellent.

According to another aspect of the invention, there is provided a recorded object which is manufactured by imparting the ultraviolet curable composition according to the invention on a recording medium, and then irradiating the ultraviolet curable composition with an ultraviolet ray.

With this, it is possible to provide the recorded object including the pattern (the printing unit) with excellent glossiness and abrasion resistance.

According to another aspect of the invention, there is provided a recorded object including a recording medium and a printing unit, in which the printing unit contains a metal powder and a fluorine-containing powder, and in a planar view of the printing unit, the number of constituting particles of the fluorine-containing powders which are exposed to a surface of the printing unit is in a range of $0.20/\mu m^2$ to $3.0/\mu m^2$ per unit area of the printing unit.

With this, it is possible to provide the recorded object including the pattern (the printing unit) with excellent glossiness and abrasion resistance.

In the recorded object of the invention, it is preferable that a content of the fluorine-containing powder in the printing unit is in a range of 0.010 mass % to 5.0 mass %.

With this, it is possible to realize particularly excellent glossiness and abrasion resistance of the printing unit.

In the recorded object of the invention, it is preferable that a content of the metal powder in the printing unit is in a range of 0.5 mass % to 29 mass %.

With this, it is possible to realize particularly excellent glossiness and the sophisticated feelings of the recorded object, and to realize particularly excellent abrasion resistance and durability of the recorded object.

In the recorded object of the invention, it is preferable that the printing unit contains the constituting particle of the fluorine-containing powder which is protruded higher than the constituting particle of the metal powder.

With this, it is possible to realize particularly excellent abrasion resistance of the recorded object.

In the recorded object of the invention, it is preferable that the printing unit is obtained by solidifying the metal powder and the fluorine-containing powder due to a cured material of the ultraviolet curable resin.

With this, it is possible to realize particularly excellent heat resistance, durability, and the like of the recorded object. In addition, it is possible to realize particularly excellent productivity of the recorded object, and it is possible to easily and reliably adjust the number of the constituting particles of the fluorine-containing powders which are exposed to the surface of printing unit per unit area of the printing unit by adjusting the irradiation conditions of ultraviolet rays in the manufacturing of the recorded object.

DESCRIPTION OF EMBODIMENTS

Figure 1:
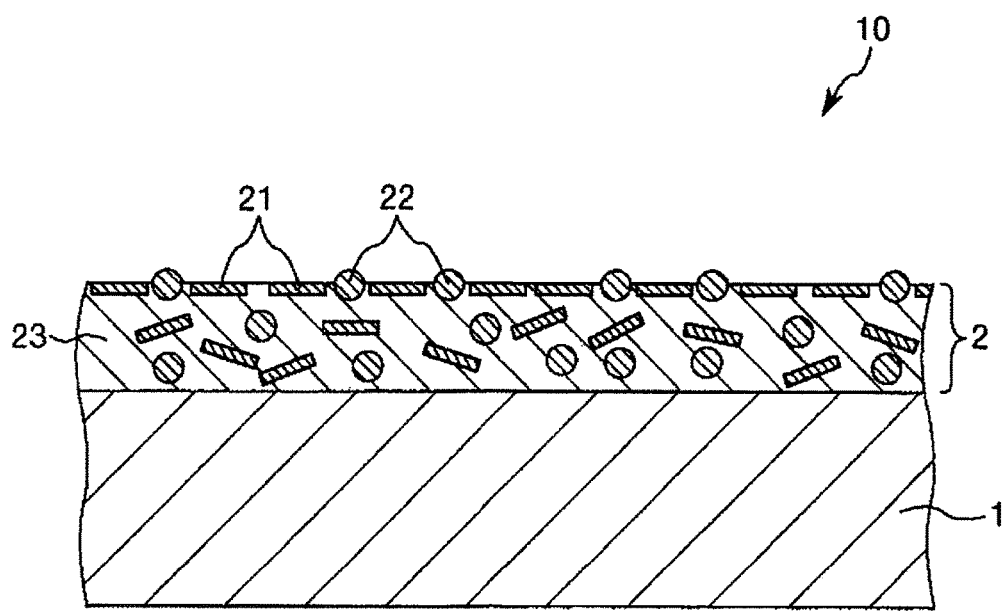
FIG. 1 is a sectional view of a recorded object schematically illustrating a preferred embodiment of the invention.

Hereinafter, the preferred embodiments of the present invention it is described in detail.

<<Ultraviolet Curable Composition>>

First, an ultraviolet curable composition of the invention will be described.

The ultraviolet curable composition of the invention contains a polymerizable compound which is polymerized by being irradiated with an ultraviolet ray, and metal powder.

Incidentally, in the related art, as a manufacturing method of a decoration which exhibits a shiny appearance, a metal plating method, a foil printing method by using a metal foil, and a thermal transfer method by using a metal foil have been used.

However, there is a problem in that these methods are difficult to form a fine pattern and are difficult to be applied to a curved surface portion.

On the other hand, a recording method of imparting a composition containing a pigment or dye on a recording medium through a method such as an ink jet method has been used. These methods are excellent in that it is preferably possible to form a fine pattern, and to perform recording on a curved surface portion. In addition, in recent years, in order to realize particularly excellent abrasion resistance, water resistance, and solvent resistance, a composition (an ultraviolet curable composition) which is cured by being irradiated with an ultraviolet ray has been used.

However, in a case of simply applying the metal powder instead of a pigment or dye, there are problems in that original characteristics of the metal such as glossiness cannot be sufficiently exhibited and an appearance is greatly changed due to the friction.

In this regard, the inventors have conducted intensive studies in order to solve the above problems and thus have accomplished the invention. That is, the ultraviolet curable composition of the invention contains a metal powder and a predetermined content of fluorine-containing powder. With this, in the recorded object manufactured by using the ultraviolet curable composition, it is possible to preferably arrange the fluorine-containing powders in the vicinity of an outer surface of the printing unit (a printing layer), and thus it is possible to realize excellent abrasion resistance of a printing unit, and it is possible to effectively prevent an appearance from being changed due to the friction (for example, deterioration of glossiness and aestheticity (aesthetic appearance) and the like).

The ultraviolet curable composition of the invention may be imparted onto a recording medium by using various methods; however, the ultraviolet curable composition is preferably imparted (discharged) by using an ink jet method. In the ink jet method, it is preferably possible to form a fine pattern, and to perform recording on a curved surface portion. In addition, in the ink jet method, it is necessary that the ink (the ultraviolet curable composition) passes through a fine flow path such as a nozzle, which results in a problem in that the storage stability of the ink (the ultraviolet curable composition) is deteriorated, aggregation and precipitation of solid contents may occur in such a flow path, or the viscosity is increased due to the gelation, and thus the discharge stability is deteriorated and the predetermined pattern (the printing unit) cannot be formed. However, in the invention, even in a case where the ultraviolet curable composition is used in the ink jet method, it is possible to reliably prevent the occurrence of the above-described problem. That is, in a case where the ultraviolet curable composition is used in the ink jet method, the effect resulted from the invention is more remarkably exhibited. In the following description, a case where the ultraviolet curable composition of the invention is used in the ink jet method is mainly described.

<Metal Powder>

The ultraviolet curable composition of the invention contains the metal powder.

The metal powder contains a plurality of particles, the particle forming the metal powder is formed such that at least a portion of a site which is visually recognized on the appearance is formed of a metallic material, and typically, the vicinity of the outer surface is formed of the metallic material.

In the ultraviolet curable composition of the invention, it is preferable that the metal powder contains a particle which is subjected to the surface treatment by using a fluorine-based surface treating agent.

With this, it is possible to realize particularly excellent dispersion stability and chemical stability of the metal powder in the ultraviolet curable composition, and it is possible to realize particularly excellent storage stability and discharge stability of the ultraviolet curable composition for a long period of time. In addition, in the recorded object manufactured by using the ultraviolet curable composition, it is possible to preferably arrange metal powders and the fluorine-containing powders in the vicinity of an outer surface of the printing unit and to more effectively exhibit the properties such as the glossiness which originally belongs to the metal material for forming the metal powder. Particularly, since the constituting particle of the metal powder and the constituting particle the fluorine-containing powder are commonly formed of a fluorine-based material, the constituting particles of the fluorine-containing powders can be arranged in the vicinity of the constituting particle of the metal powder in the printing unit, and thus it is possible to realize highly qualified and reliably excellent abrasion resistance of the printing unit, and also possible to remarkably exhibit the above described effect. In addition, if the particle for forming the metal powder is subjected to the surface treatment by using the fluorine-based surface treating agent, even in a case where a polymerizable compound having low surface tension is used as a constituting material of the ultraviolet curable composition, in the recorded object manufactured by using the ultraviolet curable composition, it is possible to reliably and preferably arrange (leafing) metal powders in the vicinity of the outer surface of the printing unit, and thus it is possible to sufficiently exhibit the properties such as the glossiness which originally belongs to the metal material for forming the metal powder. Accordingly, a range of the polymerizable compound selection is extended, and it is possible to easily adjust the properties of the ultraviolet curable composition and the properties of the recorded object manufactured by using the ultraviolet curable composition (for example, the viscosity of the ultraviolet curable composition, the storage stability, the discharge stability, and the abrasion resistance of recorded object) without affecting the glossiness which originally belongs to the metal material.

Herein below, an example of a case where the metal powder contains a particle, as the constituting particle, which is subjected to the surface treatment by using fluorine-based surface treating agent will be described.

(Base Particle)

First, a base particle (a particle which is subjected to surface treatment by using a fluorine-based surface treating agent) of the particle for forming the metal powder will be described.

The base particle of the particle forming the metal powder may be formed such that at least a region including the vicinity of the surface is formed of a metallic material, for example, the entire surface is formed of a metallic material, or may include a base portion formed of a nonmetallic material, and a film formed of a metal material with which the base portion is coated.

In addition, as the metal material forming the base particle, it is possible to use metal as a simple substance and various types of alloys; however, the base particle is preferably a material of which at least the vicinity of the surface is mainly formed of Al. With this, it is possible to realize particularly excellent glossiness and sophisticated feelings of the recorded object while suppressing an increase in production costs of the recorded object. In addition, among various metallic materials, Al originally exhibits particularly excellent glossiness; however, the inventors have found that in a case where a particle formed of Al is applied to the ultraviolet curable composition, the storage stability of the ultraviolet curable composition is particularly low, and a problem of deterioration of the discharge stability due to the increase in the viscosity by gelation is particularly easy to occur. In contrast, even in a case where a particle of which the surface is formed of Al is used by performing surface treatment by using the fluorine-based surface treating agent, it is possible to reliably prevent the above-described problem. That is, the metal powder is formed in such a manner that a base particle of which at least a surface is mainly formed of Al is subjected to the surface treatment by using the fluorine-based surface treating agent, and thus the above described effect is remarkably exhibited.

The base particle may be formed by using any method; however, in a case where the base particle is formed of Al, it is preferable to obtain the base particle by forming a film formed of Al by using a vapor deposition method, and thereafter, pulverizing the film. With this, in the pattern (the printing unit) which is formed by using the ultraviolet curable composition of the invention, it is possible to effectively exhibit the glossiness or the like which originally belongs to Al. In addition, it is possible to suppress the variation of the characteristics between the respective particles. In addition, with the aforementioned method, it is possible to preferably manufacture even a case of the relatively small metal powder.

In a case where the base particle is manufactured by using such a method, for example, it is possible to preferably manufacture the base particle by forming (film formation) the film formed of Al on the base material. As the base material, for example, it is possible to use a plastic film such as polyethylene terephthalate. In addition, the base material may be one having a release agent layer on the deposition surface.

Further, it is preferable that the pulverization is performed by imparting ultrasonic vibration to the film, in the liquid. With this, it is possible to easily and reliably obtain the metal powder having a fine particle size described below, and to suppress the occurrence of variations in sizes, shapes, and characteristics between the respective particles.

In addition, when the pulverization is performed through the above-described method, as the liquid, it is preferable to use alcohols such as methanol, ethanol, propanol, and butanol, a hydrocarbon compound such as n-heptane, n-octane, decane, dodecane, tetradecane, toluene, xylene, cymene, durene, indene, dipentene, tetrahydronaphthalene, decahydronaphthalene, and cyclohexyl benzene, an ether-based compound such as ethylene glycol dimethyl ether, ethylene glycol diethyl ether, ethylene glycol methyl ethyl ether, diethylene glycol dimethyl ether, diethylene glycol diethyl ether, diethylene glycol methyl ethyl ether, diethylene glycol monobutyl ether acetate, diethylene glycol n-butyl ether, tripropylene glycol dimethyl ether, triethylene glycol diethyl ether, 1,2-dimethoxyethane, bis(2-methoxyethyl)ether, and the p-dioxane, and a polar compound such as propylene carbonate, γ-butyrolactone, N-methyl-2-pyrrolidone, N,N-dimethyl formamide (DMF), N,N-dimethyl acetamide (DMA), dimethyl sulfoxide, cyclohexanone, and acetonitrile. By using the above-described liquids, it is possible to realize particularly excellent productivity of the base particle and the metal powder while preventing the base particle from being reluctantly oxidized, and it is also possible to realize particularly small variations in the sizes, shapes, and characteristics between the respective particles.

(Fluorine-Based Surface Treating Agent)

As described above, the metal powder in the embodiment is subjected to the surface treatment by using the fluorine-based surface treating agent.

As the fluorine-based surface treating agent, it is possible to use a compound having at least one fluorine atom in a molecule, which can introduce the fluorine atom into the base particle.

Examples of the fluorine-based surface treating agent which is used to perform the surface treatment for the constituting particle of the metal powder include a fluorine-based silane compound, fluorine-based phosphoric acid ester, a fluorine-based fatty acid (including ester of fluorine-based fatty acid, and so forth), and fluorine-based isocyanate. Among them, one or two or more types selected from the group consisting of the fluorine-based silane compound, the fluorine-based phosphoric acid ester, the fluorine-based fatty acid, and the fluorine-based isocyanate are preferably used. With this, it is possible to further effectively reduce the surface free energy of the constituting particle of the metal powder, the difference of the interfacial energy between the polymerizable compounds becomes further larger, and the hydrophobic interaction is more strongly performed, and thus it is possible to further effectively arrange the metal powders on the surface of the recorded object. As a result, it is possible to realize particularly excellent glossiness of the recorded object.

Particularly, in a case where the fluorine-based silane compound is used, the recorded object which is manufactured by using the ultraviolet curable composition exhibits particularly excellent durability, and weather resistance, and it is possible to maintain the hardness of the film for a longer period of time.

In addition, the surface treating agent of phosphoric acid ester is resistant to an acid, and thus in a case where the fluorine-based phosphoric acid ester is used, even in an acidic environment, the recorded object manufactured by using the ultraviolet curable composition exhibits excellent durability and weather resistance.

In addition, in a case where the fluorine-based fatty acid is used, it is possible to further effectively perform the surface treatment on the base particle which is formed of precious metals such as gold, silver, and platinum, copper, and aluminum, and to form a small functional group and a highly crystalline film (a layer which is subjected to the surface treatment), and thus it is possible to effectively reduce the surface free energy. As a result, it is possible to effectively arrange smaller particles on the surface of the recorded object, and to further improve the abrasion resistance.

In addition, in a case where the fluorine-based isocyanate compound is used, it is possible to perform further precise surface treatment on the base particle, to make cohesion between the fluorine-based isocyanate compound and the base particle further secure, and thus the durability of the metal powder is improved. Therefore, it is possible to maintain the abrasion resistance for a longer period of time.

As the fluorine-based silane compound, a silane compound having at least one fluorine atom in the molecule can be used.

Particularly, as a surface treating agent, the fluorine-based silane compound having a chemical structure expressed by formula (4) described below is preferably used.

$$R^1 SiX^1_a R^2_{(3-a)} \qquad (4)$$

(In formula (4), $R^1$ is a hydrocarbon group in which a part or the whole of hydrogen atoms are substituted with the fluorine atom, $X^1$ is a hydrolysis group, an ether group, a chloro group, or a hydroxyl group, $R^2$ is an alkyl group having 1 to 4 carbon atoms, and a is an integer in a range of 1 to 3.)

With this, it is possible to realize particularly excellent storage stability of the ultraviolet curable composition, and to realize particularly excellent glossiness and abrasion resistance of the printing unit of the recorded object manufactured by using the ultraviolet curable composition.

Examples of $R^1$ in formula (4) include an alkyl group, an alkenyl group, an aryl group, and an aralkyl group in which a part or the whole of hydrogen atoms are substituted with the fluorine atom, and at least a portion of hydrogen atoms (a hydrogen atom which is not substituted with a fluorine atom) included in a molecular structure may be substituted with an amino group, a carboxyl group, a hydroxyl group, and a thiol group, or in the carbon chain, hetero atoms such as —O—, —S—, —NH—, and —N═, or an aromatic ring such as benzene may be inserted. Specific example of $R^1$ include a phenyl group, a benzyl group, a phenethyl group, a hydroxyphenyl group, a chlorophenyl group, an aminophenyl group, a naphthyl group, an anthranyl group, a pyrenyl group, a thienyl group, a pyrrolyl group, a cyclohexyl group, a cyclohexenyl group, a cyclopentyl group, a cyclopentenyl group, a pyridinyl group, a methyl group, an ethyl group, a n-propyl group, an isopropyl group, a n-butyl group, an isobutyl group, a sec-butyl group, a tert-butyl group, an octadecyl group, a n-octyl group, a chloromethyl group, a methoxyethyl group, a hydroxyethyl group, an aminoethyl group, a cyano group, a mercaptopropyl group, a vinyl group, an allyl group, an acryloxyethyl group, a methacryloxyethyl group, a glycidoxypropyl group, and an acetoxy group, in which a part or the whole of hydrogen atoms are substituted with the fluorine atom.

As a specific example of the fluorine-based silane compound expressed by formula (4), it is possible to use a compound having a structure in which a portion or the entirety of hydrogen atom which is contained in a silane compound is substituted with a fluorine atom, in which examples of the silane compound include dimethyl dimethoxy silane, diethyl diethoxy silane, 1-propenyl methyl dichloro silane, propyl dimethyl chloro silane, propyl methyl dichloro silane, propyl trichloro silane, propyl triethoxy silane, propyl trimethoxy silane, styryl ethyl trimethoxy silane, tetradecyl trichloro silane, 3-thiocyanate propyl triethoxy silane, p-tolyl dimethyl chloro silane, p-tolyl methyl dichloro silane, p-tolyl trichloro silane, p-tolyl trimethoxy silane, p-tolyl triethoxy silane, di-n-propyl di-n-propoxy silane, diisopropyl diisopropoxy silane, di-n-butyl di-n-butyl oxy silane, di-sec-butyl di-sec-butyloxy silane, di-t-butyl di-t-butyloxy silane, octadecyl trichloro silane, octadecyl methyl diethoxy silane, octadecyl triethoxy silane, octadecyl trimethoxy silane, octadecyl dimethyl chloro silane, octadecyl methyl dichloro silane, octadecyl methoxy dichloro silane, 7-octenyl dimethyl chloro silane, 7-octenyl trichloro silane, 7-octenyl trimethoxy silane, octyl methyl dichloro silane, octyl dimethyl chloro silane, octyl trichloro silane, 10-undecenyl dimethyl chloro silane, undecyl trichloro silane, vinyl dimethyl chloro silane, methyl dodecyl dimethoxy silane, methyl dodecyl diethoxy silane, methyl octadecyl dimethoxy silane, methyl octadecyl diethoxy silane, n-octyl methyl dimethoxy silane, n-octyl methyl diethoxy silane, triacontyl dimethyl chloro silane, triacontyl trichloro silane, methyl trimethoxy silane, methyl triethoxy silane, methyl tri-n-propoxy silane, methyl triisopropoxy silane, methyl tri-n-butyloxy silane, methyl tri-sec-butyloxy silane, methyl tri-t-butyloxy silane, ethyl trimethoxy silane, ethyl triethoxy silane, ethyl tri-n-propoxy silane, ethyl triisopropoxy silane, ethyl-n-butyloxy silane, ethyl tri-sec-butyloxy silane, ethyl tri-t-butyloxy silane, n-propyl trimethoxy silane, isobutyl trimethoxy silane, n-hexyl trimethoxy silane, hexadecyl trimethoxy silane, n-octyl trimethoxy silane, n-dodecyl triethoxy silane, n-octadecyl trimethoxy silane, n-propyl triethoxy silane, isobutyl triethoxy silane, n-hexyl triethoxy silane, hexadecyl triethoxy silane, n-octyl triethoxy silane, n-dodecyl trimethoxy silane, n-octadecyl triethoxy silane, 2-[2-(trichlorosilyl) ethyl] pyridine, 4-[2-(trichlorosilyl) ethyl] pyridine, diphenyl dimethoxy silane, diphenyl diethoxy silane, 1,3-(trichlorosilyl methyl) heptacosane, dibenzyl dimethoxy silane, dibenzyl diethoxy silane, phenyl trimethoxy silane, phenyl trimethyl dimethoxy silane, phenyl dimethyl methoxy silane, phenyl dimethoxy silane, phenyl diethoxy silane, phenyl methyl diethoxy silane, phenyl dimethyl ethoxy silane, benzyl triethoxy silane, benzyl trimethoxy silane, benzyl methyl dimethoxy silane, benzyl dimethyl methoxy silane, benzyl dimethoxy silane, benzyl diethoxy silane, benzyl methyl diethoxy silane, benzyl dimethyl ethoxy silane, 3-acetoxy propyl trimethoxy silane, 3-acryloxy propyl trimethoxy silane, allyl trimethoxy silane, allyl triethoxy silane, 4-aminobutyl triethoxy silane, (aminoethyl aminomethyl) phenethyl trimethoxy silane, N-(2-aminoethyl)-3-aminopropyl methyl dimethoxy silane, N-(2-aminoethyl)-3-aminopropyl trimethoxy silane, 6-(aminohexyl aminopropyl) trimethoxy silane, p-aminophenyl trimethoxy silane, p-aminophenyl ethoxy silane, m-aminophenyl trimethoxy silane, m-aminophenyl ethoxy silane, 3-aminopropyl trimethoxy silane, 3-aminopropyl triethoxy silane, ω-aminoundecyl trimethoxy silane, amyltriethoxy silane, benzoxasilepin dimethyl ester, 5-(bicycloheptenyl) triethoxy silane, bis(2-hydroxyethyl)-3-aminopropyl triethoxy silane, 8-bromooctyl trimethoxy silane, bromophenyl trimethoxy silane, 3-bromopropyl trimethoxy silane, n-butyl trimethoxy silane, 2-chloromethyl triethoxy silane, chloromethyl methyl diethoxy silane, chloromethyl methyl diisopropoxy silane, p-(chloromethyl)phenyl trimethoxy silane, chloromethyl triethoxy silane, chlorophenyl triethoxy silane, 3-chloropropyl methyl dimethoxy silane, 3-chloropropyl triethoxy silane, 3-chloropropyl trimethoxy silane, 2-(4-chlorosulfonyl phenyl) ethyl trimethoxy silane, 2-cyanoethyl triethoxy silane, 2-cyanoethyl trimethoxy silane, cyanomethyl phenethyl triethoxy silane, 3-cyanopropyl triethoxy silane, 2-(3-cyclohexenyl) ethyl trimethoxy silane, 2-(3-cyclohexenyl) ethyl triethoxy silane, 3-cyclohexenyl trichloro silane, 2-(3-cyclohexenyl) ethyl trichloro silane, 2-(3-cyclohexenyl) ethyl dimethyl chloro silane, 2-(3-cyclohexenyl)ethyl methyl dichloro silane, cyclohexyl dimethyl chloro silane, cyclohexyl ethyl dimethoxy silane, cyclohexyl methyl dichloro silane, cyclohexyl methyl dimethoxy silane, (cyclohexyl methyl) trichloro silane, cyclohexyl trichloro silane, cyclohexyl trimethoxy silane, cyclooctyl trichloro silane, (4-cyclooctenyl) trichloro silane, cyclopentyl trichloro silane, cyclopentyl trimethoxy silane, 1,1-diethoxy-1-silacyclopenta-3-ene, 3-(2,4-dinitrophenylamino) propyl triethoxy silane, (dimethyl chlorosilyl) methyl-7,7-dimethyl norpinane, (cyclohexyl aminomethyl) methyl diethoxy silane, (3-cyclopentadienyl propyl) triethoxy silane, N,N-diethyl-3-aminopropyl)trimethoxy silane, 2-(3,4-epoxycyclohexyl) ethyl trimethoxy silane, 2-(3,4-epoxycyclohexyl)ethyl triethoxy silane, (furfuryloxy methyl) triethoxy silane, 2-hydroxy-4-(3-triethoxy propoxy) diphenyl ketone, 3-(p-methoxy phenyl) propyl methyl dichloro silane, 3-(p-methoxy phenyl) propyl trichloro silane, p-(methyl phenethyl) methyl dichloro silane, p-(methyl phenethyl) trichloro silane, p-(methyl phenethyl) dimethyl chloro silane, 3-morpholino propyl trimethoxy silane, (3-glycidoxy propyl) methyl diethoxy silane, 3-glycidoxy propyl trimethoxy silane, 1,2,3,4,7,7,-hexachloro-6-methyl diethoxy silyl-2-norbornene, 1,2,3,4,7,7,-hexachloro-6-triethoxysilyl-2-norbornene, 3-iodo propyl trimethoxy silane, 3-isocyanate propyl triethoxy silane, (mercaptomethyl) methyl diethoxy silane, 3-mercaptopropyl methyl dimethoxy silane, 3-mercaptopropyl dimethoxy silane, 3-mercaptopropyl triethoxy silane, 3-methacryloxy propyl methyl diethoxy silane, 3-methacryloxy propyl trimethoxy silane, methyl {2-(3-trimethoxy silyl propylamino) ethylamino}-3-propionate, R—N-α-phenethyl-N'-triethoxy silyl propyl urea, S—N-α-phenethyl-N'-triethoxy silyl propyl urea, phenethyl trimethoxy silane, phenethyl methyl dimethoxy silane, phenethyl dimethyl methoxy silane, phenethyl dimethoxy silane, phenethyl diethoxy silane, phenethyl methyl dimethoxy silane, phenethyl dimethyl ethoxy silane, phenethyl triethoxy silane, (3-phenyl propyl) dimethyl chloro silane, (3-phenyl propyl) methyl dichloro silane, N-phenyl aminopropyl trimethoxy silane, N-(triethoxy silyl propyl) dansylamide, N-(3-triethoxy silyl propyl)-4,5-dihydroimidazole, 2-(triethoxy silyl ethyl)-5-(chloroacetoxy) bicycloheptane, (S)—N-triethoxy silyl propyl-O-mentcarbamate, 3-(triethoxy silyl propyl)-p-nitrobenzamide, 3-(triethoxy silyl) propyl succinic anhydride, N-[5-(trimethoxy silyl)-2-aza-1-oxo-pentyl] caprolactam, 2-(trimethoxysilyl ethyl) pyridine, N-(trimethoxy silyl ethyl) benzyl-N,N,N-trimethyl ammonium chloride, phenyl vinyl diethoxy silane, 3-thiocyanate propyl triethoxy silane, N-{3-(triethoxy silyl) propyl} phthalamic acid, 1-trimethoxy silyl-2-(chloromethyl) phenyl ethane, 2-(trimethoxy silyl) ethyl phenyl sulfonylazide, β-trimethoxy silyl ethyl-2-pyridine, trimethoxy silyl propyl diethylene triamine, N-(3-trimethoxy silyl propyl) pyrrole, N-trimethoxy silyl propyl-N,N,N-tributyl ammonium bromide, N-trimethoxy silyl propyl-N,N,N-tributyl ammonium chloride, N-trimethoxy silyl propyl-N,N,N-trimethyl ammonium chloride, vinyl methyl diethoxy silane, vinyl triethoxy silane, vinyl trimethoxy silane, vinyl methyl dimethoxy silane, vinyl dimethyl methoxy silane, vinyl dimethyl ethoxy silane, vinyl methyl dichloro silane, vinyl phenyl dichloro silane, vinyl phenyl diethoxy silane, vinyl phenyl dimethyl silane, vinyl phenyl methyl chloro silane, vinyl triphenoxy silane, vinyl tris-t-butoxy silane, adamantyl ethyl trichloro silane, allyl phenyl trichloro silane, 3-aminophenoxy dimethyl vinyl silane, phenyl trichloro silane, phenyl dimethyl chloro silane, phenyl methyl dichloro silane, benzyl trichloro silane, benzyl dimethyl chloro silane, benzyl methyl dichloro silane, phenethyl diisopropyl chloro silane, phenethyl trichloro silane, phenethyl dimethyl chloro silane, phenethyl methyl dichloro silane, 5-(bicycloheptenyl) trichloro silane, 2-(bicycloheptyl) dimethyl chloro silane, 2-(bicycloheptyl) trichloro silane, 1,4-bis(trimethoxy silyl ethyl) benzene, bromophenyl trichloro silane, 3-phenoxy propyl dimethyl chloro silane, 3-phenoxy propyl trichloro silane, t-butyl phenyl chloro silane, t-butyl phenyl methoxy silane, t-butyl phenyl dichloro silane, p-(t-butyl) phenethyl dimethyl chloro silane, p-(t-butyl) phenethyl trichloro silane, 1,3-(chloro dimethyl silyl methyl) heptacosane, ((chloromethyl) phenyl ethyl) dimethyl chloro silane, ((chloromethyl) phenyl ethyl) methyl dichloro silane, ((chloromethyl) phenyl ethyl) trichloro silane, ((chloromethyl) phenyl ethyl) trimethoxy silane, chlorophenyl trichloro silane, 2-cyanoethyl trichloro silane, 2-cyanoethyl methyl dichloro silane, 3-cyanopropyl methyl diethoxy silane, 3-cyanopropyl methyl dichloro silane, 3-cyanopropyl dimethyl ethoxy silane, and 3-cyanopropyl trichloro silane.

In addition, it is preferable that the fluorine-based silane compound (the fluorine-based surface treating agent) has a perfluoroalkyl structure ($C_nF_{2n+1}$). With this, it is possible to realize more excellent storage stability of the ultraviolet curable composition, and also realize more excellent glossiness and abrasion resistance of the printing unit of the recorded object manufactured by using the ultraviolet curable composition.

The fluorine-based silane compound having a perfluoroalkyl structure ($C_nF_{2n+1}$) can be expressed by formula (5) described below.

(in formula (5), $X^1$ is a hydrolysis group, an ether group, a chloro group, or a hydroxyl group, $R^2$ is an alkyl group having 1 to 4 of carbon atoms, and n is an integer in a range of 1 to 14, m is an integer in a range of 2 to 6, and a is an integer in a range of 1 to 3.)

Specific examples of a compound having such a structure includes $CF_3$—$CH_2CH_2$—$Si(OCH_3)_3$, $CF_3(CF_2)_3$—$CH_2CH_2$—$Si(OCH_3)_3$, $CF_3(CF_2)_5$—$CH_2CH_2$—$Si(OCH_3)_3$, $CF_3(CF_2)_5$—$CH_2CH_2$—$Si(OC_2H_5)_3$, $CF_3(CF_2)_7$—$CH_2CH_2$—$Si(OCH_3)_3$, $CF_3(CF_2)(OC_2H_5)_3$, $CF_3(CF_2)_3$—$CH_2CH_2$—$Si(CH_3)(OCH_3)_2$, $CF_3(CF_2)_7$—$CH_2CH_2$—$Si(CH_3)(OCH_3)_2$, $CF_3(CF_2)_8$—$CH_2CH_2$—$Si(CH_3)(OC_2H_5)_2$, and $CF_3(CF_2)_8$—$CH_2CH_2$—$Si(C_2H_5)(OC_2H_5)_2$.

In addition, as a fluorine-based silane compound, it is possible to use the compound having a perfluoroalkyl ether structure ($C_nF_{2n+1}O$) instead of the above-described perfluoroalkyl structure ($C_nF_{2n+1}$).

Examples of the fluorine-based silane compound having the perfluoroalkyl ether structure ($C_nF_{2n+1}O$) include a compound expressed in formula (6) described below.

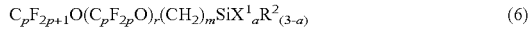

(in formula (6), $X^1$ is a hydrolysis group, an ether group, a chloro group, or a hydroxyl group, $R^2$ is an alkyl group having 1 to 4 of carbon atoms, and p is an integer in a range of 1 to 4, r is an integer in a range of 1 to 10, m is an integer in a range of 2 to 6, and a is an integer in a range of 1 to 3.)

Specific examples of a compound having such a structure include $CF_3O(CF_2O)_6$—$CH_2CH_2$—$Si(OC_2H_5)_3$, $CF_3O(C_3F_6O)_4$—$CH_2CH_2$—$Si(OCH_3)_3$, $CF_3O(C_3F_6O)_2(CF_2O)_3$—$CH_2CH_2$—$Si(OCH_3)_3$, $CF_3O(C_3F_6O)_8$—$CH_2CH_2$—$Si(OCH_3)_3$, $CF_3O(C_4F_9O)_5$—$CH_2CH_2$—$Si(OCH_3)_3$, $CF_3O(C_4F_9O)_5$—$CH_2CH_2$—$Si(CH_3)(OC_2H_5)_2$, and $CF_3O(C_3F_6O)_4$—$CH_2CH_2$—$Si(C_2H_5)(OCH_3)_2$.

As the fluorine-based phosphoric acid ester, it is possible to use phosphoric acid ester having at least one fluorine atom in the molecule.

Particularly, the fluorine-based phosphoric acid ester is preferably a compound having a chemical structure expressed in formula (3) described below.

(In formula (3), R represents $CF_3(CF_2)_m$—, $CF_3(CF_2)_m(CH_2)_l$—, $CF_3(CF_2)_m(CH_2O)_l$—, $CF_3(CF_2)_m(CH_2CH_2O)_l$—, $CF_3(CF_2)_mO$—, or $CF_3(CF_2)_m(CH_2)_lO$—, n is an integer in a range of 1 to 3, m is an integer in a range of 2 to 18, and l is an integer in a range of 1 to 18.)

With this, it is possible to make the storage stability of the ultraviolet curable composition particularly excellent, and to make the glossiness and the abrasion resistance the printing unit of the recorded object which is manufactured by using the ultraviolet curable composition particularly excellent.

In formula (3), m is preferably an integer in a range of 3 to 14, and is more preferably an integer in a range of 4 to 12. With this, the above-described effect is more remarkably exhibited.

In addition, in formula (3), l is preferably an integer in a range of 1 to 14, and is more preferably an integer in a range of 1 to 10. With this, the above-described effect is more remarkably exhibited.

In addition, the fluorine-based phosphoric acid ester (the surface treating agent) preferably has the perfluoroalkyl structure ($C_nF_{2n+1}$). With this, it is possible to realize more excellent storage stability of the ultraviolet curable composition, and also realize more excellent glossiness and abrasion resistance of the printing unit of the recorded object manufactured by using the ultraviolet curable composition.

As the fluorine-based fatty acid, a fatty acid containing at least one fluorine atom in the molecule can be used.

Examples of the fluorine-based fatty acid include $CF_3$—$CH_2CH_2$—COOH, $CF_3(CF_2)_3$—$CH_2CH_2$—COOH, $CF_3(CF_2)_5$—$CH_2CH_2$—COOH, $CF_3(CF_2)_6$—$CH_2CH_2$—COOH, $CF_3(CF_2)_7$—$CH_2CH_2$—COOH, $CF_3(CF_2)_9$—$CH_2CH_2$—COOH and esters thereof. Among them, $CF_3(CF_2)_5$—$CH_2CH_2$—COOH is preferably used. With this, it is possible to form a dense film by firmly bonding the fluorine-substituted fatty acid and a metal atom forming the base particle such as silicon, aluminum, magnesium, and titanium through a dehydration reaction due to heating, and thus it is possible to effectively decrease the surface energy of the particle.

As the fluorine-based isocyanate compound, it is possible to use a compound having at least one isocyanate group and at least one fluorine atom in the molecule.

As the fluorine-based isocyanate compound, for example, it is possible to use a compound having a chemical structure expressed by formula (2) described below.

(In formula (2), Rf is $CF_3(CF_2)_m$—, or $CF_3(CF_2)_m(CH_2)_l$—, m is an integer in a range of 2 to 18, and l is an integer in a range of 1 to 18.)

With this, it is possible to realize particularly excellent storage stability of the ultraviolet curable composition. In addition, in the recorded object which is manufactured by using the ultraviolet curable composition, it is possible to preferably arrange (leafing) metal powders in the vicinity of the outer surface of the printing unit, and to realize particularly excellent glossiness of the printing unit of the manufactured recorded object. Further, it is possible to realize particularly excellent abrasion resistance of the printing unit of the manufactured recorded object.

In formula (2), m is preferably an integer in a range of 3 to 14, and is more preferably an integer in a range of 4 to 12. With this, the above-described effect is more remarkably exhibited.

In addition, in formula (2), l is preferably an integer in a range of 1 to 14, and is more preferably an integer in a range of 1 to 10. With this, the above-described effect is more remarkably exhibited.

Further, a plurality of the fluorine-based surface treating agents may be used in combination. In such a case, the same particle may be subjected to the surface treatment by using the plurality of fluorine-based surface treating agent, and the metal powder may include a plurality of particles which are subjected to the surface treatment by using the different fluorine-based surface treating agent.

The above-described fluorine-based surface treating agent may be directly treated on the base particle, but it is preferable that the base particle is treated with an acid or a base, and then the base particle is treated with the s fluorine-based surface treating agent. With this, it is possible to more reliably perform modifications by chemical bonding through the fluorine-based surface treating agent on the surface of the base particle, and thus the above-described effect can be more remarkably exhibited. Examples of an acid include a protonic acid such as a hydrochloric acid, a sulfuric acid, a phosphoric acid, a nitric acid, an acetic acid, a carbonic acid, a formic acid, a benzoic acid, a chlorous acid, a hypochlorous acid, a sulfurous acid, a hyposulfurous acid, a nitrous acid, a hyponitrous acid, a hypophosphorous acid, a phosphorous acid, and a hypophosphorous acid. Among them, a hydrochloric acid, a phosphoric acid, and an acetic acid are preferably used. On the other hand, examples of the hydrochloric acid include sodium hydroxide, potassium hydroxide, and calcium hydroxide. Among them, sodium hydroxide and potassium hydroxide are preferably used.

In a case where the same particle is subjected to a plurality of types of surface treatments, the surface treatment may be performed by dividing a plurality of steps with respect to each surface treating agent, or in the same step, the surface treatment may be performed by the plurality of types of surface treating agents.

(Other Surface Treating Agents)

The metal powder may be subjected to the surface treatment by using the surface treating agent (other surface treating agents) except for the fluorine-based surface treating agent.

Examples of the surface treating agents include phosphoric acidalkyl ester, a silane compound (excepting for the fluorine-based silane compound), a fatty acid (excepting for the fluorine-based fatty acid), and an isocyanate compound (excepting for the fluorine-based isocyanate).

The particle forming metal powder may be of any shape, for example, a spherical shape, a spindle shape, a needle shape; however, a scaly shape is preferably used. With this, it is possible to arrange metal powders on the recording medium to which the ultraviolet curable composition is imparted such that the main surface of the particle is formed along the surface shape of the recording medium, to more effectively exhibit the glossiness which originally belongs to the metal material forming the metal powder, to realize particularly excellent glossiness and the sophisticated feelings of the pattern (the printing unit) in the obtained recorded object, and to realize particularly excellent abrasion resistance of the recorded object. In addition, in the configuration that the surface treatment is not performed by using the above-described the fluorine-based surface treating agent, in a case where the particle forming the metal powder is formed into the scaly shape, it is likely that the storage stability and the discharge stability of the ultraviolet curable composition is deteriorated, whereas in a case where the particle forming the metal powder is subjected to the surface treatment by using the fluorine-based surface treating agent, it is possible to reliably prevent the occurrence of such a problem even though the particle forming the metal powder is formed into the scaly shape. That is, in a case where the particle forming the metal powder is subjected to the surface treatment by using the fluorine-based surface treating agent, and is formed into the scaly shape, an effect resulting from this is synergistically exhibited, and thus it is possible to manufacture the recorded object particularly excellent in the glossiness and the sophisticated feelings with particularly excellent productivity.

In the invention, the scaly shape means a shape in which a projected area when the particle is observed at a predetermined angle (in a plan view) is larger than a region when the particle is observed at an angle orthogonal to the observation direction, such as a flat shape or a curved plate shape. Particularly, a ratio $(S_1/S_0)$ of an area $S_1$ [$\mu m^2$], which is the maximum projected area when the particle is observed in a plan view, to an area $S_0$ [$\mu m^2$], which is the maximum area of the projected areas obtained when observed from the direction orthogonal to the observation direction, is preferably equal to or greater than 2, more preferably equal to or greater than 5, and still more preferably equal to or greater than 8. These values can be obtained by optionally performing the observation for ten particles, and employing the average value of the values calculated for ten particles.

in a case where the particle forming the metal powder is formed into the scaly shape, the average thickness of the particle is preferably in a range of 10 nm to 100 nm, and more is preferably in a range of 20 nm to 80 nm. With this, the effect resulting from that the particle is formed into the scaly shape as described above is more remarkably exhibited.

The average particle size of the metal powder is preferably in a range of 500 nm to 3.0 $\mu$m, and is more preferably in a range of 800 nm to 2.5 $\mu$m. With this, it is possible to realize more excellent glossiness and sophisticated feelings of the recorded object manufactured by using the ultraviolet curable composition. In addition, it is possible to realize more excellent storage stability and discharge stability of the ultraviolet curable composition. Meanwhile, in the invention, the average particle size means a median size of a volume distribution which is obtained by measuring a particle dispersion through a laser diffraction method and a scattering method, and is a size of the particle which exactly indicates 50% of the median cumulative in a case where the measuring results for a plurality of particles are indicated as accumulation of abundance ratio for each size (the particle size).

In addition, the maximum particle size of metal powder is preferably equal to or less than 5 $\mu$m, and is more is preferably equal to or less than 4.5 $\mu$m. With this, it is possible to realize more excellent storage stability and discharge stability of the ultraviolet curable composition.

The content of the metal powder in the ultraviolet curable composition is preferably in a range of 0.9 mass % to 29 mass %, and is more preferably in a range of 1.2 mass % to 19.3 mass %.

<Fluorine-Containing Powder>

As described above, the ultraviolet curable composition of the invention contains the fluorine-containing powder. In addition, in the invention, the fluorine-containing powder is formed such that a region of the constituting particle includes at least a surface thereof formed of a material containing fluorine, and is a component except for the above-described metal powder.

It is preferable that the fluorine-containing powder has transparency in a state where the polymerizable compound for forming the ultraviolet curable composition is cured. With this, it is possible to realize particularly excellent aesthetic appearance of the recorded object manufactured by using the ultraviolet curable composition of the invention.

Meanwhile, the transmittance of visible light (transmittance of light having wavelength of 600 nm) in the thickness direction of a cured material having the thickness of 100 μm which is obtained by curing the ultraviolet curable composition having the same composition except that the metal powder is not contained is preferably equal to or greater than 85%, and more preferably equal to or greater than 90%. With this, it is possible to realize more excellent aesthetic appearance of the recorded object manufactured by using the ultraviolet curable composition of the invention. In addition, since the ultraviolet curable composition is likely to transmit the light for curing the polymerizable compound, the ultraviolet curable composition is easily cured even in the inside thereof in a uniform manner at the time of forming the recorded object, and thus it is possible to realize particularly excellent reliability of the obtained recorded object.

The constituting particle of the fluorine-containing powder may be formed such that a region including at least a surface is formed of a material containing fluorine; however, it is preferable that the constituting particle of the fluorine-containing powder includes at least one of a particle which is formed of a fluorine polymer or an inorganic fine particle which is treated by using the fluorine-based surface treating agent. With this, the surface energy of the constituting particle becomes particularly small, and the hydrophobic interaction between the constituting particle and the polymerizable compound which are included in the ultraviolet curable composition becomes particularly large. Thus, the particle is moved to gas-liquid interface so as to be easily stable, and the fluorine-containing powder which is ultimately obtained by through ultraviolet curing is easily fixed onto the surface of the recorded object, and thereby it is possible to realize particularly excellent abrasion resistance and durability of the recorded object. Accordingly, for example, even in a case where stronger frictional force is applied to the recorded object which is manufactured by using the ultraviolet curable composition, or a case where the friction is applied a number of times, it is possible to maintain an excellent aesthetic appearance.

Particularly, in a case where the fluorine-containing powder contains a particle which is formed of the fluorine polymer as a constituting particle, a specific gravity is approximately 1.7 to 2.2, which is lighter than the metal such as aluminum, and thus the fluidity in the ultraviolet curable composition is the same as that in metal powder, thereby effectively improving the abrasion resistance of the recorded object with less addition amount. In addition, in the manufacturing of the recorded object, it is possible to more effectively and unevenly distribute the fluorine-containing powder in the vicinity of the outer surface of the printing unit, and it is possible to realize particularly excellent abrasion resistance of the printing unit and effectively prevent an appearance from being changed due to the friction (for example, deterioration of glossiness and aestheticity (aesthetic appearance) and the like). Further, since the fluorine-containing powder is more effectively and unevenly distributed in the vicinity of the outer surface of the printing unit, the above-described effect can be sufficiently exhibited even in a case where the content of the fluorine-containing powder of the entire printing unit is relatively low, and thus it is possible to increase the content of the component except for the fluorine-containing powder in the printing unit. As a result, it is possible to realize the improvement of the aesthetic appearance of the recorded object, and the improvement of mechanical strength and the durability of the recorded object.

In addition, in a case where the fluorine-containing powder contains the inorganic fine particle which is treated by using the fluorine-based surface treating agent as the constituting particle, the following effects can be obtained. That is, the inorganic fine particle has particularly high solidity and particularly high durability with respect to the extending due to heat or ultraviolet rays, and thus it is possible to preferably maintain the abrasion resistance for a long period of time.

In a case where the fluorine-containing powder contains a particle which is formed of the fluorine polymer as the constituting particle, examples of the fluorine polymer include polytetrafluoroethylene, a copolymer of tetrafluoroethylene and hexafluoropropylene, a copolymer of tetrafluoroethylene and ethylene, a copolymer of tetrafluoroethylene and perfluoroalkyl vinyl ether, polychlorotrifluoroethylene, and polyvinylidene fluoride. Among them, polytetrafluoroethylene is preferably used. With this, the surface energy of the fluorine-containing particle becomes particularly small, and thus it is possible to effectively improve the abrasion resistance of the recorded object with less addition amount.

In a case where the fluorine-containing powder contains the inorganic fine particle which is treated by using the fluorine-based surface treating agent as the constituting particle, examples of the constituting material of the inorganic fine particle (the base particle) include silica, alumina, titania, magnesium oxide, calcium oxide, mica, carbon black, glass, talc, aluminum hydroxide, magnesium hydroxide, asbestos, iron oxide, zinc oxide, calcium carbonate, barium sulfide, calcium sulfate, graphite, and boron.

Particularly, it is preferable that the inorganic fine particle (the base particle) is formed of a material of which at least a surface contains an oxide. With this, since the fluorine-based surface treating agent can be densely reacted, the surface energy of the constituting particle of the fluorine-containing powder becomes very small, and thus a number of fine particles are present on the surface of the recorded object with less addition amount, and the fixed particle can be formed into a convex shape at a sufficient height, thereby realizing particularly excellent abrasion resistance.

In addition, among the above-described materials, it is particularly preferable that the inorganic fine particle (the base particle) is one or two or more types selected from the group consisting of silica, alumina, and titania. With this, it is possible to make the constituting particle of the fluorine-containing powder more rigid, and even in a case where the content of the fluorine-containing powder in the ultraviolet curable composition is set to be even lower such that the treatment is easily performed by using the fluorine-based surface treating agent, and a surface treatment can be performed with higher minute density, it is possible to realize sufficiently excellent abrasion resistance and durability of the recorded object manufactured by using the ultraviolet curable composition. Further, it is possible to realize particularly high transparency of the fluorine-containing powder, and thus it is possible to realize more reliably excellent aesthetic appearance of the recorded object manufactured by using the ultraviolet curable composition.

Particularly, in a case where the base particle (inorganic fine particle) is formed of silica, the following effect can be obtained. That is, the silica is a material which has high reactivity with the fluorine-based silane compound as the fluorine-based surface treating agent, has particularly high transparency, and has high solidity (Mohs hardness of 7). For this reason, in the recorded object manufactured by using the ultraviolet curable composition, it is possible to realize more excellent abrasion resistance and durability. In addition, it is possible to realize more reliably excellent aesthetic appearance of the recorded object manufactured by using the ultraviolet curable composition. In addition, the silica is inexpensive and has high versatility, and thus is preferably used from the aspect that manufacturing cost of the ultraviolet curable composition and the recorded object is reduced and the ultraviolet curable composition and the recorded object are stably supplied.

In addition, in a case where the base particle is formed of alumina, the following effect can be obtained. That is, the alumina is a material which has high reactivity with the fluorine-based silane compound as the fluorine-based surface treating agent, has particularly high transparency, and has high solidity (Mohs hardness of 9). For this reason, in the recorded object manufactured by using the ultraviolet curable composition, it is possible to realize more excellent abrasion resistance and durability. In addition, it is possible to realize more reliably excellent aesthetic appearance of the recorded object manufactured by using the ultraviolet curable composition. In addition, the alumina is inexpensive and has high versatility, and thus is preferably used from the aspect that manufacturing cost of the ultraviolet curable composition and the recorded object is reduced and the ultraviolet curable composition and the recorded object are stably supplied.

In addition, in a case where the base particle is formed of titania, the following effect can be obtained. That is, the titania is a material which has particularly high transparency and has high solidity (Mohs hardness of 7 to 7.5). For this reason, in the recorded object manufactured by using the ultraviolet curable composition, it is possible to realize more excellent abrasion resistance and durability. In addition, it is possible to realize more reliably excellent aesthetic appearance of the recorded object manufactured by using the ultraviolet curable composition. Further, the titania is inexpensive and has high versatility, and thus is preferably used from the aspect that manufacturing cost of the ultraviolet curable composition and the recorded object is reduced and the ultraviolet curable composition and the recorded object are stably supplied. In addition, the titania has very high stability and high resistance to a reactive gas such as hydrogen fluoride, hydrogen sulfide, $SO_3$, and chlorine.

In a case where the fluorine-containing powder contains the inorganic fine particle which is treated by using the fluorine-based surface treating agent as the constituting particle, examples of the fluorine-based surface treating agent include a fluorine-based silane compound, fluorine-based phosphoric acid ester, a fluorine-based fatty acid, and fluorine-based isocyanate. Among them, it is preferable to use one or two or more types selected from the group consisting of the fluorine-based silane compound, the fluorine-based phosphoric acid ester, the fluorine-based fatty acid, and the fluorine-based isocyanate. With this, it is possible to effectively disperse the inorganic fine particles which have different size and solidity, in the ultraviolet curable composition. Further, it is possible to realize particularly excellent abrasion resistance of the recorded object manufactured by using the ultraviolet curable composition.

Particularly, in a case of using the fluorine-based silane compound, the fluorine-based silane compound has high reactivity to silica and alumina, and thus it is possible to easily prepare the fluorine-containing powder. In addition, in a case of using the fluorine-based silane compound, it is possible to realize particularly excellent bonding force to the base particle, and it is possible to realize particularly excellent abrasion resistance and durability of the recorded object manufactured by using the ultraviolet curable composition. In addition, it is possible to realize particularly excellent weather resistance of the recorded object.

Further, in a case of using the fluorine-based phosphoric acid ester, it is possible to effectively perform the surface treatment by using the inorganic fine particle which is formed of an iron oxide, aluminum, and alumina. In addition, the surface treating agent of the phosphoric acid ester is resistant to an acid, and thus the obtained recorded object exhibits the excellent durability and weather resistance even in an acidic environment.

Further, in a case of using the fluorine-based fatty acid, the fluorine-based fatty acid has high reactivity to calcium carbonate and titania, and thus it is possible to easily prepare the fluorine-containing powder. In addition, in a case of using the fluorine-based fatty acid, it is possible to realize particularly excellent bonding force to the base particle, and it is possible to realize particularly excellent abrasion resistance and durability of the recorded object manufactured by using the ultraviolet curable composition.

In addition, in a case of using the fluorine-based isocyanate, it is possible to realize particularly excellent bonding force of the base particle (inorganic fine particle) to the surface treating agent. For this reason, it is possible to realize particularly excellent abrasion resistance and durability of the recorded object manufactured by using the ultraviolet curable composition.

Specific example of the fluorine-based silane compound, the fluorine-based phosphoric acid ester, the fluorine-based fatty acid, and the fluorine-based isocyanate include a material described as the fluorine-based surface treating agent which is used to perform the surface treatment for the constituting particle of the metal powder.

In addition, in the ultraviolet curable composition of the invention, the content of the fluorine-containing powder is in a range of 0.010 mass % to 5.0 mass %. With this, it is possible to realize excellent glossiness and abrasion resistance of the printing unit which is formed by using the ultraviolet curable composition. In contrast, if the content of the fluorine-containing powder is lower than the lower limit value, it is not possible to realize sufficiently excellent abrasion resistance of the recorded object manufactured by using the ultraviolet curable composition, and scratches are generated due to the friction and thus the glossiness is deteriorated. In addition, if the content of the fluorine-containing powder is greater than the upper limit value, the fluorine-containing powders which are present on the surface of the recorded object manufactured by using the ultraviolet curable composition are relatively increased, and thereby it is not possible to sufficiently exhibit the glossiness of the metal powder.

As described above, the content of the fluorine-containing powder in the ultraviolet curable composition may be in a range of 0.010 mass % to 5.0 mass %, but is preferably in a range of 0.10 mass % to 3.0 mass %, and is more preferably in a range of 0.20 mass % to 2.0 mass %. With this, the above-described effect is remarkably exhibited.

The particle forming the fluorine-containing powder may be formed into any shape, for example, a spherical shape, a spindle shape, a needle shape (rod shape), and a scaly shape, but the spherical shape is preferably used. With this, it is possible to realize particularly excellent abrasion resistance of the recorded object manufactured by using the ultraviolet curable composition. In addition, in a case where the particle for forming the fluorine-containing powder is formed into the spindle shape or the rod shape, since the specific surface area of the particle for forming the fluorine-containing powder becomes larger, the ultraviolet curable composition which is imparted onto the recording medium is easily floated, and thus it is possible to more preferably arrange the fluorine-containing powders in the vicinity of the outer surface of the printing unit, thereby realizing the excellent abrasion resistance even in a case of relatively low content. Further, in a case where the particle for forming the fluorine-containing powder is formed into the spindle shape, when the long axis direction of the spindle shape is oriented and comes in contact with the surface thereof in an equilibrium state, the area becomes wider, and the particle is cured and fixed in a state of being deeply put into the recorded object. With this, it is possible to obtain the effect of enhancing the abrasion resistance of the recorded object.

The average particle size of the fluorine-containing powder is preferably in a range of 10 nm to 300 nm, and is more preferably in a range of 50 nm to 200 nm. If the average particle size of the fluorine-containing powder is within the above-described range, in the ultraviolet curable composition, the fluorine-containing powder has the size in a range in which the dispersion can be performed to the extent that does not cause the sedimentation for a long period of time, and the height of the convex fluorine-containing powder which is formed on the surface of the obtained recorded object can be set to be sufficiently higher than the surface on which the metal powder is formed, and thereby it is possible to realize particularly excellent abrasion resistance. In contrast, if the average particle size of the fluorine-containing powder is lower than the lower limit value, it is difficult to set the height of the convex fluorine-containing powder which is formed on the surface of the obtained recorded object to be sufficiently higher than the surface on which the metal powder is formed, and thereby it is less likely to realize sufficiently excellent abrasion resistance. Further, in order to enhance the abrasion resistance, it is considered that the content of the fluorine-containing powder is increased in the ultraviolet curable composition; however, in this case, there is a possibility of deteriorating the glossiness of the recorded object. In addition, if the average particle size of the fluorine-containing powder is greater than the upper limit value, the storage stability of the ultraviolet curable composition and the dispersion stability of the fluorine-containing powder are deteriorated, and thus the sedimentation of the constituting particle of the fluorine-containing powder is accelerated, and deviation is caused in the concentration distribution of the fluorine-containing powder in the ultraviolet curable composition in relatively short time. For this reason, there is a possibility that it is difficult to uniformly form the recorded object, or it is difficult to perform ink jet discharge.

When the thickness of the metal powder is set as $T_M$ [μm], and the average particle size of the fluorine-containing powder is set as $D_F$ [μm], it is preferable to satisfy a relationship expressed by $1.5 \le D_F/T_M \le 40$, and it is more preferable to satisfy a relationship expressed by $2 \le D_F/T_M \le 30$. With this, even in a case where the content of the fluorine-containing powder is relatively low, it is possible to effectively reduce the friction of the recorded object, and thus the abrasion resistance is further improved.

When the content of the metal powder in the ultraviolet curable composition is set as $X_M$ [mass %], and the content of the fluorine-containing powder is set as $X_F$ [mass %], it is preferable to satisfy a relationship expressed by $0.05 \le X_F/X_M \le 1.0$, and it is more preferable to satisfy a relationship expressed by $0.1 \le X_F/X_M \le 0.8$. With this, in the recorded object manufactured by using the ultraviolet curable composition, it is possible to realize both of the glossiness and the abrasion resistance at a high level.

In a case where the metal powder contains the particle which is treated by using the surface treating agent, and the fluorine-containing powder contains the inorganic fine particle which is treated by using the fluorine-based surface treating agent, as the constituting particle, the fluorine-based surface treating agent which is used for a surface treatment of the inorganic fine particle, and the fluorine-based surface treating agent which is used for a surface treatment of the constituting particle of the metal powder may be the same surface treating agent. With this, since surface properties (surface energy, charging state, and the like) of both of the metal powder and the fluorine-containing powder are similar to each other, dispersion stability of the metal powder and the fluorine-containing powder in the ultraviolet curable composition becomes particularly excellent, and thereby it is possible to more effectively prevent an increase in the viscosity and the particle size for a long period of time. In addition, in the recorded object manufactured by using the ultraviolet curable composition, it is possible for the metal powder and the fluorine-containing powder to more reliably exist in a uniform manner in a planar view of the printing unit (it is possible to more reliably prevent the printing unit from being divided into a region in which the metal powders are unevenly distributed and a region in which the fluorine-containing powders are unevenly distributed in a planar view of the printing unit), and it is possible to realize the excellent aesthetic appearance and abrasion resistance of the recorded object in a stable manner.

<Polymerizable Compound>

The polymerizable compound is a component which is polymerized by being irradiated with an ultraviolet ray, and cured. By containing such a component, it is possible to realize excellent abrasion resistance, water resistance, and solvent resistance of the recorded object which is manufactured by using the ultraviolet curable composition.

It is preferable that the polymerizable compound is in a liquid state, and functions as a dispersion medium for dispersing the metal powder and the fluorine-containing powder in the ultraviolet curable composition. With this, it is not necessary to use a dispersion medium which is removed (evaporated) in the manufacturing process of the recorded object and also it is not necessary to provide a step of removing a dispersion medium in the manufacture of the recorded object, and thus it is possible to realize particularly excellent productivity of the recorded object. In addition, as a dispersion medium, it is not necessary to use a dispersion medium which is generally used as an organic solvent, and thus it is possible to prevent the problem of the volatile organic compound (VOC). In addition, by containing the polymerizable compound, it is possible to realize excellent adhesive properties of the printing unit which is formed by using the ultraviolet curable composition with respect to various types of the recording media (the base materials).

That is, by containing the polymerizable compound, the ultraviolet curable composition is excellent in the media correspondence.

The polymerizable compound may be a component which is polymerized by being irradiated with an ultraviolet ray, and it is possible to use, for example, various monomers, various oligomers (containing dimers, trimers, and the like), and the like; however, it is preferable that the ultraviolet curable composition contains at least a monomer component as a polymerizable compound. A monomer is a component which generally has a low viscosity as compared with an oligomer component and the like, and thus has an advantage in terms of particularly excellent discharge stability of the ultraviolet curable composition.

Particularly, it is preferable that the ultraviolet curable composition contains a monomer having an alicyclic structure as the polymerizable compound. With the ultraviolet curable composition containing a monomer having an alicyclic structure, the metal powder (particularly, the metal powder which is subjected to the surface treatment by using the fluorine-based surface treating agent as described above), and the fluorine-containing powder, it is possible to realize particularly excellent storage stability of the ultraviolet curable composition, and to realize particularly excellent glossiness and abrasion resistance of the printing unit of the recorded object which is manufactured by using the ultraviolet curable composition.

It is considered that the aforementioned excellent effect can be obtained by the following reasons. That is, by containing a monomer having an alicyclic structure, it is possible to realize particularly excellent dispersion stability of the metal powder (particularly, the metal powder which is subjected to the surface treatment by using the fluorine-based surface treating agent as described above) in the ultraviolet curable composition, and the fluorine-containing powder, and it is possible to preferably prevent the occurrence of the aggregation and sedimentation of the metal powder and the fluorine-containing powder in the ultraviolet curable composition for a long period of time. In addition, such an effect synergistically interacts with the effect resulting from the metal powder and the fluorine-containing powder, and thereby it is possible to realize particularly excellent storage stability of the ultraviolet curable composition, and to realize particularly excellent glossiness and abrasion resistance of the printing unit of the recorded object manufactured by using the ultraviolet curable composition.

Examples of a monomer having an alicyclic structure include tris(2-(meth)acryloyloxyethyl) isocyanurate, dicyclopentenyl oxyethyl (meth)acrylate, adamantyl (meth)acrylate, γ-butyrolactone (meth)acrylate, N-vinyl caprolactam, N-vinyl pyrrolidone, pentamethyl piperidyl (meth)acrylate, tetramethyl piperidyl (meth)acrylate, 2-methyl-2-adamantyl (meth)acrylate, 2-ethyl-2-adamantyl (meth)acrylate, lactone mevalonate (meth)acrylate, dimethylol tricyclodecane di(meth)acrylate, dimethylol dicyclopentane di(meth)acrylate, dicyclopentenyl (meth)acrylate, dicyclopentanyl (meth)acrylate, isobornyl (meth)acrylate, cyclohexyl (meth) acrylate, (meth)acryloyl morpholine, tetrahydrofurfuryl (meth)acrylate, phenyl glycidyl ether (meth)acrylate, EO-modified hydrogenated bisphenol A di(meth)acrylate, di(meth)acrylated isocyanurate, and tri(meth)acrylated isocyanurate, and one or two or more types selected from the group consisting of tris(2-acryloyloxyethyl)isocyanurate, dicyclopentenyl oxyethyl acrylate, adamantyl acrylate, γ-butyrolactone acrylate, N-vinyl caprolactam, N-vinyl pyrrolidone, pentamethyl piperidyl acrylate, tetramethyl piperidyl acrylate, 2-methyl-2-adamantyl acrylate, 2-ethyl-2-adamantyl acrylate, cyclohexane spiro-2-(1,3-dioxolan-4-yl) methyl acrylate, (2-methyl-2-ethyl-1,3-dioxolan-4-yl) methyl acrylate, mevalonic acid lactone acrylate, dimethylol tricyclodecane diacrylate, dimethylol dicyclopentane diacrylate, dicyclopentenyl acrylate, dicyclopentanyl acrylate, isobornyl acrylate, cyclohexyl acrylate, acryloyl morpholine, and tetrahydrofurfuryl acrylate are preferable. With this, it is possible to realize more excellent glossiness and sophisticated feelings of the recorded object which is manufactured by using the ultraviolet curable composition. In addition, it is possible to realize more excellent storage stability and discharge stability of the ultraviolet curable composition.

Among them, in a case where the monomer contains one or two or more types selected from the group consisting of acryloyl morpholine, tetrahydrofurfuryl acrylate, γ-butyrolactone acrylate, N-vinyl caprolactam, and N-vinylpyrrolidone, it is possible to realize more excellent dispersion stability of metal powder and fluorine-containing powder in the ultraviolet curable composition and in the recorded object manufactured by using the ultraviolet curable composition, it is possible to more preferably arrange metal powders in the vicinity of the outer surface of the printing unit, and thus it is possible to realize more excellent glossiness of the obtained recorded object.

In addition, from a view point of further improving the curing rate of the ultraviolet curable composition when being irradiated with an ultraviolet ray and the productivity of the recorded object, the monomer preferably contains one or two or more types selected from the group consisting of tris(2-acryloyloxyethyl) isocyanurate, dicyclopentenyl oxyethyl acrylate, γ-butyrolactone acrylate, N-vinyl pyrrolidone, dimethylol tricyclodecane diacrylate, dimethylol dicyclopentane diacrylate, dicyclopentenyl acrylate, dicyclopentanyl acrylate, acryloyl morpholine, and tetrahydrofurfuryl acrylate, more preferably contains acryloyl morpholine, and (or) γ-butyrolactone acrylate, and still more preferably contains γ-butyrolactone acrylate.

In addition, in a case where the monomer contains one or two or more types selected from the group consisting of cyclohexyl acrylate, tetrahydrofurfuryl acrylate, and benzyl acrylate, it is possible to realize more excellent flexibility of the printing unit which is formed by curing the ultraviolet curable composition.

Further, from a view point of further improving the abrasion resistance of the printing unit which is formed by curing the ultraviolet curable composition, the monomer preferably contains one or two or more types selected from the group consisting of tris(2-acryloyloxyethyl) isocyanurate, dicyclopentenyl oxyethyl acrylate, adamantyl acrylate, γ-butyrolactone acrylate, N-vinyl caprolactam, N-vinyl pyrrolidone, dimethylol tricyclodecane diacrylate, dimethylol dicyclopentane diacrylate, dicyclopentenyl acrylate, dicyclopentanyl acrylate, isobornyl acrylate, and acryloyl morpholine, and the monomer more preferably contains γ-butyrolactone acrylate and/or N-vinyl caprolactam.

In addition, in a case where the monomer contains one or two or more types selected from the group consisting of γ-butyrolactone acrylate, N-vinyl caprolactam, N-vinyl pyrrolidone, isobornyl acrylate, and tetrahydrofurfuryl acrylate, the shrinkage rate at the time of curing the ultraviolet curable composition becomes smaller, and thereby it is possible to further effectively prevent the glossiness from being deteriorated caused by the occurrence of involuntary wrinkle in the printing unit which is formed by curing the ultraviolet curable composition.

The content of the monomer having an alicyclic structure in the ultraviolet curable composition is preferably in a range of 40 mass % to 90 mass %, is more is preferably in a range of 50 mass % to 88 mass %, and is still more is preferably in a range of 55 mass % to 85 mass %. With this, it is possible to realize particularly excellent dispersion stability of the metal powder and the fluorine-containing powder, and to obtain particularly excellent discharge stability for a long period of time. Particularly, even in a case where the ultraviolet curable composition does not contain the dispersing agent, the above described excellent effect can be obtained. In contrast, in a case where the content of the monomer having an alicyclic structure is lower than the lower limit value in the ultraviolet curable composition, the dispersion stability of the metal powder and the fluorine-containing powder is deteriorated, and thus it is likely that the stability of liquid discharge through the ink jet method is deteriorated. In addition, in this case, it is also likely that the stability of the liquid discharge of the ultraviolet curable composition is deteriorated over time. Further, in a case where the content of the monomer having an alicyclic structure is greater than the upper limit value in the ultraviolet curable composition, the dispersion stability of the metal powder and the fluorine-containing powder is excessively improved, and thus in the ultraviolet curable composition which is imparted to the recording medium, the rate of metal powders present in the inside thereof is increased, and it is difficult to preferably arrange the metal powders and the fluorine-containing powders in the vicinity of the outer surface of the imparted ultraviolet curable composition. Therefore, it may be difficult to realize sufficiently excellent glossiness and abrasion resistance of the ultimately obtained recorded object (the printing unit). Meanwhile, the ultraviolet curable composition may contain two or more types of compounds as the monomer having an alicyclic structure. In this case, it is preferable that the total contents thereof are within the above-described range of value.

In the monomer having an alicyclic structure, the number of constituting atoms of a ring structure formed by a covalent bond is preferably equal to or greater than 5, and is more preferably equal to or greater than 6. With this, it is possible to make the storage stability of the ultraviolet curable composition particularly excellent.

The ultraviolet curable composition preferably contains the monofunctional monomer containing a hetero atom in the alicyclic structure (monofunctional monomer having a heterocycle that does not exhibit aromaticity) as a monomer having an alicyclic structure. With this, it is possible to realize particularly excellent dispersion stability of the metal powder and the fluorine-containing powder, and to obtain particularly excellent discharge stability for a long period of time. Particularly, even in a case where the ultraviolet curable composition does not contain a dispersant, the above-described excellent effects can be obtained. Examples of such a monofunctional monomer include tris(2-(meth)acryloyloxy ethyl) isocyanurate, γ-butyrolactone(meth)acrylate, N-vinyl caprolactam, N-vinyl pyrrolidone, pentamethyl piperidyl (meth)acrylate, tetramethyl piperidyl (meth)acrylate, mevalonic acid lactone (meth)acrylate, (meth)acryloyl morpholine, and tetrahydrofurfuryl (meth)acrylate.

The content of monofunctional monomer (the monofunctional monomer containing a hetero atom in the alicyclic structure) in the ultraviolet curable composition is preferably in a range of 10 mass % to 80 mass %, and is more preferably in a range of 15 mass % to 75 mass %. With this, it is possible to suppress the cure shrinkage, and thus it is possible to preferably use the ultraviolet curable composition to manufacture the recorded object including the pattern (the printing unit) which has less scattering and is further excellent in the glossiness. In addition, the ultraviolet curable composition may contain two or more types of compounds as a monofunctional monomer containing a hetero atom in the alicyclic structure. In this case, it is preferable that the sum total of these contents is within the above range.

In the invention, the polymerizable compound forming the ultraviolet curable composition may contain a monomer that does not contain an alicyclic structure.

Examples of such a monomer (the monomer that does not contain the alicyclic structure) includes phenoxyethyl (meth)acrylate, benzyl (meth)acrylate, (meth)acrylic acid 2-(2-vinyloxy ethoxy)ethyl, dipropylene glycol di(meth)acrylate, tripropylene glycol di(meth)acrylate, 2-hydroxy3-phenoxy propyl (meth)acrylate, and 4-hydroxybutyl (meth)acrylate lauryl (meth)acrylate, 2-methoxyethyl (meth)acrylate, isooctyl (meth)acrylate, stearyl (meth)acrylate, 2-ethoxyethyl (meth)acrylate, 1H,1H,5H-octafluoropentyl (meth)acrylate, 2-hydroxyethyl (meth)acrylate, 2-hydroxypropyl (meth)acrylate, isobutyl (meth)acrylate, t-butyl (meth)acrylate, ethyl carbitol (meth)acrylate, 2,2,2-trifluoroethyl (meth)acrylate, 2,2,3,3-tetrafluoro propyl (meth)acrylate, methoxy triethylene glycol (meth)acrylate, PO-modified nonylphenol (meth)acrylate, EO-modified nonylphenol (meth)acrylate, EO-modified 2-ethylhexyl (meth)acrylate, phenoxy diethylene glycol (meth)acrylate, EO modified phenol (meth)acrylate, EO-modified cresol (meth)acrylate, methoxypolyethylene glycol (meth)acrylate, dipropylene glycol (meth)acrylate, 2-n-butyl-2-ethyl-1,3-propanediol di(meth)acrylate, tetraethylene glycol di(meth)acrylate, 1,9-nonane diol di(meth)acrylate, 1,4-butanediol di(meth)acrylate, bisphenol A EO-modified di(meth)acrylate, 1,6-hexanediol di(meth)acrylate, polyethylene glycol 200 di(meth)acrylate, polyethylene glycol 300 di(meth)acrylate, neopentyl glycol hydroxy pivalate closed (meth)acrylate, 2-ethyl-2-butyl-propanediol di(meth)acrylate, polyethylene glycol 400 di(meth)acrylate, polyethylene glycol 600 di(meth)acrylate, polypropylene glycol di(meth)acrylate, PO-modified bisphenol A di(meth)acrylate, trimethylolpropane tri(meth)acrylate, pentaerythritol tri(meth)acrylate, trimethylolpropane EO-modified tri(meth)acrylate, glycerin PO added tri(meth)acrylate, tris(meth)acryloyloxyethyl phosphate, pentaerythritol tetra (meth)acrylate, PO-modified trimethylolpropane tri(meth)acrylate, 2-(meth)acryloyloxyethyl phthalate, 3-(meth)acryloyloxy acrylate, ω-carboxy (meth)acryloyloxyethyl phthalate, ditrimethylolpropane tetra(meth)acrylate, dipentaerythritol penta or hexa (meth)acrylate, and dipentaerythritol hexa (meth)acrylate. Among them, a monomer containing one or two or more types selected from the group consisting of phenoxyethyl acrylate, benzyl acrylate, acrylic acid 2-(2-vinyloxy ethoxy) ethyl, dipropylene glycol diacrylate, tripropylene glycol diacrylate, 2-hydroxy3-phenoxy propyl acrylate, and 4-hydroxybutyl acrylate is preferably used. With the ultraviolet curable composition containing such a monomer that does not have an alicyclic structure in addition to a monomer having an alicyclic structure, it is possible to realize excellent storage stability and discharge stability of the ultraviolet curable composition, to realize particularly excellent reactivity of the ultraviolet curable composition after being discharged by the ink jet method, to realize particularly excellent productivity of the recorded object, and to realize particularly excellent abrasion resistance and the like of the formed pattern.

Among them, in a case where the monomer contains phenoxyethylacrylate, in the recorded object which is manufactured by using the ultraviolet curable composition, it is possible to further preferably arrange the metal powders in the vicinity of the outer surface of the printing unit, and to realize more excellent glossiness of the obtained recorded object. In addition, in the recorded object which is manufactured by using the ultraviolet curable composition, it is possible to further preferably arrange the fluorine-containing powders in the vicinity of the outer surface of the printing unit, and to realize more excellent abrasion resistance of the obtained recorded object.

In addition, in a case where the monomer contains 2-(2-vinyloxyethoxy) ethyl acrylate, it is possible to realize more excellent curing rate of the ultraviolet curable composition at the time of being irradiated with an ultraviolet ray, and to realize more excellent productivity of the recorded object.

In addition, in a case where the monomer contains phenoxyethylacrylate, and (or), 2-hydroxy3-phenoxy propyl acrylate, it is possible to realize more excellent flexibility of the printing unit which is formed by curing the ultraviolet curable composition.

In addition, from a view point of further improving the abrasion resistance of the printing unit which is formed by curing the ultraviolet curable composition, the monomer preferably contains one or two or more types selected from the group consisting of 2-(2-vinyloxyethoxy) ethyl acrylate, dipropylene glycol diacrylate, and tripropylene glycol diacrylate, and more preferably contains 2-(2-vinyloxyethoxy) ethyl acrylate.

Further, in a case where the monomer contains phenoxyethylacrylate, the shrinkage rate at the time of curing the ultraviolet curable composition becomes smaller, and thereby it is possible to further effectively prevent the glossiness from being deteriorated caused by the occurrence of involuntary wrinkle in the printing unit which is formed by curing the ultraviolet curable composition.

The content of the monomer other than the monomer having an alicyclic structure in the ultraviolet curable composition is preferably in a range of 5 mass % to 50 mass %, and is more preferably in a range of 10 mass % to 40 mass %. With this, it is easier to adjust the curing rate, the flexibility, the shrinkage rate at the time of curing, or the like of the ultraviolet curable composition. In addition, the ultraviolet curable composition may contain two or more types of compounds as a monomer that does not contain the alicyclic structure. In this case, it is preferable that the sum total of these contents is within the above range.

The ultraviolet curable composition may contain as the polymerizable compound, an oligomer (containing dimers, trimers, and the like), a prepolymer, and the like in addition to a monomer. As the oligomer and the prepolymer, for example, it is possible to use the oligomer and the prepolymer which have the above-described monomer as a constituting component. It is particularly preferable that the ultraviolet curable composition contains a polyfunctional oligomer. With this, it is possible to realize excellent storage stability of the ultraviolet curable composition, and to realize particularly excellent abrasion resistance of the formed pattern. As the oligomer, a urethane oligomer in which a repeating structure is urethane, and an epoxy oligomer in which a repeating structure is epoxy are preferably used.

The content of the polymerizable compound in the ultraviolet curable composition is preferably in a range of 70 mass % to 99 mass %, and is more preferably in a range of 80 mass % to 98 mass %. With this, it is possible to realize more excellent storage stability, the discharge stability, the curability of the ultraviolet curable composition, and it is also possible to realize more excellent glossiness, the abrasion resistance, and the like of the recorded object which is manufactured by using the ultraviolet curable composition.

In addition, the ultraviolet curable composition may contain two or more types of compounds as the polymerizable compound. In this case, it is preferable that the sum total of these contents is within the above range.

<Substance A>

In addition, it is preferable that the ultraviolet curable composition of the invention contains a substance A having a partial structure expressed by formula (8) described below.

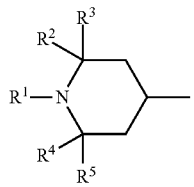

(8)

(In formula (8), $R^1$ represents an oxygen atom, a hydrogen atom, a hydrocarbon group, an alkoxyl group and each of $R^2$, $R^3$, $R^4$, and $R^5$ independently represents a hydrogen atom or a hydrocarbon group.)

When the ultraviolet curable composition contains the substance A having such a chemical structure with the metal powder and the fluorine-containing powder which are subjected to the surface treatment and a monomer having an alicyclic structure, it is possible to realize particularly excellent storage stability and curability of the ultraviolet curable composition. In addition, in the recorded object which is manufactured by using the ultraviolet curable composition, it is possible to further effectively exhibit the glossiness and the sophisticated feelings which originally belong to the metal material forming the metal powder, to realize particularly excellent glossiness and the abrasion resistance of the printing unit, and to realize particularly excellent durability of the recorded object.

In formula (8), $R^1$ is preferably an oxygen atom, a hydrogen atom, a hydrocarbon group, or an alkoxyl group (which is obtained by bonding a chain or alicyclic hydrocarbon group to an oxygen atom), and is particularly preferably a hydrogen atom, a methyl group, or an octyloxy group. With this, it is possible to realize more excellent storage stability and the discharge stability of the ultraviolet curable composition, and it is also possible to realize more excellent glossiness and the abrasion resistance of the printing unit which is manufactured by using the ultraviolet curable composition.

In addition, in formula (8), each of $R^2$ to $R^5$ may be independently a hydrogen atom or a hydrocarbon group; however, each of them is preferably an alkyl group having 1 to 3 carbon atoms, and is more preferably a methyl group. With this, it is possible to realize more excellent storage stability and the discharge stability of the ultraviolet curable composition, and it is also possible to realize more excellent glossiness and the abrasion resistance of the printing unit which is manufactured by using the ultraviolet curable composition.

The content of substance A in the ultraviolet curable composition is preferably in a range of 0.1 mass % to 5.0 mass %, and is more preferably in a range of 0.5 mass % to 3.0 mass %. With this, it is possible to realize more excellent storage stability, the discharge stability, the curability of the ultraviolet curable composition, and it is also possible to realize particularly excellent glossiness, abrasion resistance, and the like of the recorded object which is manufactured by using the ultraviolet curable composition. In addition, the ultraviolet curable composition may contain two or more types of compounds as the substance A. In this case, it is preferable that the sum total of these contents is within the above range.

In a case where the content of the substance A is set to be $X_A$ [mass %], and the content of the metal powder is set to be $X_M$ [mass %], it is preferable to satisfy a relationship expressed by $0.01 \leq X_A/X_M \leq 0.8$, and it is more preferable to satisfy a relationship expressed by $0.05 \leq X_A/X_M \leq 0.4$. When such a relationship is satisfied, it is possible to realize more excellent storage stability and discharge stability of the ultraviolet curable composition, and it is also possible to realize more excellent glossiness and abrasion resistance of the printing unit which is formed by using the ultraviolet curable composition.

<Dispersant>

The ultraviolet curable composition of the invention may contain a dispersant. With this, it is possible to realize more excellent dispersion stability of the metal powder and the fluorine-containing powder in the ultraviolet curable composition, and it is also possible to realize more excellent storage stability of the ultraviolet curable composition.

Particularly, the ultraviolet curable composition of the invention may contain those having a polymer structure with basicity (hereinafter, referred to as a "basic polymer dispersant") as a dispersant. With this, it is possible to realize more excellent storage stability of ultraviolet curable composition.

In addition, the basic polymer dispersant exhibits basicity, and the specific molecular weight thereof is not particularly limited as long as the basic polymer dispersant has a polymer structure.

The polymer structure forming a basic polymer dispersant is not particularly limited; however, examples thereof include an acryl-based polymer structure (including a copolymer), a methacryl-based polymer structure (including a copolymer), a polyurethane-based polymer structure, a hydroxyl group-containing carboxylic acid ester structure, a polyether-based polymer structure, and a silicone-based polymer structure.

An amine value of the basic polymer dispersant is not particularly limited; however, it is preferably in a range of 3 mgKOH/g to 80 mgKOH/g, and is more preferably in a range of 10 mgKOH/g to 70 mgKOH/g.

Specific examples of the basic polymer dispersant which can be used in the invention include DISPERBYK-116 (manufactured by BYK-Chemie Co., Ltd.), DISPERBYK-182 (manufactured by BYK-Chemie Co., Ltd.), DISPERBYK-183 (manufactured by BYK-Chemie Co., Ltd.), DISPERBYK-184 (manufactured by BYK-Chemie Co., Ltd.), DISPERBYK-2155 (manufactured by BYK-Chemie Co., Ltd.), DISPERBYK-2164 (manufactured by BYK-Chemie Co., Ltd.), DISPERBYK-108 (manufactured by BYK-Chemie Co., Ltd.), DISPERBYK-112 (manufactured by BYK-Chemie Co., Ltd.), DISPERBYK-198 (manufactured by BYK-Chemie Co., Ltd.), DISPERBYK-2150 (manufactured by BYK-Chemie Co., Ltd.), and PAA-1112 (manufactured by Nitto Boseki Co., Ltd.).

When the ultraviolet curable composition contains the dispersant, the content of the dispersant in the ultraviolet curable composition is preferably equal to or less than 5.0 mass %, and is more preferably in a range of 0.01 mass % to 2.0 mass %. With this, it is possible to realize sufficiently excellent glossiness of recorded object which is manufactured by using the ultraviolet curable composition, and to realize more excellent storage stability, discharge stability, and curability of the ultraviolet curable composition. In addition, the ultraviolet curable composition may contain two or more types of compounds as a basic polymer dispersant. In this case, it is preferable that the sum total of contents of these compounds is within the above range. Meanwhile, if the content of the dispersant is excessively high in the ultraviolet curable composition, the dispersion stability of the metal powder and the fluorine-containing powder is excessively improved, and thus the internal abundance ratio of the metal powder the fluorine-containing powder ultimately becomes increased in the ultraviolet curable composition which is imparted to the recording medium, it is difficult to preferably arrange the metal powders and the fluorine-containing powder in the vicinity of the outer surface of the imparted ultraviolet curable composition, and thus it may be difficult to realize sufficiently excellent glossiness and abrasion resistance of the ultimately obtained recorded object (the printing unit).

<Other Components>

The ultraviolet curable composition of the invention may contain other components except for the above-described components (other components). Examples of other components include a photopolymerization initiator, a slip agent (a leveling agent), a solvent, a polymerization accelerator, a polymerization inhibitor, a penetration enhancer, a wetting agent (a humectant), a colorant, an adhesion promoter, fungicide, an antiseptic agent, an antioxidant, a chelating agent, a thickening agent, and a sensitizer (sensitizing dye).

The photopolymerization initiator causes active species such as radical and cation by the irradiation of an ultraviolet ray, and is not particularly limited, as long as it is possible to cause the polymerization reaction of the above-described polymerizable compound to be initiated. As the photopolymerization initiator, a photo-radical polymerization initiator and a photo-cationic polymerization initiator can be used; however, the photo-radical polymerization initiator is preferably used. In a case where the photopolymerization initiator is used, the photopolymerization initiator preferably has an absorption peak in an ultraviolet area.

Examples of the photo-radical polymerization initiator include aromatic ketones, an acyl phosphine oxide compound, an aromatic onium salt compound, an organic peroxide, a thio compound (a thioxanthone compound, a thiophenyl group-containing compound, and the like), a hexaarylbiimidazole compound, a ketoxime ester compound, a borate compound, an azinium compound, a metallocene compound, an active ester compound, a compound having a carbon-halogen bond, and an alkyl amine compound.

Among them, from a view point of solubility and curability with respect to the polymerizable compound, the photo-radical polymerization initiator is preferably at least one selected from the acyl phosphine oxide compound and the thioxanthone compound, and is more preferably used by combining the acyl phosphine oxide compound and the thioxanthone compound.

Specific examples of the photo-radical polymerization initiator include acetophenone, acetophenone benzyl ketal, 1-hydroxycyclohexyl phenyl ketone, 2,2-dimethoxy-2-phenyl acetophenone, xanthone, fluorenone, benzaldehyde, fluorene, anthraquinone, triphenylamine, carbazole, 3-methyl acetophenone, 4-chloro-benzophenone, 4,4'-dimethoxy benzophenone, 4,4'-diamino benzophenone, Michler's ketone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanthone, diethyl thioxanthone, 2-isopropyl thioxanthone, 2-chloro thioxanthone, 2-methyl-1-[4-

(methylthio) phenyl]-2-morpholino-propan-1-one, bis(2,4,6-trimethyl benzoyl)-phenyl phosphine oxide, 2,4,6-trimethyl benzoyl-diphenyl-phosphine oxide, 2,4-diethyl thioxanthone, and bis(2,6-dimethoxybenzoyl)-2,4,4-trimethylpentyl phosphine oxide, which are used by combining one or two or more types selected therefrom.

The content of the photopolymerization initiator in the ultraviolet curable composition is preferably in a range of 0.5 mass % to 10 mass %. When the content of the photopolymerization initiator is within the above range, the ultraviolet curing rate is sufficiently large and the dissolving remainder of the photopolymerization initiator or coloring derived from the photopolymerization initiator hardly exists.

When the ultraviolet curable composition contains a slip agent, the surface of the recorded object becomes smooth due to a leveling action, and the abrasion resistance is improved.

The slip agent is no particularly limited; however, examples thereof include a silicone surfactant such as polyester-modified silicone or polyether-modified silicone, polyacrylate modified silicone, and polymeric surfactants such as polyacrylate and polyester, and it is preferable to use polyether modified polydimethylsiloxane, polyester-modified polydimethylsiloxane, or polyacrylate-modified dimethylsiloxane.

In addition, the ultraviolet curable composition of the invention may contain a polymerization inhibitor, but even in a case where the polymerization inhibitor is contained, the content of the polymerization inhibitor in the ultraviolet curable composition is preferably equal to or less than 0.6 mass %, and is more preferably equal to or less than 0.2 mass %. With this, the content of the polymerizable compound can be relatively high in the ultraviolet curable composition, and thus it is possible to realize particularly excellent abrasion resistance and the like of the printing unit which is formed by using the ultraviolet curable composition. In addition, in a case where the metal powder is subjected to the surface treatment by using the fluorine-based surface treating agent, it is possible to realize particularly excellent storage stability and discharge stability of the ultraviolet curable composition even in a case where the content of the polymerization inhibitor is relatively low.

In addition, it is preferable that the ultraviolet curable composition of the invention does not contain an organic solvent which is removed (evaporated) in the manufacturing step of the recorded object. With this, it is possible to effectively prevent the problem of the volatile organic compound (VOC).

The viscosity of the ultraviolet curable composition of the invention measured by using a vibration type viscometer based on JIS 28809 at room temperature (20° C.) is preferably equal to or less than 20 mPa·s, and is more preferably in a range of 3 mPa·s to 15 mPa·s. With this, it is possible to preferably discharge the liquid droplets through the ink jet method.

<<Recorded Object>>

Next, the recorded object of the invention will be described.

First Embodiment

The recorded object of the invention is manufactured in such a manner that the above-described ultraviolet curable composition is imparted onto the recording medium, and then is irradiated with ultraviolet rays. such a recorded object has a pattern (a printing unit) which is excellent in glossiness and abrasion resistance.

As described above, the ultraviolet curable composition according to the invention contains the polymerizable compound, and is excellent in the adhesive properties with respect to the recording medium. As such, the ultraviolet curable composition of the invention is excellent in the adhesive properties with respect to the recording medium, and thus the recording medium may be any material and may be absorptive or non-absorptive, for example, paper (such as plain paper and ink jet special paper), a plastic material, metal, ceramics, wood, a shell, cotton, polyester, a natural fiber and a synthetic fiber such as wool, and a non-woven fabric can be used. In addition, the shape of the recording medium is not particularly limited; any shape such as sheet-like may be used.

As the liquid droplet discharge type (an ink jet method type), a piezo type, a type of discharging ink by using foam (bubbles) generated by heating ink, and the like can be used; however, from the view point that the ultraviolet curable composition is not easily deteriorated, the piezo type is preferably used.

The discharge of the ultraviolet curable composition through the ink jet method can be performed by using a known liquid droplet discharge apparatus.

The ultraviolet curable composition which is discharged through the ink jet method is cured by the ultraviolet irradiation.

Examples of an ultraviolet source include a mercury lamp, a metal halide lamp, an ultraviolet light-emitting diode (UV-LED), and an ultraviolet laser diode (UV-LD). Among them, in terms of a compact size, long life span, high efficiency, and low cost, the ultraviolet light-emitting diode (UV-LED) and the ultraviolet laser diode (UV-LD) are preferably used.

The recorded object of the invention may be applied to any application, for example, it may be applied to a decorative article or other matters. Specific example of the recorded object of the invention include an interior article for a vehicle such as a console lid, a switch base, a center cluster, an interior panel, an emblem, a center console, and a meter nameplate, an operating unit of various electronic equipment (key switches), a decorative portion that exhibits decorativeness, and a display matter such as an index and a logo.

Second Embodiment

Next, a recorded object of the second embodiment will be described.

The recorded object of the second embodiment includes a recording medium and a printing unit (a printing layer), in which the printing unit contains a metal powder and a fluorine-containing powder, and in a planar view of the printing unit, the number of constituting particles of the fluorine-containing powders which are exposed to the surface of the printing unit is in a range of $0.20/\mu m^2$ to $3.0/\mu m^2$ per unit area of the printing unit. As such, the sufficiently required number of fluorine-containing powders having high lubricity are exposed on the outer surface of the printing unit, and thus it is possible to realize excellent abrasion resistance of the recorded object (the printing unit), and it is possible to realize excellent glossiness of the recorded object (the printing unit) by sufficiently exhibiting the texture of a metal material for forming the metal powder while effectively preventing an appearance from being changed due to the friction (for example, deterioration of glossiness and aestheticity (aesthetic appearance) and the like). In addition, the printing unit may include a region in which in a planar view of the printing unit, the number of constituting particles of the fluorine-containing powders which are exposed to the surface of the printing unit is in a range of $0.20/\mu m^2$ to $3.0/\mu m^2$ per unit area of the printing unit, and may also include a region which does not satisfy such a condition (a region in which the number of constituting particles of the fluorine-containing powders, which are exposed to the surface of the printing unit, per unit area of the printing unit is out of the above-described range). For example, the recorded objects may include a region which does not satisfy the above-described condition in a hardly recognized portion, or a region which does not satisfy the above-described condition in a portion which does not require the excellent glossiness.

Figure 2:
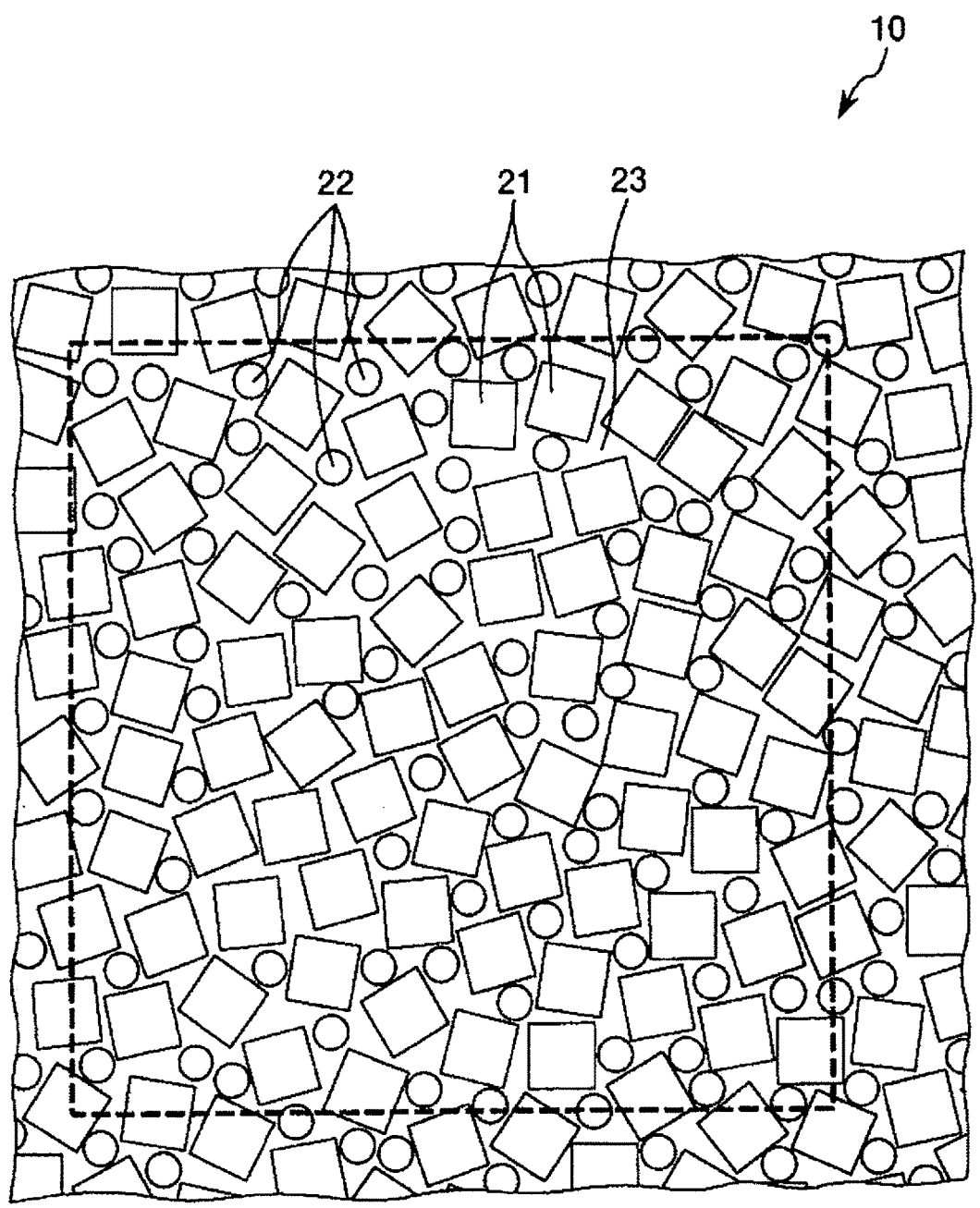
FIG. 2 is a plan view of the recorded object schematically illustrating a preferred embodiment of the invention.

FIG. 1 is a sectional view of a recorded object schematically illustrating a preferred embodiment (the second embodiment) of the invention, and FIG. 2 is a plan view of the recorded object schematically illustrating a preferred embodiment (the second embodiment) of the invention. Meanwhile, for the sake of convenience of illustration of FIG. 2, among a metal powder 21 for forming a printing unit 2, and a fluorine-containing powder 22, the one which is present on the outer surface of the printing unit 2 is only illustrated, and the one which is dispersed in the inside of the printing unit 2, and partially overlaps other particles is not illustrated even in a case where it is visible on the appearance of the recorded object 10. In the following description, a point which is different from that of the first embodiment will be mainly described, and the same matters will not be described.

The recorded object (a printed object) 10 includes a recording medium (a base material) 1 and a printing unit (a recording layer) 2.

<Recording Medium (Base Material)>

The base material 1 has a function of supporting the printing unit (the printing layer) 2 which is described below.

The base material 1 may be any material, for example, it is possible to use the same material as that of the recording medium described in the first embodiment; however, a material of which at least a surface (a portion in which the printing unit 2 is formed) is formed of a non-absolvent material (for example, a plastic material, metal, ceramics, and a shell) is preferably used.

<Printing Unit>

The printing unit 2 is formed of a material including the metal powder 21, the fluorine-containing powder 22, and a binder 23.

(Metal Powder)

The metal powder 21 is formed of a plurality of particles, and is formed of a material of which the respective constituting particles contain a metal material. The metal powder 21 is a component greatly affecting the appearance of the recorded object 10 (the appearance having metal glossiness).

As the metal powder 21, it is possible to use a material which is described as a constituting component of the ultraviolet curable composition. With this, the above-described effects can be obtained.

The content of the metal powder 21 in the printing unit 2 is preferably in a range of 0.5 mass % to 29 mass %, and is more preferably in a range of 1.0 mass % to 19.3 mass %. With this, it is possible to realize particularly excellent glossiness and sophisticated feelings of the recorded object 10, and to realize sufficiently high content of the fluorine-containing powder 22 and the binder 23, and thereby it is possible to realize particularly excellent abrasion resistance and durability of the recorded object 10. Note that, the printing unit 2 may contain two or more types of metal powders 21. In this case, it is preferable that the total content of the metal powders is in the above-described range.

(Fluorine-Containing Powder)

The fluorine-containing powder 22 is formed of a plurality of particles, of which a region including at least a surface in each of the constituting particles is formed of a material containing fluorine, and the fluorine-containing powder 22 is a component other than the above-described metal powder 21. The fluorine-containing powder 22 is a component which mainly contributes to the improvement of abrasion resistance in the recorded object 10.

As the fluorine-containing powder 22, it is possible to use the material described as the constituting component of the ultraviolet curable composition. With this, the above-described effect can be obtained.

In a planar view of the printing unit 2, the number of constituting particles of the fluorine-containing powders 22 which are exposed to the surface of the printing unit 2 is in a range of $0.20/\mu m^2$ to $3.0/\mu m^2$ per unit area of the printing unit 2. As such, the sufficiently required number of fluorine-containing powders 22 having high lubricity are exposed on the outer surface of the printing unit 2, and thus it is possible to realize excellent abrasion resistance of the recorded object 10 (the printing unit 2), and it is possible to realize excellent glossiness of the recorded object 10 (the printing unit 2) by sufficiently exhibiting the texture of a metal material for forming the metal powder 21 while effectively preventing an appearance from being changed due to the friction (for example, deterioration of glossiness and aestheticity (aesthetic appearance) and the like).

In contrast, in a planar view of the printing unit 2, if the number of constituting particles of the fluorine-containing powders 22, which are exposed to the surface of the printing unit 2, per unit area of the printing unit 2 is lower than the lower limit value, the recorded object 10 (the printing unit 2) is deteriorated. In addition, in a planar view of the printing unit 2, if the number of constituting particles of the fluorine-containing powders 22, which are exposed to the surface of the printing unit 2, per unit area of the printing unit 2 is greater than the upper limit value, the area fraction occupied by the metal powder 21 is decreased on the surface of the printing unit 2, and thus the glossiness and aesthetic appearance of the recorded object 10 are deteriorated.

In a planar view of the printing unit 2, the number of constituting particles of the fluorine-containing powders 22 which are exposed to the surface of the printing unit 2 per unit area of the printing unit 2 may be obtained by using any method and condition. For example, it can be obtained in such a way to count the number of the constituting particles of the fluorine-containing powders 22 which are exposed to the surface of the printing unit 2 in a square region having a predetermined area (in FIG. 2, the region surrounded by dashed lines, for example, a square region having a corner of 10 μm (a region of 100 $\mu m^2$)) in an image obtained by observing through a scanning electron microscope (SEM). With such a condition, in a planar view of the printing unit 2, it is possible to easily obtain the aforementioned number by calculating the number of constituting particles of the fluorine-containing powders 22 which are exposed to the surface of the printing unit 2 per unit area of the printing unit 2. In addition, even in a case where the number of constituting particles of the fluorine-containing powders 22 which are exposed to the surface of the printing unit 2 per unit area of the printing unit 2 is not correct in the respective portions in a planar view of the printing unit 2, it is possible to reduce such an influence. Further, the above-described measurement is performed on a plurality of regions (for example, ten regions) (for example, a square region having a corner of 10 µm as described above (the region of 100 µm$^2$)), and an average value of the obtained values for the respective regions may be used as the number of constituting particles of the fluorine-containing powders 22 which are exposed to the surface of the printing unit 2 per unit area of the printing unit 2 in a planar view of the printing unit 2. With this, even in a case where the number of constituting particles of the fluorine-containing powders 22 which are exposed to the surface of the printing unit 2 per unit area of the printing unit 2 is not correct in the respective portions in a planar view of the printing unit 2, it is possible to reduce such an influence. In addition, as described above, when counting the number of the constituting particles of the fluorine-containing powders 22 which are exposed to the surface of printing unit included in a region having a predetermined area, the constituting particles of the fluorine-containing powder 22 which are partially included in the above region can be counted as the number in response to the area fraction in a planar view. For example, in a case where the number of the constituting particles of the fluorine-containing powders 22 which correspond to 70% of area of the printing unit 2 in a planar view is one in the above area, the number of the constituting particles can be counted as 0.7.

As described above, in the embodiment, in a planar view of the printing unit 2, the number of constituting particles of the fluorine-containing powders 22 which are exposed to the surface of the printing unit 2 per unit area of the printing unit 2 may be in a range of 0.20/µm$^2$ to 3.0/µm$^2$, but is preferably in a range of 0.40/µm$^2$ to 2.5/µm$^2$, is more is preferably in a range of 0.60/µm$^2$ to 2.0/µm$^2$, and still more is preferably in a range of 0.80/µm$^2$ to 1.5/µm$^2$. With this, the above-described effect can be remarkably exhibited.

As described in FIG. 1, it is preferable that the printing unit 2 contains the constituting particle of the fluorine-containing powder 22 which is protruded higher than the constituting particle of the metal powder 21. With this, it is possible to realize particularly excellent abrasion resistance of the recorded object 10.

It is preferable that the fluorine-containing powder 22 has transparency in a state of being dispersed in the binder 23. With this, it is possible to more effectively prevent the adverse effect of coloring the recorded object 10, and to realize particularly excellent aesthetic appearance of the recorded object 10.

Meanwhile, the transmittance of visible light (transmittance of light having wavelength of 600 nm) in the thickness direction of a layer which has the thickness of 100 µm and has the same composition as that of the printing unit 2 except that the metal powder 21 is not contained is preferably equal to or greater than 85%, and more preferably equal to or greater than 90%. With this, it is possible to more effectively exhibit the above effect.

The content of the fluorine-containing powder 22 in the printing unit 2 is preferably in a range of 0.010 mass % to 5.0 mass %, is more preferably in a range of 0.10 mass % to 3.0 mass %, and is still more is preferably in a range of 0.20 mass % to 2.0 mass %. With this, in a planar view of the printing unit 2, if the number of constituting particles of the fluorine-containing powders 22, which are exposed to the surface of the printing unit 2, per unit area of the printing unit 2 can be more easily and reliably set to be within the above described range. Note that, the printing unit 2 may contain two or more types of the fluorine-containing powders 22. In this case, it is preferable that the total content the fluorine-containing powders 22 is within the above described range.

When the content of the metal powder 21 in the printing unit 2 is set as $X_M$ [mass %], and the content of the fluorine-containing powder 22 in the printing unit 2 is set as $X_F$ [mass %], it is preferable to satisfy a relationship expressed by $0.05 \leq X_F/X_M \leq 1.0$, and it is more preferable to satisfy a relationship expressed by $0.1 \leq X_F/X_M \leq 0.8$. With this, it is possible to realize both of the glossiness and the abrasion resistance of the recorded object 10 at a high level.

(Binder)

The binder 23 has a function of fixing the metal powder 21 and the fluorine-containing powder 22, and a function of adhering the printing unit 2 to the base material (the recording medium) 1.

Examples of the binder 23 include a cured material of the photo-curable resin such as a thermoplastic resin, a thermosetting resin, and an ultraviolet curable resin. Among them, the binder 23 is preferably formed of a cured material such as curable resin, and is more preferably formed of a cured material such as the ultraviolet curable resin. In other words, it is preferable that the printing unit 2 is formed of the ultraviolet curable composition containing the ultraviolet curable resin. With this, the effect which is described in the description of the ultraviolet curable composition of the invention can be obtained. In addition, it is possible to realize particularly excellent heat resistance and durability of the recorded object 10. In addition, in a case where the binder 23 is the curable material such as the ultraviolet curable resin, the ultraviolet curable resin can be used as a composition used in the manufacturing of the recorded object 10 (forming the printing unit 2), and in this case, it is possible to realize particularly excellent productivity of the recorded object 10 and to easily and reliably adjust the number of constituting particles of the fluorine-containing powders 22, which are exposed to the surface of the printing unit 2, per unit area of the printing unit 2 by adjusting the irradiation condition of the ultraviolet rays.

The content of the binder 23 in the printing unit 2 is preferably, in a range of 70 mass % to 99 mass %, and is more preferably in a range of 80 mass % to 98 mass %. With this, it is possible to realize more excellent glossiness and abrasion resistance of the recorded object 10. Note that, the printing unit 2 may contain two or more types of compounds as the binder 23. In this case, it is preferable that the total contents of the compounds are within the above-described range.

(Other Components)

The printing unit 2 may contain other components except for the metal powder 21, the fluorine-containing powder 22, and the binder 23 (other components). Examples of other components include a photopolymerization initiator, a slip agent (a leveling agent), a solvent, a polymerization accelerator, a polymerization inhibitor, a penetration enhancer, a wetting agent (a humectant), a colorant, an adhesion promoter, fungicide, an antiseptic agent, an antioxidant, a chelating agent, a thickening agent, and a sensitizer (sensitizing dye).

As the photopolymerization initiator, a photo-radical polymerization initiator, and the slip agent, for example, it is possible to use the material described as the constituting component of the above-described ultraviolet curable composition. With this, the same effect as described above can be obtained.

The viscosity of the composition for forming the printing unit 2 (the composition for forming a printing unit) measured by using a vibration type viscometer based on JIS Z8809 at room temperature (20° C.) is preferably equal to or less than 20 mPa·s, and is more preferably in a range of 3 mPa·s to 15 mPa·s. With this, it is possible to preferably discharge the liquid droplets through the ink jet method.

In recorded object 10 of the embodiment, in a case where the printing unit 2 contains the cured material such as the ultraviolet curable resin as the binder 23, the ultraviolet curable composition of the invention as described above can be preferably used as the composition (the composition for forming a printing unit) used for forming the printing unit 2.

The thickness of the printing unit 2 is preferably in a range of 5 μm to 200 μm, is more preferably in a range of 10 μm to 150 μm, and is still more is preferably in a range of 15 μm to 100 μm. With this, it is possible to realize particularly excellent glossiness and aesthetic appearance of the recorded object 10, and to realize particularly excellent durability of the recorded object 10.

As described above, the invention is described based on the preferred embodiments; however, the invention is not limited the embodiments.

For example, in the above described embodiments, the case where the ultraviolet curable composition of the invention is used in the ink jet method is mainly described; however, the ultraviolet curable composition of the invention may be used in other methods (for example, various printing method other than the ink jet method) other than the ink jet method.

In addition, in the above described embodiments, the case where the recorded object of the invention is formed of the recording medium (the base material) and the printing unit is mainly described; however, the recorded object of the invention may have other components in addition to the recording medium (the base material) and the printing unit.

Further, in the above described embodiments, the case where the metal powder contains the particle which is subjected to the surface treatment by using the fluorine-based surface treating agent is mainly described; however, the metal powder of the invention may not be subjected to the surface treatment by using the fluorine-based surface treating agent.

EXAMPLES

Next, specific examples of the invention will be described.

[A1] Manufacture of Composition for Manufacturing Recorded Object

Example A1

First, a film with a smooth surface (surface roughness Ra is equal to or less than 0.02 μm) which is formed of polyethylene terephthalate was prepared.

Next, one surface of this film was entirely coated with silicone oil.

Subsequently, a film formed of Al was formed through on the surface which was coated with the silicone oil through an evaporation method.

Then, the film (the base material) formed of polyethylene terephthalate on which the Al film was formed was put into a liquid which was obtained by dissolving 1 part by mass of $CF_3(CF_2)_5(CH_2)_2O(P)(OH)_2$ as a fluorine-based surface treating agent with 99 parts by mass of diethylene glycol diethyl ether, and then ultrasonic vibration of 27 kHz was imparted to a mixture at 55° C. for 3 hours. With this, a dispersion liquid for the metal powder formed of particles having a scaly shape of which the base particle formed of Al subjected to the surface treatment by using $CF_3(CF_2)_5(CH_2)_2O(P)(OH)_2$ was obtained.

The average particle size of the obtained metal powder as described above was 0.9 μm, the maximum particle size was 2.0 μm, and the average thickness was 60 nm.

Next, the composition for manufacturing a recorded object (the ultraviolet curable composition) was obtained by mixing the dispersion liquid of the metal powder with the fluorine-containing powder (the average particle size of the: 0.3 μm, and the maximum particle size: 0.5 μm) consisting of the spherical-particle formed of polytetrafluoroethylene, γ-butyrolactoneacrylate as a monomer having an alicyclic structure (a polymerizable compound), phenoxyethyl acrylate as a monomer that does not have an alicyclic structure (a polymerizable compound), a substance A having a chemical structure expressed by formula (9), DISPERBYK-182 (manufactured by BYK-Chemie Co., Ltd.) as a basic polymer dispersant, Irgacure 819 (manufactured by Ciba Japan K.K.) as a photopolymerization initiator, Speedcure TPO (manufactured by ACETO CORP.) as a photopolymerization initiator, and Speedcure DETX (manufactured by Lambson) as a photopolymerization initiator.

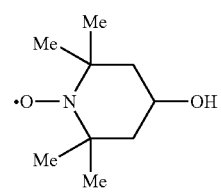

(9)

Examples A2 to A20

The composition for manufacturing a recorded object (the ultraviolet curable composition) was manufactured in the same way as in the above Example A1 except that the constituting particle of the metal powder and the constituting particle of the fluorine-containing powder were formed as indicated in Table 1, and the type and proportion of raw materials which were used to manufacture the composition for manufacturing a recorded object (the ultraviolet curable composition) were changed so as to make the compositions indicated in Table 2 and Table 3.

Example A21

The composition for manufacturing a recorded object (the ultraviolet curable composition) was manufactured in the same way as in the above Example A1 except that the particle formed of Al which is not subjected to the surface treatment by using the fluorine-based surface treating agent was used as the metal powder.

Example A22

The composition for manufacturing a recorded object (the ultraviolet curable composition) was manufactured in the same way as in the above Example A21 except that a spherical Al powder (which is not subjected to the surface treatment by using the fluorine-based surface treating agent) which is manufactured by using a gas atomizing method was used as the metal powder.

Example A23

The composition for manufacturing a recorded object (the ultraviolet curable composition) was manufactured in the same way as in the above Example A1 except that the metal powder, which was subjected to the surface treatment by using $CH_3(CH_2)_7O—PO(OH)_2$ which is not the fluorine-based surface treating agent, as the fluorine-based surface treating agent instead of $CF_3(CF_2)_7(CH_2)_2NCO$, was obtained.

Comparative Example A1

The composition for manufacturing a recorded object (the ultraviolet curable composition) was manufactured in the same way as in the above Example A1 except for the composition which does not contain the fluorine-containing particle.

Comparative Examples A2 and A3

The composition for manufacturing a recorded object (the ultraviolet curable composition) was manufactured in the same way as in the above Example A1 except for the composition as indicated in Table 3 by changing the type and proportion of raw materials which are used to prepare the composition for manufacturing a recorded object (the ultraviolet curable composition).

Comparative Example A4

The metal powder having the scaly shape and the fluorine-containing powder (the average particle size of the: 0.3 μm, and the maximum particle size: 0.5 μm) consisting of the spherical-particle formed of polytetrafluoroethylene which are obtained by the same way in Example A1, 1,2-hexanediol, trimethylolpropane, Surfynol 465 (manufactured by Nissin Chemical Industry Co., Ltd.), triethanolamine, glycerin, Polyflow 401 (manufactured by Nissin Chemical Industry Co., Ltd.), and ion exchange water were mixed so as to manufacture the composition for manufacturing a recorded object. That is, the composition for manufacturing a recorded object in Comparative Example A4 does not contain a polymerizable compound (a binder) which is cured by the irradiation of ultraviolet.

Regarding the respective Examples and Comparative Examples, the configurations of metal powder and the fluorine-containing powder which are contained in the composition for manufacturing a recorded object are collectively indicated in Table 1, and the compositions for manufacturing the recorded object are collectively indicated in Table 2 and Table 3.

Meanwhile, in Tables, $CF_3(CF_2)_5(CH_2)_2O(P)O(OH)_2$ as a fluorine-based phosphoric acid ester compound is referred to as "FAP1", $(CF_3(CF_2)_7CH_2CH_2Si(OC_2H_5)_3)$ as a fluorine-based silane compound is referred to as "FAS1", $(CF_3(CF_2)_5CH_2CH_2Si(OC_2H_5)_3)$ as a fluorine-based silane compound is referred to as "FAS2", $CF_3(CF_2)_7(CH_2)_2COOH$ as a fluorine-based fatty acid is referred to as "FFA1", $CF_3(CF_2)_7(CH_2)_2NCO$ as a fluorine-based isocyanate is referred to as "IS1", polytetrafluoroethylene is referred to as "PTFE", $CH_3(CH_2)_7O—PO(OH)_2$ is referred to as "S'1", γ-butyrolactone as a monomer having an alicyclic structure (a polymerizable compound) is referred to as "BLA", tetrahydrofurfuryl acrylate as a monomer having an alicyclic structure (a polymerizable compound) is referred to as "THFA", N-vinylcaprolactam as a monomer having an alicyclic structure (a polymerizable compound) is referred to as "VC", N-vinylpyrrolidone as a monomer having an alicyclic structure (a polymerizable compound) is referred to as "VP", acryloylmorpholine as a monomer having an alicyclic structure (a polymerizable compound) is referred to as "AMO", tris(2-acryloyloxyethyl) isocyanurate as a monomer having an alicyclic structure (a polymerizable compound) is referred to as "TAOEI", dicyclopentenyloxyethyl acrylate as a monomer having an alicyclic structure (a polymerizable compound) is referred to as "DCPTeOEA", adamantylacrylate as a monomer having an alicyclic structure (a polymerizable compound) is referred to as "AA", dimethylol tricyclodecane diacrylate as a monomer having an alicyclic structure (a polymerizable compound) is referred to as "DMTCDDA", dimethylol dicyclopentane diacrylate as a monomer having an alicyclic structure (a polymerizable compound) is referred to as "DMDCPTA", dicyclopentenyl acrylate as a monomer having an alicyclic structure (a polymerizable compound) is referred to as "DCPTeA", dicyclopentanyl acrylate as a monomer having an alicyclic structure (a polymerizable compound) is referred to as "DCPTaA", isobornylacrylate as a monomer having an alicyclic structure (a polymerizable compound) is referred to as "IBA", cyclohexylacrylate as a monomer having an alicyclic structure (a polymerizable compound) is referred to as "CHA", diacrylated isocyanurate as a monomer having an alicyclic structure (a polymerizable compound) is referred to as "DAI", triacrylated isocyanurate as a monomer having an alicyclic structure (a polymerizable compound) is referred to as "TAI", γ-butyrolactonemethacrylate as a monomer having an alicyclic structure (a polymerizable compound) is referred to as "BLM", tetrahydrofurfuryl methacrylate as a monomer having an alicyclic structure (a polymerizable compound) is referred to as "THFM", dicyclopentenyloxyethyl methacrylate as a monomer having an alicyclic structure (a polymerizable compound) is referred to as "DCPTeOEM", adamantylmethacrylate as a monomer having an alicyclic structure (a polymerizable compound) is referred to as "AM", pentamethylpiperidyl methacrylate as a monomer having an alicyclic structure (a polymerizable compound) is referred to as "PMPM", tetramethylpiperidylmethacrylate as a monomer having an alicyclic structure (a polymerizable compound) is referred to as "TMPM", 2-methyl-2-adamantyl methacrylate as a monomer having an alicyclic structure (a polymerizable compound) is referred to as "MAM", 2-ethyl-2-adamantyl methacrylate as a monomer having an alicyclic structure (a polymerizable compound) is referred to as "EAM", mevalonic lactone methacrylate as a monomer having an alicyclic structure (a polymerizable compound) is referred to as "MLM", dicyclopentenyl methacrylate as a monomer having an alicyclic structure (a polymerizable compound) is referred to as "DCPTeM", dicyclopentanyl methacrylate as a monomer having an alicyclic structure (a polymerizable compound) is referred to as "DCPTaM", isobornylmethacrylate as a monomer having an alicyclic structure (a polymerizable compound) is referred to as "IBM", cyclohexyl methacrylate as a monomer having an alicyclic structure (a polymerizable compound) is referred to as "CHM", cyclohexane spiro-2-(1,3-dioxolan-4-yl) methyl acrylate as a monomer having an alicyclic structure (a polymerizable compound) is referred to as "CHDOLA", (2-methyl-2-ethyl-1,3-dioxolan-4-yl) methyl acrylate as a monomer having an alicyclic structure (a polymerizable compound) is referred to as "MEDOLA", phenoxyethyl acrylate as a monomer that does not have an alicyclic structure (a polymerizable compound) is referred to as "PEA", dipropylene glycol diacrylate as a monomer that does not have an alicyclic structure (a polymerizable compound) is referred to as "DPGDA", tropropylene glycol diacrylate as a monomer that does not have an alicyclic structure (a polymerizable compound) is referred to as "TPGDA", 2-hydroxy3-phenoxypropyl acrylate as a monomer that does not have an alicyclic structure (a polymerizable compound) is referred to as "HPPA", 4-hydroxybutyl acrylate as a monomer that does not have an alicyclic structure (a polymerizable compound) is referred to as "HBA", ethylcarbitolacrylate as a monomer that does not have an alicyclic structure (a polymerizable compound) is referred to as "ECA", methoxytriethylene glycolacrylate as a monomer that does not have an alicyclic structure (a polymerizable compound) is referred to as "MTEGA", t-butyl acrylate as a monomer that does not have an alicyclic structure (a polymerizable compound) is referred to as "TBA", benzyl acrylate as a monomer that does not have an alicyclic structure (a polymerizable compound) is referred to as "BA", 2-(2-hydroxyethoxy) ethyl acrylate as a monomer that does not have an alicyclic structure (a polymerizable compound) is referred to as "VEEA", benzyl methacrylate as a monomer that does not have an alicyclic structure (a polymerizable compound) is referred to as "BM", urethaneacrylate as a monomer that does not have an alicyclic structure (a polymerizable compound) is referred to as "UA", DISPERBYK-182 (manufactured by BYK-Chemie Co., Ltd., amine value: 13 mgKOH/g) as a basic polymer dispersing agent is referred to as "D2", DISPERBYK-2155 (manufactured by BYK-Chemie Co., Ltd., amine value: 48 mgKOH/g) as a basic polymer dispersing agent is referred to as "D5", a compound (substance A) expressed by the formula (9) is referred to as "A1", a compound (substance A) expressed by formula (10) described below is referred to as "A2", a compound (substance A) expressed by formula (11) described below is referred to as "A3", a substance A expressed by formula (12) described below is referred to as "A4", Irgacure 819 (manufactured by Ciba Japan K.K.) is referred to as "ic 819", Speedcure TPO (manufactured by ACETO CORP.) is referred to as "sc TPO", Speedcure DETX (manufactured by Lambson) is referred to as "sc DETX", UV-3500 (manufactured by BYK-Chemie Co., Ltd.) is referred to as "UV3500", hydroquinone monomethyl ether is referred to as "MEHQ", 1,2-hexanediol is referred to as "1,2HD", trimethylolpropane is referred to as "TMP", Surfynol 465 (manufactured by Nissin Chemical Industry Co., Ltd.) is referred to as "S465", triethanolamine is referred to as "TEA", glycerin is referred to as "GL", LHP-96 (manufactured by Kusumoto Co., Ltd.) is referred to as "LHP", LF-1984 (manufactured by Kusumoto Co., Ltd.) is referred to as "LF", and Polyflow 401 (manufactured by Nissin Chemical Industry Co., Ltd.) is referred to as "PF401".

In addition, in Table, in Example A15, regarding a composition of a constituting material of the base particle, the content of each element was indicated by a weight ratio. In addition, the value of viscosity of the composition for manufacturing a recorded object (the ultraviolet curable composition) in each Example of the invention measured by using a vibration type viscometer based on JIS Z8809 at 20° C. was in a range of 3 mPa·s to 15 mPa·s. Further, regarding the metal powder which forms the composition for manufacturing a recorded object (the ultraviolet curable composition) in each Example, the observation was optionally performed for ten metal particles, and a ratio ($S_1/S_0$) of an area $S_1$ [μm$^2$], which was the maximum projected area when the particle was observed in a plan view, to an area $S_0$ [μm$^2$], which was the maximum area of the projected areas obtained when being observed from the direction orthogonal to the observation direction was obtained, and when the average value of the ratio was obtained, the average value of $S_1/S_0$ was equal to or greater than 19. In addition, both D2 and D5 are basic and have a polymer structure (a basic polymer dispersant). In addition, the transmittance of visible light (transmittance of light having wavelength of 600 nm) in the thickness direction of a cured material having the thickness of 100 μm which is obtained by curing the ultraviolet curable composition having the same composition as that of the ultraviolet curable composition in the respective Examples except for that the metal powder is not contained was equal to or greater than 90%.

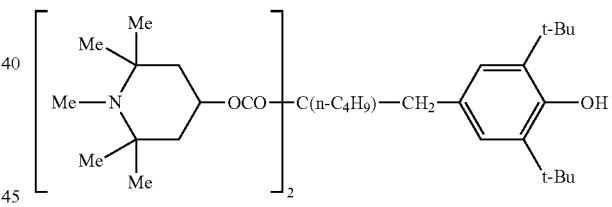

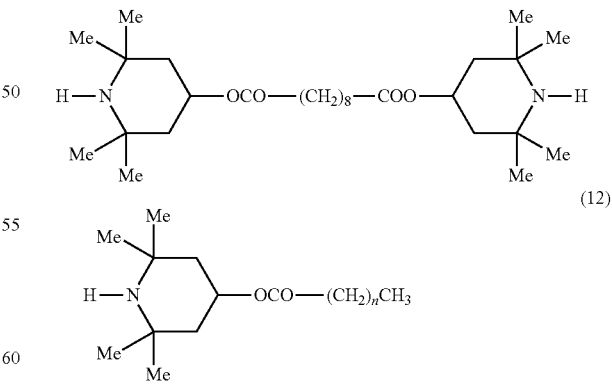

(Here, a substance A expressed in formula (12) is a mixture of a plurality of compounds in which n in the formula is in a range of 10 to 19 (a main component is a compound in which n in the formula is in a range of 15 to 18).)

TABLE 1

| | Metal powder | | | | | | Fluorine containing powder | | | |
| | | | | | | | | Material | | |
| | Shape | Constituting material of base particle | Material used for surface treatment | Average particle size [μm] | Maximum particle size [μm] | Average thickness [nm] | Shape | Constituting material of base particle | used for surface treatment | Average particle size [μm] | Maximum particle size [μm] |
|---|---|---|---|---|---|---|---|---|---|---|---|
| Example A1 | Scaly | Al | FAP1 | 0.9 | 2 | 60 | Sphere | PTFE | — | 0.3 | 0.5 |
| Example A2 | Scaly | Al | FAP1 | 0.7 | 0.9 | 20 | Sphere | PTFE | — | 0.2 | 0.4 |
| Example A3 | Scaly | Al | FAP1 | 1.5 | 2.5 | 20 | Sphere | PTFE | — | 0.3 | 0.5 |
| Example A4 | Scaly | Al | FAP1 | 1 | 1.2 | 80 | Sphere | Silica | FAS1 | 0.015 | 0.05 |
| Example A5 | Scaly | Al | FAP1 | 0.9 | 1.1 | 80 | Sphere | Alumina | FAS1 | 0.02 | 0.05 |
| Example A6 | Scaly | Al | FAP1 | 0.8 | 1 | 60 | Sphere | Silica | FAS2 | 0.015 | 0.05 |
| Example A7 | Scaly | Al | FAP1 | 0.8 | 1 | 60 | Sphere | Alumina | FAS2 | 0.02 | 0.05 |
| Example A8 | Scaly | Al | FAP1 | 0.9 | 1.1 | 20 | Sphere | Titania/Al(OH)$_3$ | FFA1 | 0.02 | 0.05 |
| Example A9 | Scaly | Al | FAS1 | 2 | 2.2 | 20 | Sphere | Talc | FAS1 | 0.3 | 0.5 |
| Example A10 | Scaly | Al | FAS2 | 1.1 | 1.3 | 20 | Sphere | Talc | FAS2 | 0.3 | 0.5 |
| Example A11 | Scaly | Al | FAP1 | 1 | 1.2 | 20 | Sphere | Al(OH)$_3$ | FFA1 | 0.1 | 0.2 |
| Example A12 | Scaly | Al | FAP1 | 0.7 | 0.9 | 40 | Sphere | Al(OH)$_3$ | FAP1 | 0.02 | 0.05 |
| Example A13 | Scaly | Al | FAP1 | 0.9 | 1.5 | 20 | Sphere | Iron oxide | FAP1 | 0.02 | 0.05 |
| Example A14 | Scaly | Al | FAP1 | 1.5 | 1.8 | 15 | Sphere | Calcium carbonate | FFA1 | 0.03 | 0.05 |
| Example A15 | Scaly | Ni49.5 Fe50.5 | FAS1 | 1.8 | 2 | 40 | Sphere | PTFE | — | 0.2 | 0.4 |
| Example A16 | Scaly | SUS316L | FAS1 | 1.5 | 1.7 | 40 | Sphere | Silica | FAS1 | 0.05 | 0.08 |
| Example A17 | Scaly | Al | FAP1 | 0.9 | 1.1 | 20 | Sphere | Titania | FFA1 | 0.05 | 0.08 |
| Example A18 | Scaly | Al | FAP1 | 0.9 | 1.1 | 20 | Sphere | Silica | FAS2 | 0.05 | 0.08 |
| Example A19 | Scaly | Al | FFA1 | 0.9 | 1.1 | 20 | Sphere | Al(OH)$_3$ | FFA1 | 0.1 | 0.2 |
| Example A20 | Scaly | Al | IS1 | 0.8 | 1 | 20 | Sphere | Silica | IS1 | 0.08 | 0.3 |
| Example A21 | Scaly | Al | — | 0.9 | 2 | 60 | Sphere | PTFE | — | 0.3 | 0.5 |
| Example A22 | Spherical | Al | — | 0.8 | 10 | — | Sphere | PTFE | — | 0.3 | 0.5 |
| Example A23 | Scaly | Al | S'1 | 0.9 | 2 | 60 | Sphere | PTFE | — | 0.3 | 0.5 |
| Comparative Example A1 | Scaly | Al | FAP1 | 0.9 | 2 | 60 | — | — | — | — | — |
| Comparative Example A2 | Scaly | Al | FAP1 | 0.9 | 2 | 60 | Sphere | PTFE | — | 0.3 | 0.5 |
| Comparative Example A3 | Scaly | Al | FAP1 | 0.9 | 2 | 60 | Sphere | PTFE | — | 0.3 | 0.5 |
| Comparative Example A4 | Scaly | Al | FAP1 | 0.9 | 2 | 60 | Sphere | PTFE | — | 0.3 | 0.5 |

TABLE 2

| | Metal powder Content [Part by mass] | Flourine-containing powder Content [Part by mass] | Polymerizable compound | Content [Part by mass] | Dispersant | Content [Part by mass] | Substance A | Content [Part by mass] | Other components | Content [Part by mass] |
|---|---|---|---|---|---|---|---|---|---|---|
| Example A1 | 1.5 | 1.0 | BLA/PEA | 59.0/26.9 | D2 | 1.4 | A1 | 0.2 | ic819/scTPO/ scDETX | 4.0/4.0/ 2.0 |
| Example A2 | 1.5 | 1.0 | BLA/THFA | 42.2/44.1 | — | — | A2 | 0.8 | ic819/scTPO/ scDETX/LHP/ MEHQ | 4.0/4.0/ 2.0/0.2/ 0.2 |
| Example A3 | 3.0 | 2.0 | VC/VP/ AMO/VEEA | 24.8/31.3/ 16.9/9.0 | D2 | 1.4 | A1 | 1.4 | ic819/scTPO/ scDETX/LF | 4.0/4.0/ 2.0/0.2 |
| Example A4 | 2.0 | 0.8 | BLM/THFM/ TAOEI/DCPTeOEN AA/PEA/DPGDA | 7.3/5.0/ 30.8/31.8/ 5.4/3.9/3.9 | — | — | A3 | 0.7 | ic819/scTPO/ UV3500/ MEHQ | 4.0/4.0/ 0.2/0.2 |
| Example A5 | 1.3 | 1.2 | AM/PMPM/TMPM/ MAM/EAM/DCPTeA/ PEA/TPGDA/VEEA | 3.8/7.8/3.0/ 3.0/3.1/58.8/ 3.2/1.2/2.0 | — | — | A4 | 1.2 | ic819/scTPO/ scDETX/ UV3500/ MEHQ | 4.0/4.0/ 2.0/0.2/ 0.2 |
| Example A6 | 5.0 | 3.0 | DCPTeOEM/MLM/ DMTCDDA/DCPTaA/ IBA/CHM/PEA/HPPA | 3.4/3.4/ 19.4/27.6/ 8.6/8.4/4.9/4.9 | — | — | A1 | 1.0 | ic819/scTPO/ scDETX/ UV3500/ MEHQ | 4.0/4.0/ 2.0/0.2/ 0.2 |
| Example A7 | 2.0 | 1.0 | DMDCPTA/DCPTeM/ DCPTaM/IBM/CHA/ PEA/HBA/VEEA | 44.7/5.5/ 6.5/5.9/17.6/ 4.1/1.1/1.0 | — | — | A1 | 0.58 | ic819/scTPO/ scDETX | 4.0/4.0/ 2.0 |
| Example A8 | 1.5 | 1.0 | BLA/THFA/ PEA/HBA/AMO | 29.6/34.6/ 9.7/9.2/3.2 | — | — | A2 | 0.8 | ic819/scTPO/ scDETX/ UV3500/ MEHQ | 4.0/4.0/ 2.0/0.2/ 0.2 |
| Example A9 | 1.5 | 1.0 | BLA/THFA/ VC/PEA | 25.1/32.4/ 7.2/19.8 | D2 | 1.4 | A1 | 1.4 | ic819/scTPO/ scDETX/LF | 4.0/4.0/ 2.0/0.2 |
| Example A10 | 1.5 | 1.2 | BLA/THFA/ TBA/VEEA/UA | 26.4/23.3/ 14.8/9.5112.5 | — | — | A1 | 0.4 | ic819/scTPO/ scDETX/ UV3500/ MEHQ | 4.0/4.0/ 2.0/0.2/ 0.2 |
| Example A11 | 1.5 | 1.0 | BLA/THFA/ VP/PEA | 33.3/34.6/ 3.5/16.9 | — | — | A3 | 0.8 | ic819/scTPO/ LHP/MEHQ | 4.0/4.0/ 0.2/0.2 |
| Example A12 | 1.5 | 1.2 | BLA/THFA/ VEEA/BM/UA | 25.3/24.4/ 14.2/16.3/10.3 | D5 | 0.2 | A1 | 0.2 | ic819/scTPO/ LF/MEHO | 4.0/2.0/ 0.2/0.2 |
| Example A13 | 2.0 | 1.0 | BLA/THFA/ BM | 31.7/33.6/ 20.1 | — | — | A4 | 1.2 | ic819/scTPO/ scDETX/LF/ MEHQ | 4.0/4.0/ 2.0/0.2/ 0.2 |

TABLE 3

| | Metal powder Content [Part by mass] | Fluorine-containing powder Content [Part by mass] | Polymerizable compound | Content [Part by mass] | Dispersant | Content [Part by mass] | Substance A Content [Part by mass] | Other components | Content [Part by mass] |
|---|---|---|---|---|---|---|---|---|---|
| Example A14 | 2 | 1.2 | DAI/TAI/ ECA/MTEGA/ IBA/BA | 20.1/19.2/ 17.61/7.1/ 5.9/5.5 | — | — | A1 / 1 | ic819/scTPO/ scDETX/UV3500/ MEHQ | 4.014.0/ 2.0/0.2/0.2 |
| Example A15 | 2 | 1 | BLA/THFA/ TBA/VEEA/UA | 26.8/26.1/ 13.6/15.3/4.0 | — | — | A2 / 0.8 | ic819/scTPO/ scDETX/LHP/ MEHQ | 4.0/4.0/ 2.0/0.2/0.2 |
| Example A16 | 2 | 1.5 | BLA/THFA/ VEEA/BM/ MEDOLA | 25.7/27.1/ 13.8/15.3/4.0 | D5 | 0.2 | A1 / 0.2 | scDETX/LHP | 2.0/0.2 |
| Example A17 | 2.5 | 0.2 | AMO/THFA | 51.9/34.7 | — | — | A2 / 0.3 | ic819/scTPO/ scDETX/LHP/LF | 4.0/4.0/ 2.0/0.2/0.2 |
| Example A18 | 1.5 | 1 | AMO/THFA/BA | 39.8/39.8/6.9 | — | — | A2 / 0.6 | ic819/scTPO/ scDETX/LHP/LF | 4.0/4.0/ 2.0/0.2/0.2 |
| Example A19 | 5 | 3 | AMO/BA/DCPTaA/ CHDOLA | 20.7/20.7/ 23.3/16.3 | — | — | A2 / 0.6 | ic819/scTPO/ scDETX/LHP/LF | 4.0/4.0/ 2.0/0.2/0.2 |

TABLE 3-continued

| | Metal powder Content [Part by mass] | Fluorine-containing powder Content [Part by mass] | Polymerizable compound | Content [Part by mass] | Dispersant | Substance A Content [Part by mass] | Content [Part by mass] | Other components | Content [Part by mass] |
|---|---|---|---|---|---|---|---|---|---|
| Example A20 | 1.5 | 1 | VEEA/PEA | 51.2/33.9 | D2 | 1 | A1 | 1 | ic819/scTPO/scDETX/UV3500/MEHQ | 4.0/4.0/2.0/0.2/0.2 |
| Example A21 | 1.5 | 1 | BLA/PEA | 59.0/26.9 | D2 | 1.4 | A1 | 0.2 | ic819/scTPO/scDETX | 4.0/4.0/2 |
| Example A22 | 1.5 | 1 | BLA/PEA | 59.0/26.9 | D2 | 1.4 | A1 | 0.2 | ic819/scTPO/scDETX | 4.0/4.0/2 |
| Example A23 | 1.5 | 1 | BLA/PEA | 59.0/26.9 | D2 | 1.4 | A1 | 0.2 | ic819/scTPO/scDETX | 4.0/4.0/2 |
| Comparative Example A1 | 1.5 | — | BLA/PEA | 59.0/26.9 | D2 | 1.4 | A1 | 0.2 | ic819/scTPO/scDETX | 4.0/4.0/2 |
| Comparative Example A2 | 1.5 | 0.009 | BLA/PEA | 59.0/26.9 | D2 | 1.4 | A1 | 0.2 | ic819/scTPO/scDETX | 4.0/4.0/2 |
| Comparative Example A3 | 1.5 | 5.4 | BLA/PEA | 59.0/26.9 | D2 | 1.4 | A1 | 0.2 | ic819/scTPO/scDETX | 4.0/4.0/2 |
| Comparative Example A4 | 1.5 | 1 | — | — | — | — | — | — | Water/1,2HD/TMP/S465/TEA/GUPF401 | 69.1/3.0/14.0/1.5/0.3/9.0/0.1 |

[A2] Evaluation of Discharging Stability of Liquid Droplets

Evaluation of Discharge Stability

The composition for manufacturing a recorded object in the respective Examples and Comparative Examples was evaluated through the test as described below.

First, a liquid droplet discharging apparatus which is installed in a chamber (a thermal chamber) and the composition for manufacturing a recorded object in the respective Examples and Comparative Examples were prepared, and under the environment of 25° C. and 50% RH, and in a state where a driving waveform of a piezoelectric element was optimized, 2000000 liquid droplets were continuously discharged with respect to each composition for manufacturing a recorded object from each nozzle of a liquid droplet discharging head. Thereafter, the operation of the liquid droplet discharging apparatus was stopped and the composition for manufacturing a recorded object was left to stand for 360 hours under the environment at 25° C. and 50% RH in a state where a flow path of the liquid droplet discharging apparatus was filled with each composition for manufacturing a recorded object.

Thereafter, 4000000 liquid droplets were continuously discharged from each nozzle of the liquid droplet discharging head under the environment at 25° C. and 50% RH. Regarding the 4000000 liquid droplets discharged from the designated nozzles in the vicinity of the center of the liquid droplet discharging head, after being left for 360 hours as described above, the evaluation was performed by obtaining an average value of shift amounts d from a center target position of the center position in each landed liquid droplet on the basis of the following five stages of criteria. It can be said that as this value is small, it is possible to effectively prevent the occurrence of curved flight.

A: Average value of shift amount d is less than 0.07 μm
B: Average value of shift amount d is equal to or greater than 0.07 μm and less than 0.14 μm
C: Average value of shift amount d is equal to or greater than 0.14 μm and less than 0.17 μm
D: Average value of shift amount d is equal to or greater than 0.17 μm and less than 0.21 μm
E: Average value of shift amount d is equal to or greater than 0.21 μm

[A3] Frequency Characteristics of Composition for Manufacturing Recorded Object

The liquid droplet discharging apparatus which is installed in a chamber (a thermal chamber) and the composition for manufacturing a recorded object in the respective Examples and Comparative Examples were prepared, and under the environment of 25° C. and 50% RH, and in a state where a driving waveform of a piezoelectric element was optimized, the liquid droplets of the respective compositions for manufacturing the recorded object were discharged from the entire nozzles, of the liquid droplet discharging head while changing the number of vibration (frequency) of the piezoelectric element. The discharging time for the liquid droplets at each frequency was set to be 20 minutes. After discharging for 20 minutes, the frequency when the number of nozzles which do not discharge the liquid droplets is less than 1% with respect to the total number of nozzles is set to be a maximum frequency which is practically usable, and the range of the practically usable frequency is evaluated on the basis of the following 4 stages of criteria. It can be said that as this value is large, the frequency characteristics are excellent.

A: equal to or greater than 15 kHz
B: equal to or greater than 11 kHz and less than 15 kHz
C: equal to or greater than 5 kHz and less than 11 kHz
D: less than 5 kHz

[A4] Evaluation of Storage Stability of Composition for Manufacturing Recorded Object Long-Term Stability

[A4.1] Dispensability

The composition for manufacturing a recorded object in the respective Examples and Comparative Examples was left to stand for 20 days under the environment at 40° C., then the concentration before and after filtering was measured the liquid when 1 L of liquid was filtered by using a capsule filter (manufactured by Yamashin filter Co., Ltd.) with 3 μm of filtration accuracy, a loss which is generated by filtering coarse particles caused by insufficient dispersion is calculated by a concentration decrease rate, and then the evaluation thereof is performed on the basis of the following criteria.

A: Ink concentration decrease rate is less than 5%

B: Ink concentration decrease rate is equal to or greater than 5% and less than 10%

C: Ink concentration decrease rate is equal to or greater than 10% and less than 20%

D: Ink concentration decrease rate is equal to or greater than 20% and less than 40%

E: Ink concentration decrease rate is equal to or greater than 40%

[A4.2] Viscosity Increase Rate

The composition for manufacturing a recorded object in the respective Examples and Comparative Examples was left to stand for 20 days under the environment at 40° C., then the viscosity of the composition for manufacturing a recorded object at 20° C. in the respective Examples, which was measured in accordance with JISZ 8809 was measured by using a vibration type viscometer, a viscosity increase rate immediately after manufacturing the composition for manufacturing a recorded object was calculated, and then the evaluation was performed on the basis of the following criteria.

A: Viscosity increase rate is less than 5%

B: Viscosity increase rate is equal to or greater than 5% and less than 10%

C: Viscosity increase rate is equal to or greater than 10% and less than 18%

D: Viscosity increase rate is equal to or greater than 18% and less than 23%

E: Viscosity increase rate is equal to or greater than 23% or foreign matters are generated

[A5] Curability

The composition for manufacturing a recorded object in the respective Examples and Comparative Examples was introduced to an ink jet printer manufactured by Epson; PM800C, solid printing was performed at an ink amount of wet 9 g/m$^2$ by using Daifoil G440E (thickness: 38 μm) manufactured by Mitsubishi Plastics, Inc. as a recording medium, immediately after printing, irradiation of an ultraviolet ray was performed by using an LED-UV lamp; RX firefly (gap of 6 mm, peak wavelength of 395 nm, 1000 mW/cm$^2$) manufactured by Phoseon Technology, it was confirmed whether or not the composition for manufacturing a recorded object was cured, and then the evaluation was performed on the basis of the following 5 stages of criteria. Whether or not the composition for manufacturing a recorded object was cured was determined by whether or not uncured ink compositions were attached on the surface when the surface was rubbed by a cotton swab. In addition, the amounts of irradiation described in the following A to E can be calculated depending on the time of irradiation by using the lamp.

A: Cured by ultraviolet irradiation amount which is less than 250 mJ/cm$^2$

B: Cured by ultraviolet irradiation amount which is equal to or greater than 250 mJ/cm$^2$ and less than 350 mJ/cm$^2$ C: Cured by ultraviolet irradiation amount which is equal to or greater than 350 mJ/cm$^2$ and less than 500 mJ/cm$^2$ D: Cured by ultraviolet irradiation amount which is equal to or greater than 500 mJ/cm$^2$ and less than 1000 mJ/cm$^2$ E: Cured by ultraviolet irradiation amount which is equal to or greater than 1000 mJ/cm$^2$, or not cured at all

[A6] Manufacture of Recorded Object

As the recorded object, interior panels were manufactured as below by using the composition for manufacturing a recorded object in the respective Examples and Comparative Examples.

First, the composition for manufacturing a recorded object was put into an ink jet apparatus.

Thereafter, the composition for manufacturing a recorded object was discharged on a base material (a recording medium) having a curved surface portion which is formed by using polycarbonate (Carboglass Polish (thickness: 2 mm) manufactured by Asahi Glass Co., Ltd.) in a predetermined pattern.

Then, after heating at 60° C. for 5 minutes, the composition for manufacturing a recorded object on the base material was irradiated with the ultraviolet in a spectrum having maximum values at wavelengths of 365 nm, 380 nm, and 395 nm with irradiation intensity of 160 mW/cm$^2$ for 10 seconds and was cured and thereby an interior panel was obtained as the recorded object.

With the above-described method, 10 interior panels (the recorded objects) were manufactured by using the composition for manufacturing a recorded object in the respective Examples and Comparative Examples.

In addition, 10 interior panels (the recorded objects) were manufactured by using the composition for manufacturing a recorded object in the respective Examples and Comparative Examples, in the same method as described above except for using a material formed by using polyethylene terephthalate (Daifoil G440E (thickness: 38 μm) manufactured by Mitsubishi Plastics, Inc.), a material formed by using polyethylene having low density (T.U.X (L-LDPE) HC-E #80- manufactured by Mitsui Chemicals Tohcello, Inc.), a material formed by using biaxially oriented polypropylene (OP U-1 #60 manufactured by Mitsui Chemicals Tohcello, Inc.), and a material formed by using rigid vinyl chloride (Sunday sheet (transparent, thickness: 0.5 mm) manufactured by ACRYSUNDAY CO., Ltd) as a base material.

[A7] Evaluation of Recorded Object

The respective recorded objects obtained as described above were evaluated as follows.

[A7.1] Evaluation of Appearance of Recorded Object

The recorded objects manufactured in the respective Examples and Comparative Examples were visually observed, and then the evaluation was performed on the basis of the following 7 stages of criteria.

A: Glossiness with fully sophisticated feelings and greatly excellent appearance B: Glossiness with fully sophisticated feelings and very excellent appearance C: Glossiness with sophisticated feelings and excellent appearance D: Glossiness with sophisticated feelings and good appearance E: Inferior in glossiness and slight defect in appearance F: Inferior in glossiness and defect in appearance G: Inferior in glossiness and considerable defect in appearance

[A7.2] Glossiness

Regarding a pattern forming unit of the respective recorded object manufactured in the respective Examples and Comparative Examples, the glossiness at a flap angle of 60° was measured by using a glossmeter (MINOLTA MULTI GLOSS 268), and then the evaluation was performed on the basis of the following criteria.

A: Glossiness is equal to or greater than 350
B: Glossiness is equal to or greater than 250 and less than 350
C: Glossiness is equal to or greater than 150 and less than 250
D: Glossiness is less than 150

[A7.3] Abrasion Resistance

Regarding the recorded object in the respective Examples and Comparative Examples, after 48 hours has elapsed from the manufacture of the recorded object, based on JIS L0849, the recorded object was rubbed 30 times by using cloth with a load of 500 g in a Japan Society for the Promotion of Science (JSPS)-type fastness tester, and regarding the recorded object after being rubbed with cloth, the glossiness (at the flap angle 60°) was measured by using the same method as described above [7.2], the decreasing rate of the glossiness was calculated before and after rubbing the recorded object by using the cloth, and then the evaluation was performed on the basis of the following criteria.

A: Decreasing rate of glossiness is less than 10%
B: Decreasing rate of glossiness is equal to or greater than 10% and less than 20%
C: Decreasing rate of glossiness is equal to or greater 20% and less than 30%
D: Decreasing rate of glossiness is equal to or greater 30% and less than 50%
E: Decreasing rate of glossiness is equal to or greater than 50%

The above-described results are indicated in Table 4. Meanwhile, in Table 4, a recorded object which is manufactured by using a base material formed of polycarbonate is referred to as "M1", a recorded object which is manufactured by using a base material formed of polyethylene terephthalate is referred to as "M2", a recorded object which is manufactured by using a base material formed of polyethylene having low density is referred to as "M3", a recorded object which is manufactured by using a base material formed of biaxially oriented polypropylene is referred to as "M4", and a recorded object which is manufactured by using a base material formed of rigid vinyl chloride is referred to as "M5".

TABLE 4

| | Discharge stability | Frequency characteristics | Long term stability | | Curability | Appearance of recorded object | | | | | Glossiness | | | | | Abrasion resistance | | | | |
|---|---|---|---|---|---|---|---|---|---|---|---|---|---|---|---|---|---|---|---|---|
| | | | Dispersibility | Viscosity increase rate | | M1 | M2 | M3 | M4 | M5 | M1 | M2 | M3 | M4 | M5 | M1 | M2 | M3 | M4 | M5 |
| Example A1 | B | B | A | A | A | A | A | B | B | A | A | B | B | B | A | A | A | A | B | A |
| Example A2 | A | A | A | A | A | A | B | B | B | A | A | A | B | B | A | A | A | B | A | A |
| Example A3 | A | C | B | B | B | B | B | C | D | B | B | B | C | B | A | A | A | C | A | A |
| Example A4 | C | B | A | A | A | B | B | C | C | A | B | B | B | B | A | B | B | C | C | B |
| Example A5 | B | B | A | B | A | B | B | D | C | B | B | B | C | B | B | B | B | B | C | B |
| Example A6 | C | B | A | A | B | B | C | D | D | C | B | C | C | C | B | B | B | C | C | B |
| Example A7 | B | B | A | B | A | B | C | C | B | B | B | B | C | B | B | B | B | B | B | B |
| Example A8 | A | A | A | A | A | A | C | A | C | B | A | B | A | B | A | A | B | B | B | A |
| Example A9 | A | C | B | B | B | A | B | B | C | A | A | B | B | B | A | A | B | B | A | A |
| Example A10 | A | B | B | B | B | A | B | C | C | B | A | B | B | B | A | B | C | B | A | A |
| Example A11 | A | A | A | A | A | A | B | B | C | B | A | A | C | B | A | A | A | B | A | A |
| Example A12 | A | A | A | B | A | A | B | C | C | B | A | B | B | C | B | A | B | C | B | A |
| Example A13 | A | B | A | A | C | A | B | B | C | B | A | A | B | B | A | B | B | A | B | A |
| Example A14 | A | A | B | B | A | B | B | C | C | A | B | B | B | C | A | A | B | B | B | A |
| Example A15 | B | C | B | C | A | A | B | B | B | A | A | A | B | B | A | A | B | A | A | A |
| Example A16 | B | C | A | A | A | B | B | C | D | B | B | B | C | C | B | A | B | B | B | A |
| Example A17 | A | A | A | A | A | B | B | B | B | A | A | A | A | B | A | B | B | C | C | B |
| Example A18 | A | B | A | A | A | A | B | B | B | A | A | B | B | B | A | A | B | B | B | A |
| Example A19 | C | B | A | A | A | B | B | C | C | B | B | B | C | B | B | A | A | B | B | A |
| Example A20 | A | B | A | A | A | A | B | C | B | A | A | A | B | B | A | A | A | B | A | A |
| Example A21 | B | B | D | E | A | G | G | G | G | G | D | D | D | D | D | B | C | B | B | A |
| Example A22 | C | C | D | E | B | G | G | G | G | G | C | D | D | D | D | A | B | B | B | A |
| Example A23 | B | B | B | B | B | F | F | G | G | F | D | D | D | D | C | A | B | B | B | A |
| Comparative Example A1 | A | A | A | A | A | A | A | A | B | A | A | A | B | B | A | C | D | E | E | C |
| Comparative Example A2 | A | A | A | A | A | A | A | A | B | A | A | B | B | B | A | C | D | D | E | C |
| Comparative Example A3 | C | D | D | B | B | C | C | D | E | C | C | C | D | C | B | A | A | A | A | A |
| Comparative Example A4 | C | C | C | B | E | B | C | C | D | C | B | B | B | B | A | E | E | E | E | E |

As being apparent from Table 4, the composition (the ultraviolet curable composition) of the invention is excellent in the discharge stability, the storage stability and the curability of liquid droplets. Further, the recorded object of the invention has excellent glossiness and appearance, and is also excellent in the abrasion resistance of a pattern forming unit. In addition, stably excellent results were obtained by using the composition (the ultraviolet curable composition) of the invention without depending on the type of the recording medium. In contrast, in Comparative Examples, satisfactory results were not obtained.

Example B1

[B1] Manufacturing Composition for Forming Printing Unit

Composition for Manufacturing Recorded Object

First, a film with a smooth surface (surface roughness Ra is equal to or less than 0.02 μm) which is formed of polyethylene terephthalate was prepared.

Next, one surface of this film was entirely coated with silicone oil.

Subsequently, a film formed of Al was formed on the surface which was coated with the silicone oil through an evaporation method.

Then, the film (the base material) formed of polyethylene terephthalate on which the Al film was formed was put into a liquid which was obtained by dissolving 1 part by mass of $CF_3(CF_2)_5(CH_2)_2O(P)(OH)_2$ as a fluorine-based surface treating agent with 99 parts by mass of diethylene glycol diethyl ether, and then ultrasonic vibration of 27 kHz was imparted to a mixture at 55° C. for 3 hours. With this, a dispersion liquid for the metal powder formed of particles having a scaly shape of which the base particle formed of Al is subjected to the surface treatment by using $CF_3(CF_2)_5(CH_2)_2O—(P)O(OH)_2$ was obtained.

The average particle size of the metal powder obtained as described above was 0.9 μm, and the average thickness thereof was 30 nm.

Next, the composition for forming a printing unit (the composition for manufacturing a recorded object) was obtained by mixing the dispersion liquid of the metal powder with the fluorine-containing powder (the average particle size of the: 0.3 μm) consisting of the spherical-particle formed of polytetrafluoroethylene, γ-butyrolactoneacrylate as a monomer having an alicyclic structure (a polymerizable compound), phenoxyethyl acrylate as a monomer that does not have an alicyclic structure (a polymerizable compound), a substance A having a chemical structure expressed by formula (9), DISPERBYK-182 (manufactured by BYK-Chemie Co., Ltd.) as a basic polymer dispersant, Irgacure 819 (manufactured by Ciba Japan K.K.) as a photopolymerization initiator, Speedcure TPO (manufactured by ACETO CORP.) as a photopolymerization initiator, and Speedcure DETX (manufactured by Lambson) as a photopolymerization initiator.

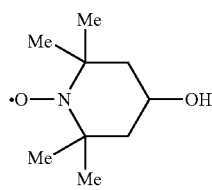

(9)

[B2] Manufacturing Recorded Object

As the recorded object, interior panels were manufactured as below by using the composition for forming a printing unit obtained as described above.

First, the composition for forming a printing unit was put into an ink jet apparatus.

Thereafter, the composition for forming a printing unit was discharged on a base material (a recording medium) having a curved surface portion which is formed by using polycarbonate (Carboglass Polish (thickness: 2 mm) manufactured by Asahi Glass Co., Ltd.) in a predetermined pattern.

Then, after heating at 60° C. for 5 minutes, the composition for forming a printing unit on the base material was irradiated with the ultraviolet in a spectrum having maximum values at wavelengths of 365 nm, 380 nm, and 395 nm with irradiation intensity of 160 mW/cm² for 10 seconds and was cured and thereby an interior panel was obtained as the recorded object. The irradiation with respect to the liquid droplets of the composition for forming a printing unit with the ultraviolet rays was initiated in 1.0 seconds after the liquid droplets land on the base material. The minimum thickness of the formed printing unit was 20 μm, and the maximum thickness of the printing unit was 25 μm.

Examples B2 to B20

The composition for forming a printing unit was prepared in the same way as in the above Example B1 except that the composition was set to be the same as that indicated in Table 6 and Table 7 in such a manner that the constituting particle of the metal powder and the constituting particle of the fluorine-containing powder were formed as indicated in Table 5, and the types and rates of raw materials which are used to prepare the composition for forming a printing unit were changed, and the recorded object is manufactured in the same way as in the above Example B1 except that the thickness of the printing unit is set as indicated in Table 5 in such a manner that the constituting material of the recording medium (the base material) was formed as indicated in Table 5, and the amount of imparting the composition for forming a printing unit was adjusted.

Comparative Example B1

The composition for forming a printing unit was prepared in the same way as in the above Example B1 except for setting the composition which does not contain the fluorine-containing powder, and the recorded object is manufactured in the same way as in the above Example B1 except for using the composition for forming a printing unit.

Comparative Examples B2 and B3

The composition for forming a printing unit was prepared in the same way as in the above Example B1 except that the composition was set to be the same as that indicated in Table 7 in such a manner that the types and rates of raw materials which are used to prepare the composition for forming a printing unit were changed, and the recorded object is manufactured in the same way as in the above Example B1 except for using the composition for forming a printing unit.

Comparative Examples B4 to B6

The composition for forming a printing unit was manufactured in the same way as in the above respective Comparative Examples B1 to B3 except that the spherical Al powder which is manufactured by using a gas atomizing method is used as the base particle of the constituting powder of the metal powder, and the recorded object is manufactured in the same way as in the above Example B1 except for using the composition for forming a printing unit.

Regarding the respective Examples and Comparative Examples, the configuration of the metal powder and the fluorine-containing powder which are contained in the composition for forming a printing unit used in manufacturing a recorded object, and the constituting material of the base material which is used to manufacture the recorded object were collectively indicated in Table 5, and in a planar view of the composition of the composition for forming a printing unit and the printing unit, and the number [N/μm$^2$] of constituting particles of the fluorine-containing powders which are exposed to the surface of the printing unit per unit area of the printing unit was collectively indicated in Table 6 and Table 7.

Meanwhile, in Table, polycarbonate is referred to as "PC", polyethylene terephthalate is referred to as "PET", biaxially oriented polypropylene is referred to as "PP", rigid vinyl chloride is referred to as "PVC", $CF_3(CF_2)_5(CH_2)_2O(P)(OH)_2$ as a fluorine-based phosphoric acid ester compound is referred to as "FAP1", $(CF_3(CF_2)_7CH_2CH_2Si(OC_2H_5)_3)$ as a fluorine-based silane compound is referred to as "FAS1", $(CF_3(CF_2)_5CH_2CH_2Si(OC_2H_5)_3)$ as a fluorine-based silane compound is referred to as "FAS2", $CF_3(CF_2)_7(CH_2)_2COOH$ as a fluorine-based fatty acid is referred to as "FFA1", $CF_3(CF_2)_7(CH_2)_2NCO$ as fluorine-based isocyanate is referred to as "IS1", polytetrafluoroethylene is referred to as "PTFE", γ-butyrolactone acrylate as a monomer having an alicyclic structure (a polymerizable compound) is referred to as "BLA", tetrahydrofurfuryl acrylate as a monomer having an alicyclic structure (a polymerizable compound) is referred to as "THFA", N-vinyl caprolactam as a monomer having an alicyclic structure (a polymerizable compound) is referred to as "VC", N-vinyl pyrrolidone as a monomer having an alicyclic structure (a polymerizable compound) is referred to as "VP", acryloyl morpholine as a monomer having an alicyclic structure (a polymerizable compound) is referred to as "AMO", tris(2-acryloyloxyethyl) isocyanurate as a monomer having an alicyclic structure (the polymerizable compound) is referred to as "TAOEI", dicyclopentenyloxyethyl acrylate as a monomer having an alicyclic structure (a polymerizable compound) is referred to as "DCPTeOEA", adamantyl acrylate as a monomer having an alicyclic structure (a polymerizable compound) is referred to as "AA", dimethylol tricyclodecane diacrylate as a monomer having an alicyclic structure (a polymerizable compound) is referred to as "DMTCDDA", dimethylol dicyclopentane diacrylate as a monomer having an alicyclic structure (a polymerizable compound) is referred to as "DMDCPTA", dicyclopentenyl acrylate as a monomer having an alicyclic structure (a polymerizable compound) is referred to as "DCPTeA", dicyclopentanyl acrylate as a monomer having an alicyclic structure (a polymerizable compound) is referred to as "DCPTaA", isobornyl acrylate as a monomer having an alicyclic structure (a polymerizable compound) is referred to as "IBA", cyclohexyl acrylate as a monomer having an alicyclic structure (a polymerizable compound) is referred to as "CHA", diacrylated isocyanurate as a monomer having an alicyclic structure (a polymerizable compound) is referred to as "DAI", triacrylated isocyanurate as, a monomer having an alicyclic structure (a polymerizable compound) is referred to as "TAI", γ-butyrolactone methacrylate as a monomer having an alicyclic structure (a polymerizable compound) is referred to as "BLM", tetrahydrofurfuryl methacrylate as a monomer having an alicyclic structure (a polymerizable compound) is referred to as "THFM", dicyclopentenyloxyethyl methacrylate as a monomer having an alicyclic structure (a polymerizable compound) is referred to as "DCPTeOEM", adamantyl methacrylate as a monomer having an alicyclic structure (a polymerizable compound) is referred to as "AM", pentamethyl piperidyl methacrylate as a monomer having an alicyclic structure (a polymerizable compound) is referred to as "PMPM", tetramethyl piperidyl methacrylate as a monomer having an alicyclic structure (a polymerizable compound) is referred to as "TMPM", 2-methyl-2-adamantyl methacrylate as a monomer having an alicyclic structure (a polymerizable compound) is referred to as "MAM", 2-ethyl-2-adamantyl methacrylate as a monomer having an alicyclic structure (a polymerizable compound) is referred to as "EAM", mevalonate lactone methacrylate as a monomer having an alicyclic structure (a polymerizable compound) is referred to as "MLM", dicyclopentenyl methacrylate as a monomer having an alicyclic structure (a polymerizable compound) is referred to as "DCPTeM", dicyclopentanyl methacrylate as a monomer having an alicyclic structure (a polymerizable compound) is referred to as "DCPTaM", isobornyl methacrylate as a monomer having an alicyclic structure (a polymerizable compound) is referred to as "IBM", cyclohexyl methacrylate as a monomer having an alicyclic structure (a polymerizable compound) is referred to as "CHM", cyclohexane spiro-2-(1,3-dioxolan-4-yl) methyl acrylate as a monomer having an alicyclic structure (a polymerizable compound) is referred to as "CHDOLA", (2-methyl-2-ethyl-1,3-dioxolan-4-yl) methyl acrylate as a monomer having an alicyclic structure (a polymerizable compound) is referred to as "MEDOLA", phenoxyethylacrylate as a monomer that does not contain an alicyclic structure (a polymerizable compound) is referred to as "PEA", dipropylene glycol diacrylate as a monomer that does not contain an alicyclic structure (a polymerizable compound) is referred to as "DPGDA", tripropylene glycol diacrylate as a monomer that does not contain an alicyclic structure (a polymerizable compound) is referred to as "TPGDA", 2-hydroxy3-phenoxy propyl acrylate as a monomer that does not contain an alicyclic structure (a polymerizable compound) is referred to as "HPPA", 4-hydroxybutyl acrylate as a monomer that does not contain an alicyclic structure (a polymerizable compound) is referred to as "HBA", ethyl carbitol acrylate as a monomer that does not contain an alicyclic structure (a polymerizable compound) is referred to as "ECA", methoxy triethylene glycol acrylate as a monomer that does not contain an alicyclic structure (a polymerizable compound) is referred to as "MTEGA", t-butyl acrylate as a monomer that does not contain an alicyclic structure (a polymerizable compound) is referred to as "TBA", benzyl acrylate as a monomer that does not contain an alicyclic structure (a polymerizable compound) is referred to as "BA", 2-(2-hydroxyethoxy) ethyl acrylate as a monomer that does not contain an alicyclic structure (a polymerizable compound) is referred to as "VEEA", benzyl methacrylate as a monomer that does not contain an alicyclic structure (a polymerizable compound) is referred to as "BM", urethane acrylate as a monomer that does not contain an alicyclic structure (a polymerizable compound) is referred to as "UA", DISPERBYK-182 (manufactured by BYK-Chemie Co., Ltd., amine value: 13 mgKOH/g) as a basic polymer dispersant is referred to as "D2", DISPERBYK-2155 (manufactured by BYK-Chemie Co., Ltd., amine value: 48 mgKOH/g) as a basic polymer dispersant is referred to as "D5", a compound (substance A) expressed by the formula (9) is referred to as "A1", a compound (substance A) expressed by formula (10) described below is referred to as "A2", a compound (substance A) expressed by formula (11) described below is referred to as "A3", a substance A expressed by formula (12) described below is referred to as "A4", Irgacure 819 (manufactured by Ciba Japan K.K.) is referred to as "ic 819", Speedcure TPO (manufactured by ACETO CORP.) is referred to as "sc TPO", Speedcure DETX (manufactured by Lambson) is referred to as "sc DETX", UV-3500 (manufactured by BYK-Chemie Co., Ltd.) is referred to as "UV3500", hydroquinone monomethyl ether is referred to as "MEHQ", LHP-96 (manufactured by Kusumoto Co., Ltd.) is referred to as "LHP", and LF-1984 (manufactured by Kusumoto Co., Ltd.) is referred to as "LF".

In addition, in Table, in Example B15, regarding a composition of a constituting material of the base particle, the content of each element is indicated by a weight ratio. In addition, the value of viscosity of the composition for forming a printing unit which is used in manufacturing a recorded object in each Example of the invention by using a vibration type viscometer based on JIS Z8809 at 20° C. is in a range of 3 mPa·s to 15 mPa·s. Further, regarding the metal powder which forms the composition for forming a printing unit used for manufacturing a recorded object in each Example, the observation is optionally performed for ten metal particles, and a ratio ($S_1/S_0$) of an area $S_1$ [$\mu m^2$], which is the maximum projected area when the particle is observed in a plan view, to an area $S_0$ [$\mu m_2$], which is the maximum area of the projected areas obtained when being observed from the direction orthogonal to the observation direction is obtained, and when the average value of the ratio is obtained, the average value of $S_1/S_0$ is equal to or greater than 19. In addition, both D2 and D5 are basic and have a polymer structure (a basic polymer dispersant). In addition, the transmittance of visible light (transmittance of light having wavelength of 600 nm) in the thickness direction of a cured material having the thickness of 100 μm which is obtained by curing the composition having the same composition as the composition for forming a printing unit used in the respective Examples except for that the metal powder is not contained was equal to or greater than 90%. Further, in a planar view of the composition of the printing unit, and the number [$N/\mu m^2$] of constituting particles of the fluorine-containing powders which are exposed to the surface of the printing unit per unit area of the printing unit was obtained as below.

That is, in the printing unit, ten square regions each of which has a corner of 10 μm (a region of 100 $\mu m^2$) were randomly selected, and in an image in these regions obtained by observing through the scanning electron microscope (SEM), the number of the constituting particles of the fluorine-containing powders which are exposed to the surface of the printing unit per unit area of the printing unit was obtained by counting the number of the constituting particles of the fluorine-containing powders which are exposed to the surface of the printing unit, and then the average value (an arithmetic average) of the obtained number was obtained as $N/\mu m^2$. Meanwhile, in all of the recorded object in the respective Examples, the number of the constituting particles of the fluorine-containing powders which are exposed to the surface of the printing unit in all of the ten regions was in a range of 0.20/$\mu m^2$ to 3.0/$\mu m^2$ and was the value in the range of ±5% from the average value obtained as described above. In addition, in the recorded object in Comparative Examples 2 and 5, the number of the constituting particles of the fluorine-containing powders which are exposed to the surface of the printing unit in the entirety of the ten regions was equal to or less than 0.18/$\mu m^2$, and was the value in the range of ±5% from the average value obtained as described above. In the recorded object in Comparative Examples 3 and 6, the number of the constituting particles of the fluorine-containing powders which are exposed to the surface of the printing unit in the entirety of the ten regions was equal to or greater than 3.2/$\mu m_2$, and was the value in the range of ±5% from the average value obtained as described above. In addition, in all of the recorded objects in the respective Examples, the printing unit contained the constituting particle of the fluorine-containing powder which is protruded higher than the constituting particle of the metal powder.

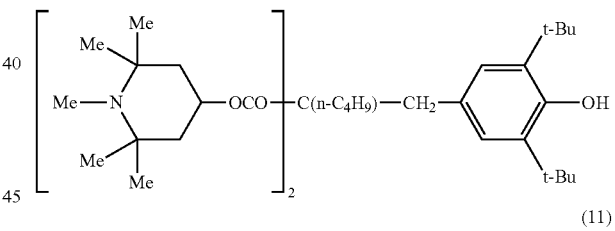

(10)

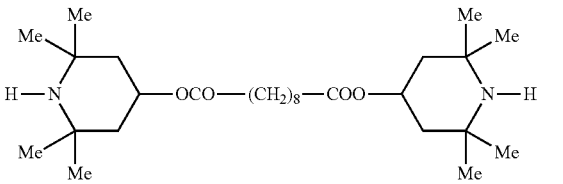

(11)

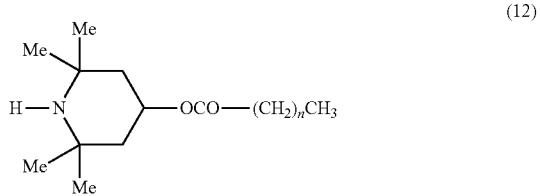

(12)

(Here, a substance A expressed in formula (12) is a mixture of a plurality of compounds in which n in the formula is in a range of 10 to 19 (a main component is a compound in which n in the formula is in a range of 15 to 18).)

TABLE 5

| | Printing layer | | | Metal powder | | | | Fluorine-containing powder | | | |
|---|---|---|---|---|---|---|---|---|---|---|---|
| | Base material Constituting material | Minimum thickness [μm] | Maximum thickness [μm] | Shape | Constituting material of base particle | Material used for surface treatment | Average particle size [μm] | Average thickness [nm] | Shape | Constituting material of base particle | Material used for surface treatment | Average particle size [μm] |
| Example B1 | PC | 20 | 30 | Scaly | Al | FAP1 | 0.9 | 30 | Sphere | PTFE | — | 0.3 |
| Example B2 | PC | 20 | 30 | Scaly | Al | FAP1 | 0.7 | 15 | Sphere | PTFE | — | 0.2 |
| Example B3 | PC | 10 | 20 | Scaly | Al | FAP1 | 1.5 | 10 | Sphere | PTFE | | 0.3 |
| Example B4 | PET | 10 | 20 | Scaly | Al | FAP1 | 1 | 20 | Sphere | Silica | FAS1 | 0.015 |
| Example B5 | PET | 10 | 20 | Scaly | Al | FAP1 | 0.9 | 20 | Sphere | Alumina | FAS1 | 0.02 |
| Example B6 | PET | 5 | 10 | Scaly | Al | FAP1 | 0.8 | 20 | Sphere | Silica | FAS2 | 0.015 |
| Example B7 | PET | 10 | 20 | Scaly | Al | FAP1 | 0.8 | 20 | Sphere | Alumina | FAS2 | 0.02 |
| Example B8 | PP | 20 | 30 | Scaly | Al | FAP1 | 0.9 | 20 | Sphere | Titania/Al(OH)$_3$ | FFA1 | 0.02 |
| Example B9 | PVC | 20 | 30 | Scaly | Al | FAS1 | 2 | 60 | Sphere | Talc | FAS1 | 0.3 |
| Example B10 | PVC | 20 | 30 | Scaly | Al | FAS2 | 1.1 | 80 | Sphere | Talc | FAS2 | 0.3 |
| Example B11 | PC | 60 | 100 | Scaly | Al | FAP1 | 1 | 20 | Sphere | Al(OH)$_3$ | FFA1 | 0.1 |
| Example B12 | PC | 60 | 100 | Scaly | Al | FAP1 | 0.7 | 40 | Sphere | Al(OH)$_3$ | FAP1 | 0.02 |
| Example B13 | PC | 20 | 30 | Scaly | Al | FAP1 | 0.9 | 20 | Sphere | Iron oxide | FAP1 | 0.02 |
| Example B14 | PC | 20 | 30 | Scaly | Al | FAP1 | 1.5 | 15 | Sphere | Calcium carbonate | FFA1 | 0.03 |
| Example B15 | PC | 10 | 20 | Scaly | Ni49.5 Fe50.5 | FAS1 | 1.8 | 40 | Sphere | PTFE | — | 0.2 |
| Example B16 | PET | 10 | 20 | Scaly | SUS316L | FAS1 | 1.5 | 40 | Sphere | Silica | FAS1 | 0.05 |
| Example B17 | PET | 10 | 20 | Scaly | Al | FAP1 | 0.9 | 80 | Sphere | Titania | FFA1 | 0.05 |
| Example B18 | PET | 100 | 130 | Scaly | Al | FAP1 | 0.9 | 20 | Sphere | Silica | FAS2 | 0.05 |
| Example B19 | PET | 5 | 10 | Scaly | Al | FFA1 | 0.9 | 20 | Sphere | Al(OH)$_3$ | FFA1 | 0.1 |
| Example B20 | PET | 100 | 130 | Scaly | Al | IS1 | 0.8 | 20 | Sphere | Silica | IS1 | 0.08 |
| Comparative Example B1 | PC | 20 | 30 | Scaly | Al | FAP1 | 0.9 | 60 | — | — | — | — |
| Comparative Example B2 | PC | 20 | 30 | Scaly | Al | FAP1 | 0.9 | 60 | Sphere | PTFE | — | 0.3 |
| Comparative Example B3 | PC | 20 | 30 | Scaly | Al | FAP1 | 0.9 | 60 | Sphere | PTFE | — | 0.3 |
| Comparative Example B4 | PC | 20 | 30 | Sphere | Al | FAP1 | 0.8 | — | — | — | — | — |
| Comparative Example B5 | PC | 20 | 30 | Sphere | Al | FAP1 | 0.8 | — | Sphere | PTFE | — | 0.3 |
| Comparative Example B6 | PC | 20 | 30 | Sphere | Al | FAP1 | 0.8 | — | Sphere | PTFE | — | 0.3 |

TABLE 6

| | Composition of composition for forming printing layer | | | | | | | | | |
|---|---|---|---|---|---|---|---|---|---|---|
| | Metal powder [N/μm$^2$] | Metal powder Content [Part by mass] | Fluorine-containing powder Content [Part by mass] | Polymerizable compound | Content [Part by mass] | Dispersant | Content [Part by mass] | Substance A | Content [Part by mass] | Other components | Content [Part by mass] |
| Example B1 | 1 | 1.5 | 1 | BLA/PEA | 59.0/26.9 | D2 | 1.4 | A1 | 0.2 | ic819/scTPO/scDETX | 4.0/4.0/2 |
| Example B2 | 1 | 1.5 | 1 | BLA/THFA | 42.2/44.1 | — | — | A2 | 0.8 | ic819/scTPO/scDETX/LHP/MEHQ | 4.0/4.0/2.0/0.2/0.2 |
| Example B3 | 1.2 | 3 | 2 | VC/VP/AMO/VEEA | 24.8/31.3/16.9/9.0 | D2 | 1.4 | A1 | 1.4 | ic819/scTPO/scDETX/LF | 4.0/4.0/2.0/0.2 |
| Example B4 | 0.8 | 2 | 0.8 | BLM/THFM/TAOEI/DCPTeOEA/AA/PEA/DPGDA | 7.3/5.0/30.8/31.8/5.4/3.9/3.9 | — | — | A3 | 0.7 | ic819/scTPO/UV3500/MEHQ | 4.0/4.0/0.2/0.2 |
| Example B5 | 1.1 | 1.3 | 1.2 | AM/PMPM/TMPM/MAM/EAM/DCPTeA/ | 3.8/7.8/3.0/3.0/3.1/58.8/3.2/1.2/2.0 | — | — | A4 | 1.2 | ic819/scTPO/scDETX/UV3500/MEHQ | 4.0/4.0/2.0/0.2/0.2 |

TABLE 6-continued

| | Composition of composition for forming printing layer | | | | | | | | | |
|---|---|---|---|---|---|---|---|---|---|---|
| | Metal powder | Fluorine-containing powder | Polymerizable compound | | Dispersant | | Substance A | | Other components | |
| | Content [N/µm²] | Content [Part by mass] | | Content [Part by mass] | | Content [Part by mass] | | Content [Part by mass] | | Content [Part by mass] |
| Example B6 | 2.7 | 5 | 3 | PEA/TPGDA/ VEEA DCPTeOEM/ MLM/ DMTCDDA/ DCPTaA/IBA/ CHM/PEA/ HPPA | 3.4/3.41 19.4/27.6/ 8.6/8.4/4.9/4.9 | — | — | A1 | 1 | ic819/scTPO/ scDETX/ UV3500/ MEHQ | 4.0/4.0/ 2.0/0.2/ 0.2 |
| Example B7 | 0.93 | 2 | 1 | DMDCPTA/ DCPTeM/ DCPTaM/ PEA/ IBM/CHA/ HBA/VEEA | 44.7/5.5/ 6.5/5.9/17.6/ 4.1/1.1/1.0 | — | — | A1 | 0.58 | ic819/scTPO/ scDETX | 4.0/4.0/ 2 |
| Example B8 | 1 | 1 | 1 | BLA/THFA/ PEA/HBA/AMO | 29.6/34.6/ 9.7/9.2/3.2 | — | — | A2 | 0.8 | ic819/scTPO/ scDETX/ UV3500/ MEHQ | 4.0/4.0/ 2.0/0.2/ 0.2 |
| ExampleB9 | 1 | 1 | 1 | BLA/THFA/ VC/PEA | 25.1/32.4/ 7.2/19.8 | D2 | 1.4 | A1 | 1.4 | ic819/scTPO/ scDETX/LF | 4.0/4.0/ 2.0/0.2 |
| ExampleB10 | 1 | 1 | 1.2 | BLA/THFA/ TBA/VEEA/UA | 26.4/23.3/ 14.8/9.5/12.5 | — | — | A1 | 0.4 | ic819/scTPO/ scDETX/ UV3500/ MEHQ | 4.0/4.0/ 2.0/0.2/ 0.2 |
| Example B11 | 1 | 0.6 | 1 | BLA/THFA/ VP/PEA | 33.3/34.6/ 3.5/16.9 | — | — | A3 | 0.8 | ic819/scTPO/ LHP/MEHQ | 4.0/4.0/ 0.2/0.2 |
| Example B12 | 0.6 | 0.6 | 1.2 | BLA/THFA/ VEEA/BM/UA | 25.3/24.4/ 14.2/16.3/10.3 | D5 | 0.2 | A1 | 0.2 | ic819/scTPO/ LF/MEHQ | 4.0/2.0/ 0.2/0.2 |

TABLE 7

| | Metal powder | Fluorine-containing powder | Polymerizable compound | | Dispersant | | Substance A | | Other components | |
|---|---|---|---|---|---|---|---|---|---|---|
| | Content [Part by mass] | Content [Part by mass] | | Content [Part by mass] | | Content [Part by mass] | | Content [Part by mass] | | Content [Part by mass] |
| Example B13 | 0.90 | 2.0 | 1.0 | BLA/THFA/ BM | 31.7/33.61 20.1 | — | — | A4 | 1.2 | ic819/scTPO/ scDETX/LF/ MEHQ | 4.0/4.0/ 2.0/0.2/0.2 |
| Example B14 | 1.1 | 2.0 | 1.2 | DAI/TAI/ ECA/MTEGA/ IBA/BA | 20.1/19.2/ 17.6/17.1/ 5.9/5.5 | — | — | A1 | 1.0 | ic819/scTPO/ scDETX/UV3500/ MEHQ | 4.0/4.0/ 2.0/0.2/0.2 |
| Example B15 | 1.0 | 2.0 | 1.0 | BLA/THFA/ TBA/VEEA/UA | 26.8/26.11 13.6/15.3/4.0 | — | — | A2 | 0.8 | ic819/scTPO/ scDETX/LHP/ MEHQ | 4.0/4.0/ 2.0/0.2/0.2 |
| Example B16 | 1.3 | 2.0 | 1.5 | BLA/THFA/ VEEA/BM/ MEDOLA | 25.7/27.1/ 13.8/15.314.0 | D5 | 0.2 | A1 | 0.2 | ic819/scTPO/ scDETX/LHP | 4.0/4.01 2.0/0.2 |
| Example B17 | 0.23 | 2.5 | 0.2 | AMO/THFA | 51.9/34.7 | — | — | A2 | 0.3 | ic819/scTPO/ scDETX/LHP/LF | 4.0/4.0/ 2.0/0.2/0.2 |
| Example B18 | 1.0 | 1.5 | 1.0 | AMO/THFA/ BA | 39.8/39.8/6.9 | — | — | A2 | 0.6 | ic819/scTPO/ scDETX/LHP/LF | 4.0/4.0/ 2.0/0.2/0.2 |
| Example B19 | 1.7 | 5.0 | 3.0 | AMO/BA/ DCPTaA/ CHDOLA | 20.7/20.7/ 23.3/16.3 | — | — | A2 | 0.6 | ic819/scTPO/ scDETX/LHP/LF | 4.0/4.0/ 2.0/0.2/0.2 |
| Example B20 | 1.0 | 0.5 | 1.0 | VEEA/PEA | 51.2/33.9 | D2 | 1.0 | A1 | 1.0 | ic819/scTPO/ scDETX/UV3500/ MEHQ | 4.0/4.0/ 2.0/0.2/0.2 |
| Comparative Example B1 | — | 1.5 | — | BLA/PEA | 59.0/26.9 | D2 | 1.4 | A1 | 0.2 | ic819/scTPO/ scDETX | 4.0/4.0/ 2.0 |

TABLE 7-continued

| | Metal powder Content [Part by mass] | Fluorine-containing powder Content [Part by mass] | Polymerizable compound | Content [Part by mass] | Dispersant | Content [Part by mass] | Substance A | Content [Part by mass] | Other components | Content [Part by mass] |
|---|---|---|---|---|---|---|---|---|---|---|
| Comparative Example B2 | 0.17 | 1.5 | 0.009 | BLA/PEA | 59.0/26.9 | D2 | 1.4 | A1 | 0.2 | ic819/scTPO/scDETX | 4.0/4.0/2.0 |
| Comparative Example B3 | 3.4 | 1.5 | 5.4 | BLA/PEA | 59.0/26.9 | D2 | 1.4 | A1 | 0.2 | ic819/scTPO/scDETX | 4.0/4.0/2.0 |
| Comparative Example B4 | — | 1.5 | | BLA/PEA | 59.0/26.9 | D2 | 1.4 | A1 | 0.2 | ic819/scTPO/scDETX | 4.0/4.0/2.0 |
| Comparative Example B5 | 0.17 | 1.5 | 0.009 | BLA/PEA | 59.0/26.9 | D2 | 1.4 | A1 | 0.2 | ic819/scTPO/scDETX | 4.0/4.0/2.0 |
| Comparative Example B6 | 3.4 | 1.5 | 5.4 | BLA/PEA | 59.0/26.9 | D2 | 1.4 | A1 | 0.2 | ic819/scTPO/scDETX | 4.0/4.0/2.0 |

[B3] Evaluation of Recorded Object

The respective recorded object obtained as described above was evaluated as follows.

[B3.1] Evaluation of Appearance of Recorded Object

The recorded objects manufactured in the respective Examples and Comparative Examples were visually observed, and then the evaluation was performed on the basis of the following seven stages of criteria.

A: Glossiness with sophisticated feelings and greatly excellent appearance

B: Glossiness with sophisticated feelings and very excellent appearance

C: Glossiness with sophisticated feelings and excellent appearance

D: Glossiness with sophisticated feelings and good appearance

E: Inferior in glossiness and slight defect in appearance

F: Inferior in glossiness and defect in appearance

G: Inferior in glossiness and considerable defect in appearance

[B3.2] Glossiness

Regarding a printing unit of the respective recorded object manufactured in the respective Examples and Comparative Examples, the glossiness at a flap angle of 60° was measured by using a glossmeter (MINOLTA MULTI GLOSS 268), and then the evaluation was performed on the basis of the following criteria.

A: Glossiness is equal to or greater than 300

B: Glossiness is equal to or greater 250 and less than 300

C: Glossiness is equal to or greater 150 and less than 250

D: Glossiness is less than 150

[B3.3] Abrasion Resistance

Regarding the recorded object in the respective Examples and Comparative Examples, after 48 hours has elapsed form the manufacture of the recorded object, based on JIS L0849, the recorded object was rubbed 30 times by using cloth with a load of 500 g in a Japan Society for the Promotion of Science (JSPS)-type fastness tester, and regarding the recorded object after being rubbed with cloth, the glossiness (at the flap angle 60°) was measured by using the same method as described above [3.2], the decreasing rate of the glossiness was calculated before and after rubbing the recorded object by using the cloth, and then the evaluation was performed on the basis of the following criteria.

A: Decreasing rate of glossiness is less than 10%

B: Decreasing rate of glossiness is equal to or greater 10% and less than 20%

C: Decreasing rate of glossiness is equal to or greater 20% and less than 30%

D: Decreasing rate of glossiness is equal to or greater 30% and less than 50%

E: Decreasing rate of glossiness is equal to or greater than 50%

[B4] Evaluation of Composition for Manufacturing Recorded Object

A composition for forming a printing unit used in manufacturing a recorded object was evaluated as follows.

[B4.1] Evaluation of Discharging Stability of Liquid Droplets (Evaluation of Discharge Stability)

The composition for forming a printing unit used in manufacturing a recorded object in the respective Examples and Comparative Examples was evaluated through the test as described below.

First, the liquid droplet discharging apparatus which is installed in a chamber (a thermal chamber) and the composition for forming a printing unit used in manufacturing a recorded object in the respective Examples and Comparative Examples were prepared, and under the environment of 25° C. and 50% RH, and in a state where a driving waveform of a piezoelectric element was optimized, 2000000 liquid droplets were continuously discharged with respect to each the composition for forming a printing unit from each nozzle of a liquid droplet discharging head. Thereafter, the operation of the liquid droplet discharging apparatus was stopped and the composition for manufacturing a recorded object was left to stand for 360 hours under the environment at 25° C.

and 50% RH in a state where a flow path of the liquid droplet discharging apparatus was filled with each the composition for forming a printing unit.

Thereafter, 4000000 liquid droplets were continuously discharged from each nozzle of the liquid droplet discharging head under the environment at 25° C. and 50% RH. Regarding the 4000000 liquid droplets discharged from the designated nozzles in the vicinity of the center of the liquid droplet discharging head, after being left for 360 hours as described above, the evaluation was performed by obtaining an average value of shift amounts d from a center target position of the center position in each landed liquid droplet on the base material (the recording medium) which is separated from the nozzle surface by 500 μm, on the basis of the following five stages of criteria. It can be said that as this value is small, it is possible to effectively prevent the occurrence of curved flight.

A: Average value of shift amount d is less than 0.07 μm

B: Average value of shift amount d is equal to or greater than 0.07 μm and less than 0.14 μm C: Average value of shift amount d is equal to or greater than 0.14 μm and less than 0.17 μm D: Average value of shift amount d is equal to or greater than 0.17 μm and less than 0.21 μm E: Average value of shift amount d is equal to or greater than 0.21 μm

[B4.2] Frequency Characteristics of Composition for Forming Printing Unit

The liquid droplet discharging apparatus which is installed in a chamber (a thermal chamber) and the composition for forming a printing unit used in manufacturing a recorded object in the respective Examples and Comparative Examples were prepared, and under the environment of 25° C. and 50% RH, and in a state where a driving waveform of a piezoelectric element was optimized, the liquid droplets of the respective compositions for forming a printing unit were discharged from the entire nozzles of the liquid droplet discharging head while changing the number of vibration (frequency) of the piezoelectric element. The discharging time for the liquid droplets at each frequency was set to be 20 minutes. After discharging for 20 minutes, the frequency when the number of nozzles which do not discharge the liquid droplets is less than 1% with respect to the total number of nozzles is set to be a maximum frequency which is practically usable, and the range of the practically usable frequency is evaluated on the basis of the following 4 stages of criteria. It can be said that as this value is large, the frequency characteristics are excellent.

A: equal to or greater than 15 kHz

B: equal to or greater than 11 kHz and less than 15 kHz

C: equal to or greater than 5 kHz and less than 11 kHz

D: less than 5 kHz

[B4.3] Evaluation of Storage Stability of Composition for Forming Printing Unit (Long-Term Stability)

[B4.3.1] Sedimentation (Dispersion Stability)

The composition for forming a printing unit used in manufacturing a recorded object in the respective Examples and Comparative Examples was left to stand for 2 days under the environment at 40° C., then the concentration before and after filtering was measured when 1 L of liquid was filtered by using a capsule filter (manufactured by Yamashin filter Co., Ltd.) with 3 μm of filtration accuracy, a loss which is generated by filtering coarse particles caused by insufficient dispersion is calculated by a concentration decrease rate, and then the evaluation thereof is performed on the basis of the following criteria.

A: Ink concentration decrease rate is less than 5%

B: Ink concentration decrease rate is equal to or greater than 5% and less than 10%

C: Ink concentration decrease rate is equal to or greater than 10% and less than 20%

D: Ink concentration decrease rate is equal to or greater than 20% and less than 40%

E: Ink concentration decrease rate is equal to or greater than 40%

[B4.3.2] Viscosity Increase Rate

The composition for forming a printing unit used in manufacturing a recorded object in the respective Examples and Comparative Examples was left to stand for 20 days under the environment at 60° C., then the viscosity of the composition for manufacturing a recorded object at 20° C. which was measured in accordance with JIS 28809 was measured by using a vibration type viscometer, a viscosity increase rate immediately after manufacturing the composition for forming a printing unit used in manufacturing a recorded object was calculated, and then the evaluation was performed on the basis of the following criteria.

A: Viscosity increase rate is less than 5%

B: Viscosity increase rate is equal to or greater than 5% and less than 10%

C: Viscosity increase rate is equal to or greater than 10% and less than 18%

D: Viscosity increase rate is equal to or greater than 18% and less than 23%

E: Viscosity increase rate is equal to or greater than 23% or foreign matters are generated

[B4.4] Curability

The composition for forming a printing unit used in manufacturing a recorded object in the respective Examples and Comparative Examples was introduced to an ink jet printer manufactured by Epson; PM800C, solid printing was performed at an ink amount of wet 9 g/m$^2$ by using Daifoil G440E (thickness: 38 μm) manufactured by Mitsubishi Plastics, Inc. as a recording medium, immediately after printing, irradiation of an ultraviolet ray was performed by using an LED-UV lamp; RX firefly (gap of 6 mm, peak wavelength of 395 nm, 1000 mW/cm$^2$) manufactured by Phoseon Technology, it was confirmed whether or not the composition for forming a printing unit used in manufacturing a recorded object was cured, and then the evaluation was performed on the basis of the following 5 stages of criteria. Whether or not the composition for forming a printing unit used in manufacturing a recorded object was cured was determined by whether or not uncured compositions for forming a printing unit were attached on the surface when the surface was rubbed by a cotton swab. In addition, the amounts of irradiation described in the following A to E can be calculated depending on the time of irradiation by using the lamp.

A: Cured by ultraviolet irradiation amount which is less than 250 mJ/cm$^2$

B: Cured by ultraviolet irradiation amount which is equal to or greater than 250 mJ/cm$^2$ and less than 350 mJ/cm$^2$ C: Cured by ultraviolet irradiation amount which is equal to or greater than 350 mJ/cm$^2$ and less than 500 mJ/cm$^2$ D: Cured by ultraviolet irradiation amount which is equal to or greater than 500 mJ/cm$^2$ and less than 1000 mJ/cm$^2$ E: Cured by ultraviolet irradiation amount which is equal to or greater than 1000 mJ/cm$^2$, or not cured at all The results obtained from the above are indicated in Tables 8 and 9.

TABLE 8

| | Appearance of recorded object | Glossiness | Abrasion resistance |
|---|---|---|---|
| Example B1 | A | A | A |
| Example B2 | A | A | A |
| Example B3 | B | A | A |
| Example B4 | B | B | C |
| Example B5 | B | B | B |
| Example B6 | D | C | A |
| Example B7 | C | C | B |
| Example B8 | A | B | C |
| Example B9 | A | A | A |
| Example B10 | C | C | A |
| Example B11 | A | A | B |
| Example B12 | B | C | C |
| Example B13 | A | A | C |
| Example B14 | B | B | B |
| Example B15 | B | C | B |
| Example B16 | B | B | A |
| Example B17 | A | A | C |
| Example B18 | A | A | B |
| Example B19 | A | A | A |
| Example B20 | B | C | B |
| Comparative Example B1 | A | A | E |
| Comparative Example B2 | A | A | D |
| Comparative Example B3 | G | D | A |
| Comparative Example B4 | D | C | E |
| Comparative Example B5 | D | C | D |
| Comparative Example B6 | G | D | A |

TABLE 9

| | Discharge stability | Frequency characteristics | Long term stability — Dispersibility | Long term stability — Viscosity increase rate | Curability |
|---|---|---|---|---|---|
| Example B1 | B | B | A | A | A |
| Example B2 | A | A | A | A | A |
| Example B3 | A | C | B | B | B |
| Example B4 | C | B | A | A | A |
| Example B5 | B | B | A | B | A |
| Example B6 | C | B | A | A | B |
| Example B7 | B | B | A | B | A |
| Example B8 | A | A | A | A | A |
| Example B9 | A | C | B | B | B |
| Example B10 | A | B | B | B | B |
| Example B11 | A | A | A | A | A |
| Example B12 | A | A | A | B | A |
| Example B13 | A | B | A | A | C |
| Example B14 | A | A | B | B | A |
| Example B15 | B | C | B | C | A |
| Example B16 | B | C | A | A | A |
| Example B17 | A | A | A | A | A |
| Example B18 | A | B | A | A | A |
| Example B19 | C | B | A | A | A |
| Example B20 | A | B | A | A | A |
| Comparative Example B1 | A | A | A | A | A |
| Comparative Example B2 | A | A | A | A | A |
| Comparative Example B3 | C | D | D | B | B |
| Comparative Example B4 | B | B | A | A | B |
| Comparative Example B5 | B | B | A | A | B |
| Comparative Example B6 | D | D | E | C | D |

As being apparent from Table 8, the recorded object of the invention has excellent glossiness and appearance, and is also excellent in the abrasion resistance of the printing unit. In addition, as being apparent from Table 9, the composition for forming a printing unit used in manufacturing a recorded object of the invention is excellent in the discharging stability of the liquid droplets, the storage stability, and the curability. In contrast, in Comparative Examples, satisfactory results were not obtained.

REFERENCE SIGNS LIST

10 recorded object (printed object)
1 recording medium (base material)
2 printing unit (printing layer, recording layer)
21 metal powder
22 fluorine-containing powder
23 binder

The invention claimed is:

1. An ultraviolet curable composition comprising:
   a polymerizable compound;
   metal powder; and
   fluorine-containing powder,
   a content of the fluorine-containing powder being in a range of 0.010 mass % to 5.0 mass %,
   a constituting particle of the fluorine-containing powder containing at least one of a particle formed of a fluorine polymer or an inorganic fine particle that is formed of silica and has a surface which is treated by using a fluorine-based surface treating agent.

2. The ultraviolet curable composition according to claim 1,
   wherein the inorganic fine particle is formed of a material of which at least the surface has an oxide.

3. The ultraviolet curable composition according to claim 1,
   wherein the metal powder contains a material which is subjected to a surface treatment by using the fluorine-based surface treating agent as the constituting particle.

4. The ultraviolet curable composition according to claim 3,
   wherein the metal powder contains, as the constituting particle, a material in which a base particle of which at least a surface is mainly formed of Al is subjected to a surface treatment by using the fluorine-based surface treating agent.

5. The ultraviolet curable composition according to claim 3,
   wherein the constituting particle of the fluorine-containing powder contains the inorganic fine particle which is treated by using the fluorine-based surface treating agent, and the fluorine-based surface treating agent which is used for a surface treatment of the inorganic fine particle, and
   wherein the fluorine-based surface treating agent which is used for a surface treatment of the constituting particle of the metal powder are the same surface treating agent.

6. The ultraviolet curable composition according to claim 1,
   wherein the fluorine-based surface treating agent is one or two or more types selected from the group consisting of a fluorine-based silane compound, a fluorine-based phosphoric acid ester, a fluorine-based fatty acid, and a fluorine-based isocyanate.

7. The ultraviolet curable composition according to claim 1,
   wherein an average particle size of the fluorine-containing powder is in a range of 10 nm to 300 nm.

8. The ultraviolet curable composition according to claim 1,
wherein the metal powder is formed into a scaly shape.

9. The ultraviolet curable composition according to claim 8,
wherein an average thickness of the constituting particle of the metal powder is in a range of 10 nm to 100 nm.

10. The ultraviolet curable composition according to claim 1,
wherein when the average thickness of the constituting particle of the metal powder is set to be $T_M$ [μm], and the average particle size of the fluorine-containing powder is set to be $D_F$ [μm], a relationship expressed by $1.5 \leq D_F/T_M \leq 40$ is satisfied.

11. The ultraviolet curable composition according to claim 1,
wherein the average particle size of the metal powder is in a range of 500 nm to 3.0 μm, and a maximum size of the particle is equal to or less than 5 μm.

12. The ultraviolet curable composition according to claim 1, further comprising a monomer having an alicyclic structure as the polymerizable compound.

13. The ultraviolet curable composition according to claim 12,
wherein the monomer having an alicyclic structure contains one or two or more types selected from the group consisting of tris(2-acryloyloxyethyl) isocyanurate, dicyclopentenyloxyethyl acrylate, adamantyl acrylate, γ-butyrolactone acrylate, N-vinyl caprolactam, N-vinyl pyrrolidone, pentamethyl piperidyl acrylate, tetramethyl piperidyl acrylate, 2-methyl-2-adamantyl acrylate, 2-ethyl-2-adamantyl acrylate, mevalonic acid lactone acrylate, dimethylol tricyclodecane diacrylate, dimethylol dicyclopentane diacrylate, dicyclopentenyl acrylate, dicyclopentanyl acrylate, isobornyl acrylate, cyclohexyl acrylate, acryloyl morpholine, tetrahydrofurfuryl acrylate, cyclohexane spiro-2-(1,3-dioxolan-4-yl) methyl acrylate, and (2-methyl-2-ethyl-1,3-dioxolan-4-yl) methyl acrylate.

14. The ultraviolet curable composition according to claim 12,
wherein a polymerizable compound other than the monomer having an alicyclic structure contains one or two or more types selected from the group consisting of phenoxyethyl acrylate, benzyl acrylate, 2-(2-vinyloxyethoxy) ethyl acrylate, dipropylene glycol diacrylate, tripropylene glycol diacrylate, 2-hydroxy3-phenoxypropyl acrylate, and 4-hydroxybutyl acrylate.

15. A recorded object which is manufactured by imparting the ultraviolet curable composition according to claim 1 on a recording medium, and then being irradiated with an ultraviolet ray.

16. The ultraviolet curable composition according to claim 1,
wherein the constituting particle of the fluorine-containing powder has a spherical shape.

17. A recorded object comprising:
a recording medium; and
a printing unit,
the printing unit containing a metal powder and fluorine-containing powders,
in a planar view of the printing unit, the number of constituting particles of the fluorine-containing powders which are exposed to a surface of the printing unit being in a range of $0.20/\mu m^2$ to $3.0/\mu m^2$ per unit area of the printing unit,
each of the constituting particles of the fluorine-containing powders containing at least one of a particle formed of a fluorine polymer or an inorganic fine particle that is formed of silica, and has a surface which is treated by using a fluorine-based surface treating agent.

18. The recorded object according to claim 17,
wherein a content of the fluorine-containing powder in the printing unit is in a range of 0.010 mass % to 5.0 mass %.

19. The recorded object according to claim 17,
wherein a content of the metal powder in the printing unit is in a range of 0.5 mass % to 29 mass %.

20. The recorded object according to claim 17,
wherein the printing unit contains the constituting particle of the fluorine-containing powder which is protruded higher than the constituting particle of the metal powder.

21. The recorded object according to claim 17,
wherein the printing unit is obtained by solidifying the metal powder and the fluorine-containing powder due to a cured material of the ultraviolet curable resin.

22. The recorded object according to claim 17,
wherein each of the constituting particles of the fluorine-containing powders has a spherical shape.

* * * * *